US012571167B2

(12) United States Patent
Szekely

(10) Patent No.: US 12,571,167 B2
(45) Date of Patent: Mar. 10, 2026

(54) MODULAR PLATFORM DECK FOR TRAFFIC

(71) Applicant: ASTRA CAPITAL INCORPORATED, Mississauga (CA)

(72) Inventor: Kenneth Szekely, Mississauga (CA)

(73) Assignee: ASTRA CAPITAL INCORPORATED, Mississauga (CA)

( * ) Notice: Subject to any disclaimer, the term of this patent is extended or adjusted under 35 U.S.C. 154(b) by 239 days.

(21) Appl. No.: 18/418,190

(22) Filed: Jan. 19, 2024

(65) Prior Publication Data

US 2024/0240411 A1 Jul. 18, 2024

Related U.S. Application Data

(63) Continuation-in-part of application No. 18/153,566, filed on Jan. 12, 2023, now Pat. No. 11,891,803.

(51) Int. Cl.
*E01C 11/26* (2006.01)
*H05B 3/22* (2006.01)

(52) U.S. Cl.
CPC .............. *E01C 11/265* (2013.01); *H05B 3/22* (2013.01)

(58) Field of Classification Search
CPC .... E04B 5/48; E04C 2/52; E04F 15/10; E04F 15/107; F24D 13/024; E01C 11/265
See application file for complete search history.

(56) References Cited

U.S. PATENT DOCUMENTS

| | | | | | |
|---|---|---|---|---|---|
| 5,862,854 | A * | 1/1999 | Gary | F28F 21/063 | 165/56 |
| 6,283,382 | B1 * | 9/2001 | Fitzemeyer | F24D 3/141 | 165/49 |
| 6,536,168 | B1 * | 3/2003 | Cugini | E04B 5/48 | 52/220.5 |
| 8,025,240 | B2 * | 9/2011 | Keller | F24D 3/142 | 165/47 |
| 9,394,698 | B2 * | 7/2016 | Carrubba | E04F 15/105 | |
| 2017/0299198 | A1 * | 10/2017 | Collins | E04B 5/48 | |
| 2018/0003396 | A1 * | 1/2018 | Wójcik | F28D 15/0275 | |
| 2018/0327979 | A1 * | 11/2018 | Szekely | E01C 3/006 | |
| 2019/0112766 | A1 * | 4/2019 | Logan | E01C 11/265 | |
| 2021/0302031 | A1 * | 9/2021 | Weber | F24D 3/125 | |

* cited by examiner

*Primary Examiner* — Gisele D Ford
(74) *Attorney, Agent, or Firm* — Hodgson Russ LLP

(57) ABSTRACT

A modular assembly and method of installing a modular assembly is provided. The modular assembly can include a plurality of base members made of a composite material. Each base member can be a monolithic structure, and define a channel. A heater tray can be configured to be slidably received within the base member. Each of the plurality of base members can adjoin one another in an assembled state to form a horizontal platform for traffic.

18 Claims, 57 Drawing Sheets

MODULAR PLATFORM DECK FOR TRAFFIC

CROSS-REFERENCE TO RELATED APPLICATION

This application is a continuation-in-part of U.S. application Ser. No. 18/153,566, filed Jan. 12, 2023, the entire disclosure of which is incorporated herein by reference.

FIELD OF THE DISCLOSURE

The present disclosure relates to modular platforms.

BACKGROUND OF THE DISCLOSURE

In areas where there is pedestrian and vehicular traffic, particularly in publicly-accessible areas, it is common to have specific pedestrian pathways, such as walkways. Such walkways might include sidewalks, pedestrian or vehicular bridges, pedestrian and vehicle ramps, paved walkways through parks, patios, floor surfaces, balconies and the like. Such pedestrian walkways exist in public transit facilities (e.g., subway stations), light rapid transit, bus rapid transit, railway stations, and other locations where there is pedestrian traffic. In many types of pedestrian walkways, there is a requirement for pedestrians to be able to safely navigate such walkways and to remain on the walkways, especially where public transit vehicles are passing closely by. This is particularly important for mass transit platforms near, for example, subways, buses, or trains where there is a need for safe pedestrian walkways.

Besides specific pathways for pedestrians, there can be a need for pedestrians to be able to maintain good traction on pedestrian walkways in order to prevent slips and falls, particularly on outdoor surfaces that can be subject to inclement weather such as wind, rain, snow, or ice.

Additionally, it may be important for pedestrians to be able to determine the presence of platform edges so that the pedestrians do not accidentally walk off the edge of a platform, especially if a vehicle might be passing by. This may be especially important in mass transit situations, and particularly for subways or commuter trains, where the side of the subway or train is right at the edge of the platform. The need for making the presence of platform edges easy to determine may be of particular importance when making such facilities accessible and safe for blind or visually impaired persons.

Conventional concrete and wooden transit platforms may have a durability problem due to degradation by environmental chemicals such as salt, urea, acid rain, oils, and greases as well as stray electrical currents. This necessitates regular maintenance and periodic replacement of the platforms at considerable cost and service disruption to transit authorities. Steel and concrete are also susceptible to corrosive elements, such as water, salt water, and agents present in the environment like acid rain, road salts, or chemicals. Environmental exposure of concrete structures leads to pitting and spalling in concrete and thereby results in severe cracking and a significant decrease in strength in the concrete structure. Steel is likewise susceptible to corrosion, such as rust, by chemical attack. The rusting of steel weakens the steel, transferring tensile load to the concrete, thereby cracking the structure. The rusting of steel in standalone applications requires ongoing maintenance, and after a period of time corrosion can result in failure of the structure. The planned life of steel structures is likewise reduced by rust. Wood has been another long-time building material for bridges and other structures. Wood, like concrete and steel, is also susceptible to environmental attack, especially by rot from weather and termites. In such environments, wood encounters a drastic reduction in strength, which compromises the integrity of the structure. Moreover, wood undergoes accelerated deterioration in structures in marine environments, and is susceptible to fire damage.

Concrete structures are typically constructed with the concrete poured in situ as well as using some preformed components pre-cast into structural components (e.g., supports) and transported to the site of the construction. Constructing such concrete structures in situ requires hauling building materials and heavy equipment for pouring and casting the components on site. This process often requires the use of cranes, which can be costly and difficult to use in the case of nearby overhead wires. The weight of concrete structures also increase the necessary foundational requirements, which can increase cost, complexity and time of construction. Consequently, this process of construction involves lengthy construction times and is generally costly, time consuming, subject to delay due to weather and environmental conditions, and disruptive to existing traffic patterns.

Pre-cast concrete structural components are extremely heavy and bulky. Therefore, these are typically costly and difficult to transport to the site of construction due in part to their bulkiness and heavy weight. Although construction time is shortened as compared to pouring in situ, extensive time, with resulting delays, is still a factor. Construction with such pre-cast forms is particularly difficult, if not impossible, in areas with difficult access or where the working area is severely restricted due to adjoining tracks, buildings, or platforms. In typical pre-cast concrete construction, tolerances of plus or minus one-quarter inch or more are common, making precise installation and alignment difficult. Pre-cast components may also require the addition of a topping surface to create a finished, level surface.

There have been recent advances in modular platform assemblies that can be made of plastic and/or plastic composite materials. Such modular platforms can facilitate installation in areas with difficult access and/or restricted working areas. In addition, a lightweight structure can eliminate the costly concrete foundations and steel support systems necessary to support conventional concrete platforms. These modular platforms can also include heating systems to melt frost, snow and ice. However, further improvements in such modular platform assemblies, such as for a transit platform, is needed.

SUMMARY OF THE DISCLOSURE

A modular assembly and method of installing a modular assembly is provided. The modular assembly can include a plurality of base members made of a plastic composite material. Each base member can be a monolithic structure defined by a top wall, a bottom wall, and opposing side walls, the opposing side walls defining a channel. A heater tray can be configured to be slidably received within the channel of each base member. The heater tray may include a channel that extends longitudinally along the heater tray. A heating element can be configured to heat the heater tray, the heating element received within the channel of the heater tray. Each of the plurality of base members can adjoin one another in an assembled state to form a horizontal platform for traffic.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, process, step, and electronic changes may be made without departing from the scope of the disclosure. Accordingly, the scope of the disclosure is defined only by reference to the appended claims.

A modular assembly for decks, panels, platforms, boardwalks, floors, and the like is provided. The modular assembly is mounted on supporting members. In particular, the modular assembly may be used with a transit platform, such as at a train, subway, or bus station.

The modular assembly disclosed herein is easier to assemble than a concrete platform. Compared to existing systems, the modular assembly is pre-formed, easy to install, and easy to remove or replace. The modular assembly can be assembled or replaced quickly, which minimizes disruptions. Assembly or replacement can be easily performed even in areas with difficult access and/or restricted working areas. The modular assembly may be made of a lightweight, strong, and durable material, such as a composite material.

Furthermore, safety is improved using the modular assembly disclosed herein. In many types of pedestrian walkways, there is a requirement for pedestrians to be able to safely navigate such walkways and to remain on the walkways, especially where public transit vehicles are passing nearby. This may be particularly important for mass transit platforms in public transit facilities. The modular assembly disclosed herein can provide warnings proximate the edges, slip-resistant surfaces, and/or heating systems to melt frost, snow and ice. The modular assembly may also include, or entirely comprise, photoluminescent materials to provide information to pedestrians and/or vehicle operators. For example, exit, safety, warning, and/or related indicators can be included in the surface of the assembly for the purposes of conveying information. Accidents, such as slips and falls, can be prevented and tactile wayfinding can be incorporated.

Figure 1:
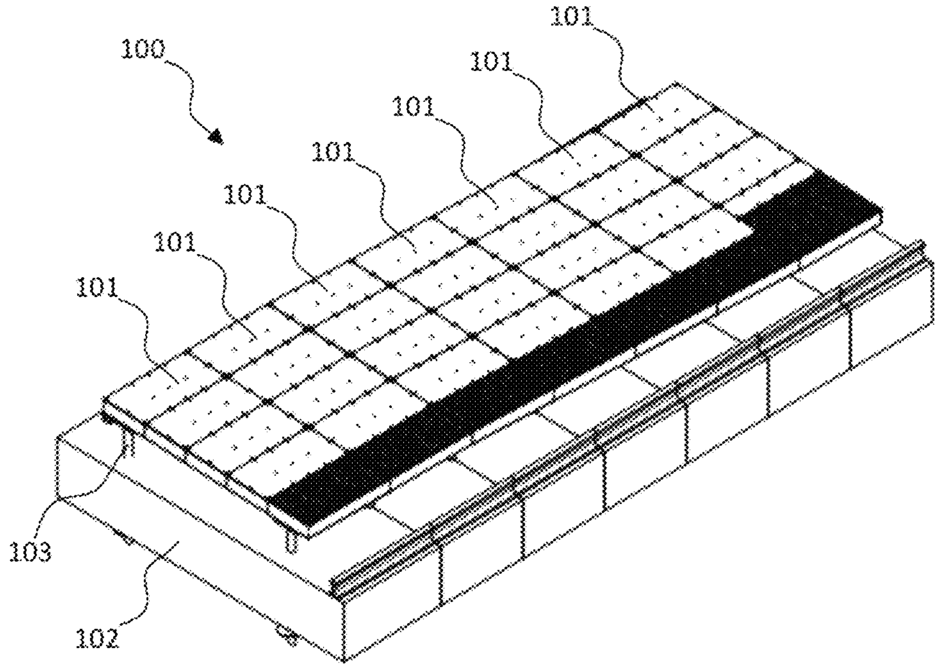
FIG. 1 is a perspective view of an embodiment of a modular assembly on a receiving surface in accordance with the present disclosure.

FIG. 1 is a perspective view of an embodiment of a modular assembly 100 on a receiving surface 102 using piles 103. The modular assembly 100 includes multiple base members 101. The receiving surface 102 may be, for example, a compacted gravel surface, a concrete surface, or other surfaces. The base members 101 can be connected to the piles 103. In an embodiment, the piles 103 are disposed in the ground, which is another example of a receiving surface 102.

While illustrated as approximately rectangular, the base members 101 can be square, polygonal, or other shapes. In one specific embodiment, each base member 101 can have a 2 foot by 4 foot surface and a height of 7 inches.

The base members 101 may be lightweight and water-resistant. In some embodiments the base members 101 can be made of a composite, polymer plastic material, vinyl, rubber, urethane, ceramic, glass reinforced plastic, or similar materials.

The base member 101 may provide drainage due to their materials or shape. For example, the top surface of the base member 101 may be angled or the base member 101 may include drainage channels or drain pipes that extend through the base member 101.

The base members 101 can be resistant to salt, urea, acid rain, oils, greases, stray electrical currents, or other environment factors. Unlike wood, the base members 101 can be impervious to rot or termites.

Figure 2:
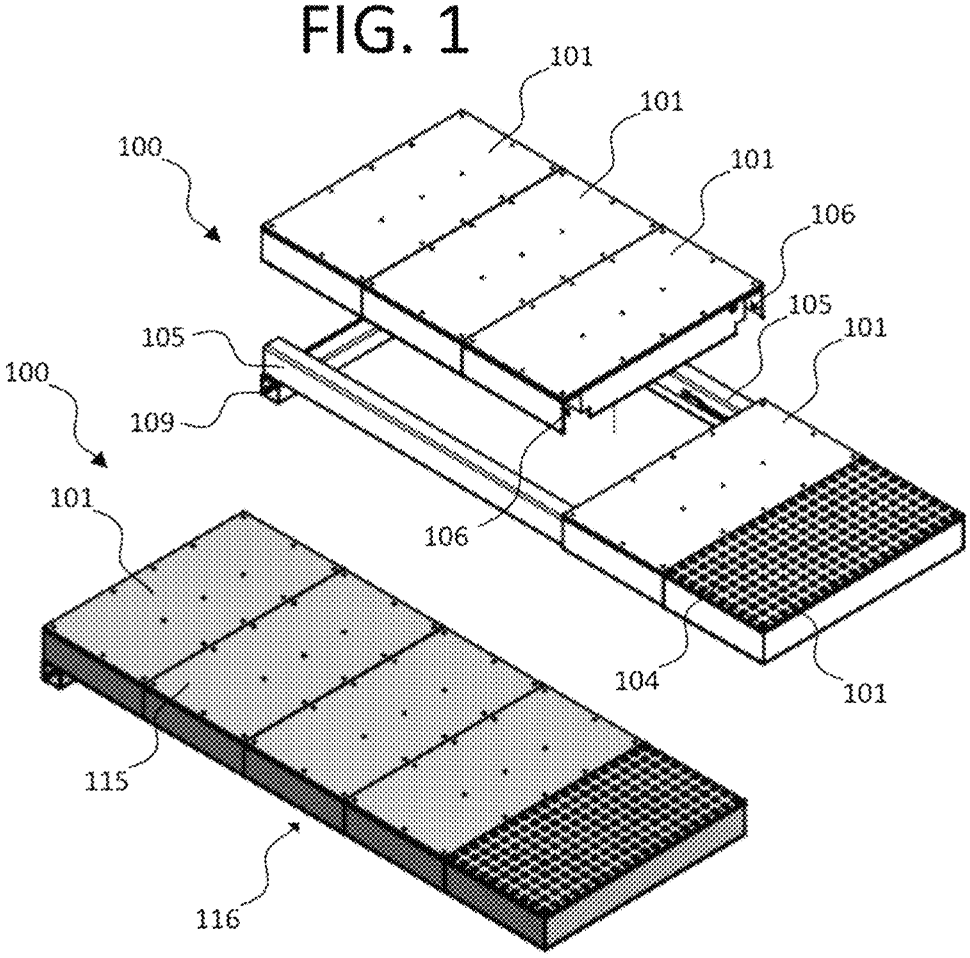
FIG. 2 is a view of an embodiment of a modular assembly in both assembled and partially exploded forms.

FIG. 2 is a view of an embodiment of a modular assembly 100 in both assembled and partially exploded forms. As with FIG. 1, the modular assembly 100 includes multiple base members 101, each with a top surface 115 and an opposite bottom surface 116 that includes the channels 106. In the embodiment of FIG. 2, the modular assembly 100 includes five base members 101, though other numbers and configurations are possible. One of the base members 101 includes a textured surface 104, though more than one of the base members 101 can include the textured surface 104, such as on the top surface 115 that a pedestrian can walk on. The textured surface can vary from the raised cylindrical bumps illustrated and can provide grip for pedestrians and/or a warning to a pedestrian that he or she is, for example, nearing an edge of a platform. Other warnings or benefits are possible. Moreover, other arrays of base members 101 than that illustrated can be arranged in a two-dimensional pattern.

The base members 101 each include two channels 106. Each of the support members 105 are configured to be disposed in one of the channels 106. The support members 105 may be made of a metal, such as a steel or aluminum. The support members 105 can also be made of a non-metal material, such as a composite material, like fiberglass. In alternative embodiments, the surface panel 112 can be formed of a non-composite material such as a tile, concrete, or the like. The support members 105 may be a tube, beam, or other structural element. The support members 105 may be fastened to the base members 101, such as using bolts or screws.

Besides or in conjunction with fasteners, the support members 105 may be clamped to the base members 101 using a mounting bracket or a clamping mechanism. In an example, the support member 105 is an I-beam and the base member 101 is provided with Z clip mounting bracket. The Z clip mounting bracket may be fabricated of stainless steel to resist corrosion.

A wiring raceway 109 is positioned on the support members 105. The wiring raceway 109 can include wires for a heating assembly in the base member 101, electrical lighting wiring, communications wiring, or other wiring.

Figure 3:
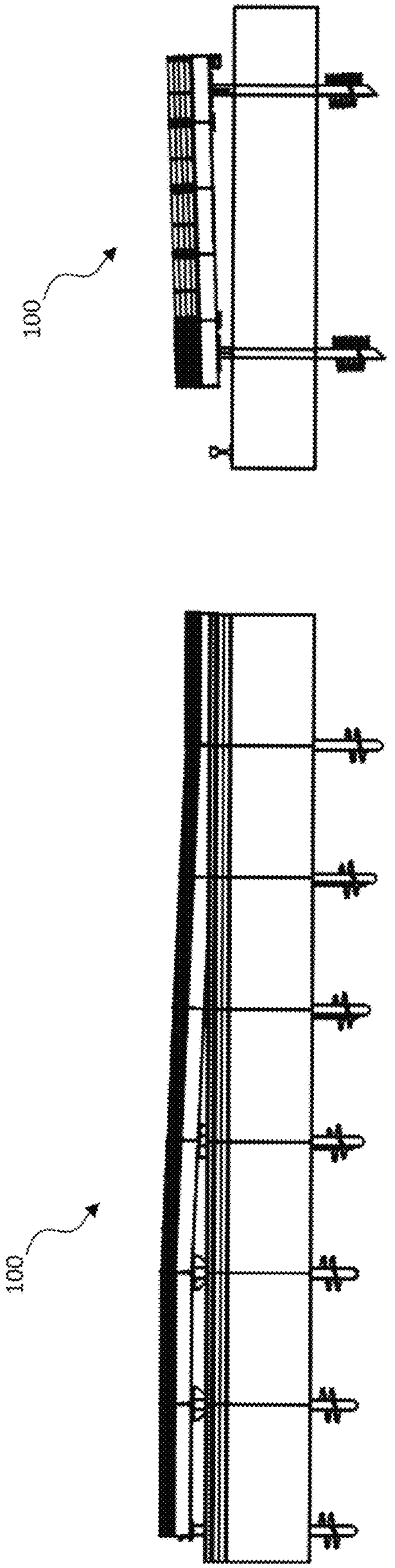
FIG. 3 includes front and side facing views of an embodiment of a modular assembly in accordance with the present disclosure.

FIG. 3 includes front and side facing views of an embodiment of a modular assembly 100. As seen in FIG. 3, the modular assembly 100 can be arranged on a surface with a non-constant grade. The shape of the base members, position of the piles, or the position of individual base members on the piles can be configured to accommodate the non-constant grade.

Piles can be used to anchor the structures into the ground and support the structure above the ground. In one embodiment, conventional foundation piles can be used, where a precast concrete pile or steel beam is driven into a soil bed. In other embodiments, a screw pile may be used to produce a deep foundation that can be installed quickly with minimal noise and vibration. For example, screw piles may be efficiently wound into the ground. This can provide for an efficient means of installation and coupled with their mechanism of dispersing load, may provide effective in-ground performance in a range of soils, including earthquake zones with liquefaction potential. Using this technique, the structures may be above a body of water. The ground may also include artificial supporting fillers, such as concrete. Such structures include buildings, bridges, ramps, decks, panels, platforms, and boardwalks.

Piles can also be installed by pre-drilling a hole in a soil bed using an auger and lowering a pre-molded pile into the hole. A hybrid system also exists between the driving and drilling methods whereby an open ended pile is driven into a soil bed, after which point the soil inside the pile is augured out and concrete is poured in the cavity formed therein. Cast-and-hole methods as well as caissons may also be used, specifically where there are concerns for preserving nearby buildings against the problems discussed above. A pile also can be attached to a drill head which is substantially larger than the diameter of the pile itself. The pile is turned together with the drill head by a drilling rig to create a passage in the soil bed through which the pile may pass. A conduit is provided through the center of the pile for water or grout to be pumped down and out the tip of the drill head to either float away debris or anchor the pile in its final resting place in the soil bed.

Figure 4:
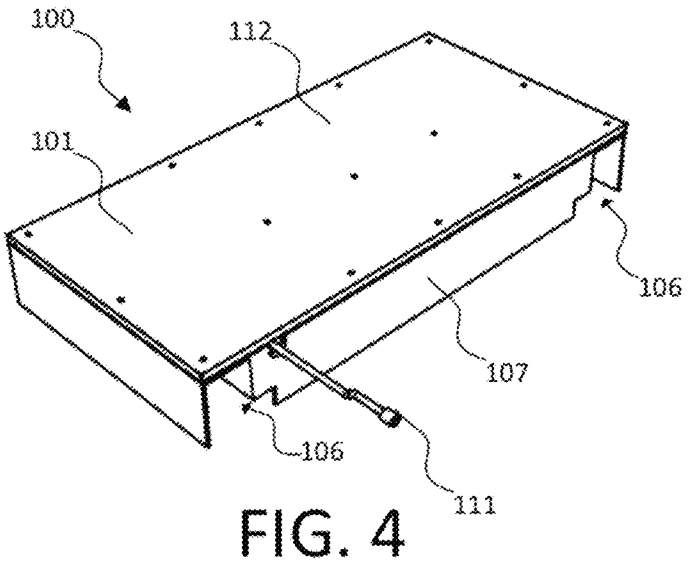
FIG. 4 is a perspective view of a modular assembly with a heater assembly in accordance with the present disclosure.
Figure 5:
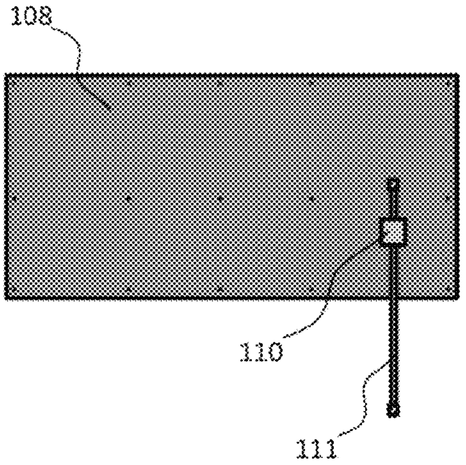
FIG. 5 is a top view of an embodiment of a heater assembly in accordance with the present disclosure.

FIGS. 4 and 5 depict an exemplary modular assembly 100 having a heater assembly 108. The heater assembly 108 can include, for example, an electric silicone heater. Other heaters can be used, including other thin sheet-type electrically powered heaters and heaters sandwiched by a composite material. The heater assembly 108 also can include an electric enclosure 110 and a power cable 111. Some embodiments may also include a grounding plate to avoid or minimize the danger of electrocution or fire in case of a failure of the heater assembly 108. The deck module (i.e., the bottom module) may include a textured top surface and/or may include graphics on the top surface.

Figure 6:
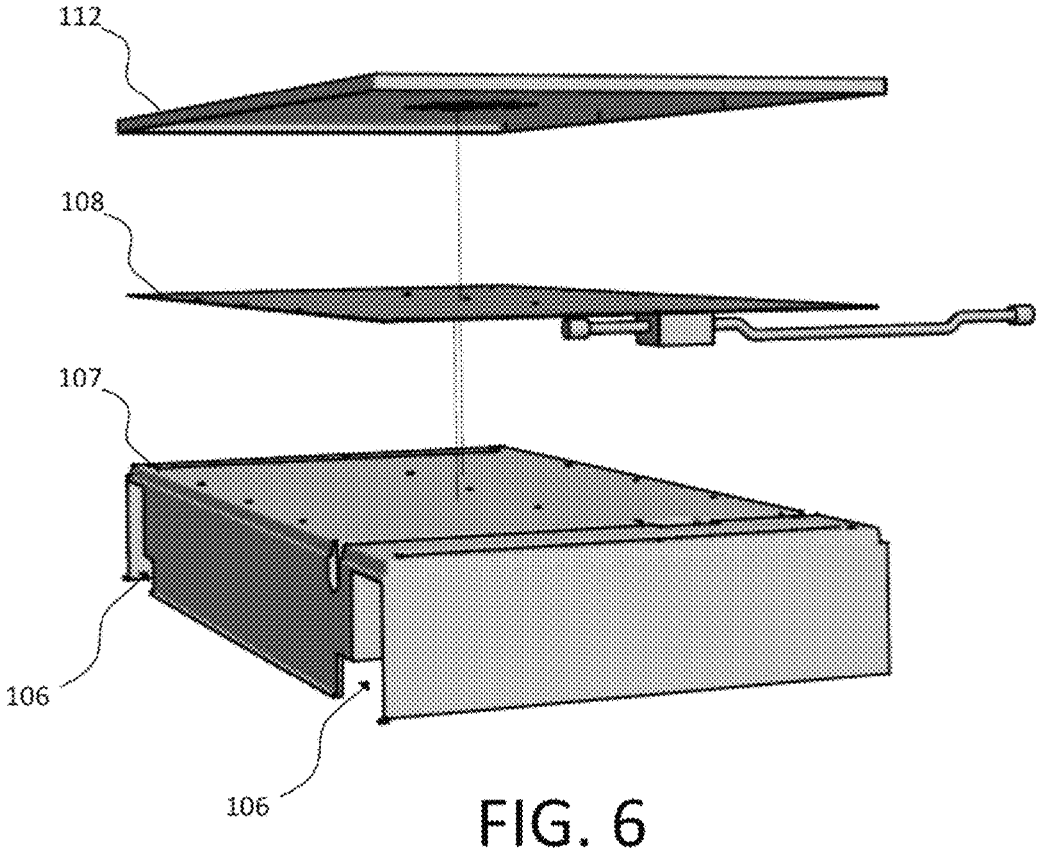
FIG. 6 is an exploded view of the embodiment of FIG. 4.
Figure 7:
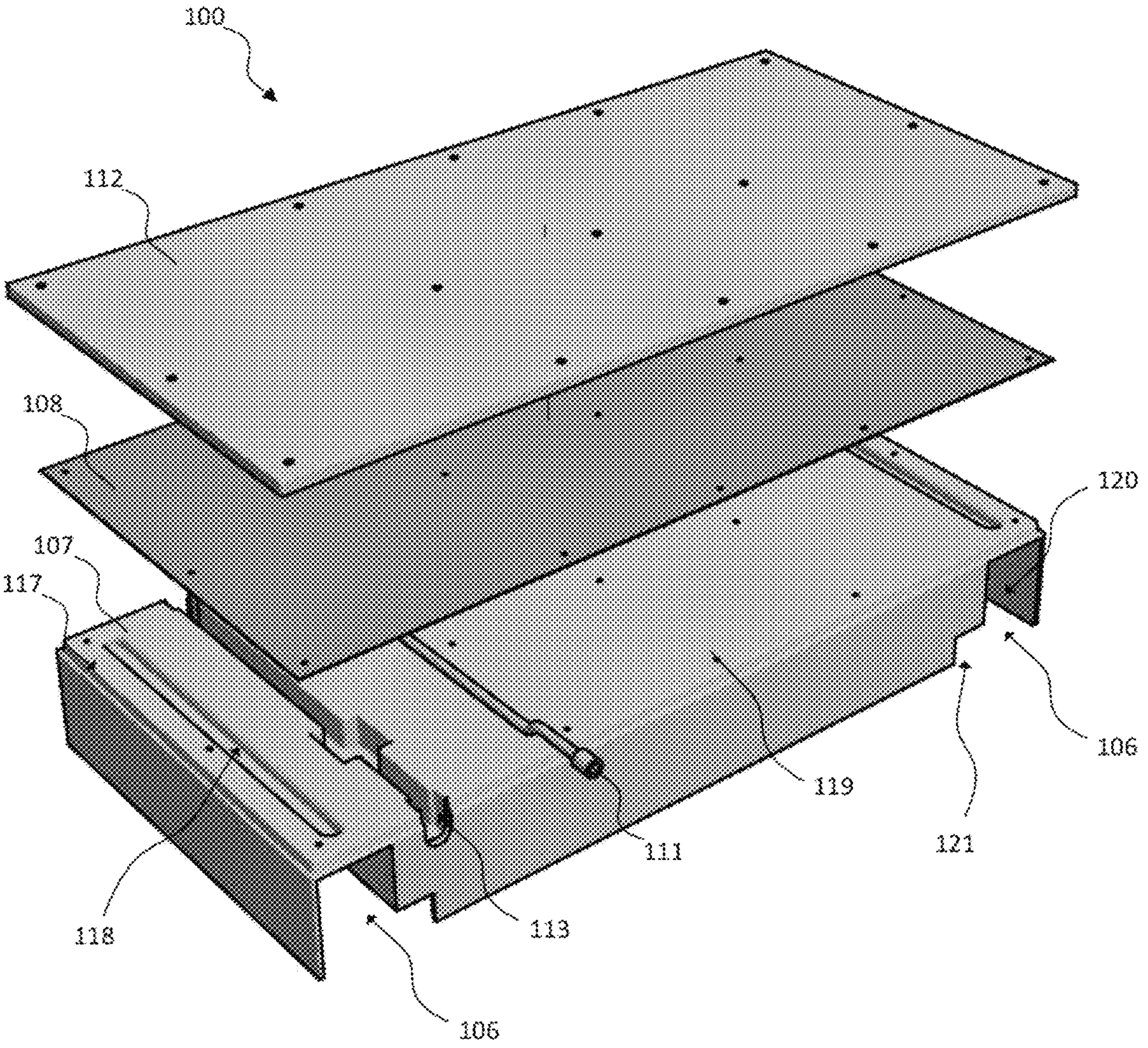
FIG. 7 is another exploded view of the embodiment of FIG. 4.

FIGS. 6 and 7 are exploded views of the embodiment of FIG. 4. The heater assembly 108 can be positioned between the surface panel 112 and the deck module 107. As can be seen in FIG. 7, the deck module 107 may include a cavity 113 that can accommodate, for example, the electric enclosure 110 and/or power cable 111. The deck module 107 and surface panel 112 may be fastened together, such as using bolts or screws. For example, fastener holes 119 (only one of which referred to in FIG. 7 for simplicity) can be used with the fasteners. In yet other embodiments, the surface panel 112 can be embedded or recessed into the deck module 107. Channels 106 can include a primary portion 120 and a secondary portion 121. The support member 105 may be positioned in the primary portion 120. One or more fasteners (not shown) may be positioned in groove 118 to connect the deck module 107 to the support member 105 and thereby allow the heater assembly 108 and/or surface panel 112 to rest flush against the deck module 107.

The base member 101 can include a coating that is configured to seal the heater assembly 108 between the deck module 107 and the surface panel 112. This can prevent moisture from impairing operation of the heater assembly 108. The coating may be continuous around the entire base member 101 where the deck module 107 and surface panel 112 meet. Seals or other devices also can be used to prevent the impact of moisture.

In an embodiment, the heater assembly 108 is in direct contact with the surface panel 112 to maximize heat transfer. In another embodiment, an adhesive or filler between the heater assembly 108 and the surface panel 112 is used to provide improved heat transfer.

The deck module 107 may be configured to direct heat toward the surface panel 112. This will preferentially direct heat from the heater assembly 108 toward the surface panel 112. A reflective surface and/or insulation may be used to direct heat away from the deck module 107.

In a particular embodiment, pre-molded insulation or foamed insulation can fill the open spaces of the base member 101, such as between the various internal cross support members of the deck module 107 or in other locations. The insulation precludes heat from the heater assembly 108 from escaping downwardly through the base member 101, thereby allowing for more efficient heating of the surface panel 112. The insulation can be either a low density type of foam or a high density type of foam (e.g., a structural foam) to provide additional structural support. Furthermore, a ceramic layer can be placed between the surface panel 112 and the deck module 107.

The surface panel 112 on top of the base member 101 may be made a suitable material such as a composite, polymer plastic material, vinyl, rubber, urethane, ceramic, glass reinforced plastic, concrete, or similar materials. The surface panel 112 may include visual indicators or designs (e.g. arrows, warnings, symbols, etc.), and/or graphics (text, logos, advertisements, etc.) thereon. The surface panel 112 may also include or be made of a luminescent material.

The surface panel 112 on top of the base member 101 may include any suitable polymer plastic material or fiberglass type material, and can include a heat conductive polymer material and/or a heat retentive polymer material. The surface panel 112 may also include a fire retardant. The surface panel 112 may be made according to known composite manufacturing methods, such as being made as a sheet molded compound (SMC), bulk molding composite (BMC), wet compression molding, injection molding, or the like. The heat conductive polymer material allows for quick conduction of heat from the heater assembly 108 through the surface panel 112 and to the exposed surface of the surface panel 112 to permit quick melting of snow and ice. The heat retentive polymer material can retain heat within the heater assembly 108 once the electrical power to the heater assembly 108 has been turned off, thereby allowing for a longer cycle time until electrical power needs to be applied again to retain sufficient heat to melt snow and ice. It is also possible to include small stones, or the like, in the polymer material in order to preclude wearing of the surface panel 112. It should be noted that small stones, aluminum oxide, silica sand, or the like, cannot be included if the surface panel 112 is formed via a compression molding method. It should also be noted that fillers such as the heat conductive polymer material and the heat retentive polymer material may degrade the UV resistance of the resin used to form the surface panel 112. Accordingly, a UV resistant coating can be sprayed on top of the surface panel 112.

A slip-resistant coating may be added to the surface panel 112. The slip resistant coating can be of a non-slip monolithic walking surface. The slip-resistant coating can be resistant to the effects of ultraviolet radiation, temperature changes, and/or corrosive elements such as acids, alkalis, salts, phosphates, organic chemicals, and solvents such as mineral spirits, or gasoline. It also may be sufficiently hard to protect against abrasion, chipping, scratching, or marring. Alternatively, or additionally, an additional structure may be attached to the surface panel, or serve as the surface panel. For example, a concrete layer (e.g. paver) or tile (e.g. porcelain) can be added to the surface panel 112.

Selective heating of the individual base members 101 is possible. For example, base members 101 under a roof may not be heated as much as those not under a roof that may be exposed to snow. In a modular assembly 100, some base members 101 may be heated (sequentially or simultaneously) while other base members 101 are not heated. Selective heating of the base members 101 can also be performed based on one or more sensors embedded within and/or attached to the assembly. Alternatively or additionally, one or more sensors may be located remote from the assembly 100 for the purposes of making a determination to selectively heat base members 101. For example, the one or more sensors can include moisture, temperature, wind, pressure, or the like. Based on information from the one or more sensors (e.g. a determination of snow, ice, or similar precipitation), a controller can be used to automatically heat one or more of the base members 101. This can save on heating costs or can focus heating on areas prone to snow or ice.

Selective heating of the modular assembly 100 also is possible. The timing, duration, and extent of heating can vary for a particular modular assembly 100 placement or design.

Selective heating may use a controller in electrical communication with one or more heater assemblies 108. The controller can be configured to activate, deactivate, and/or change heat settings for individual heaters in the structure assembly 100. The controller can be activated and monitored remotely by Wi-Fi internet communications or cellular network.

Figure 8:
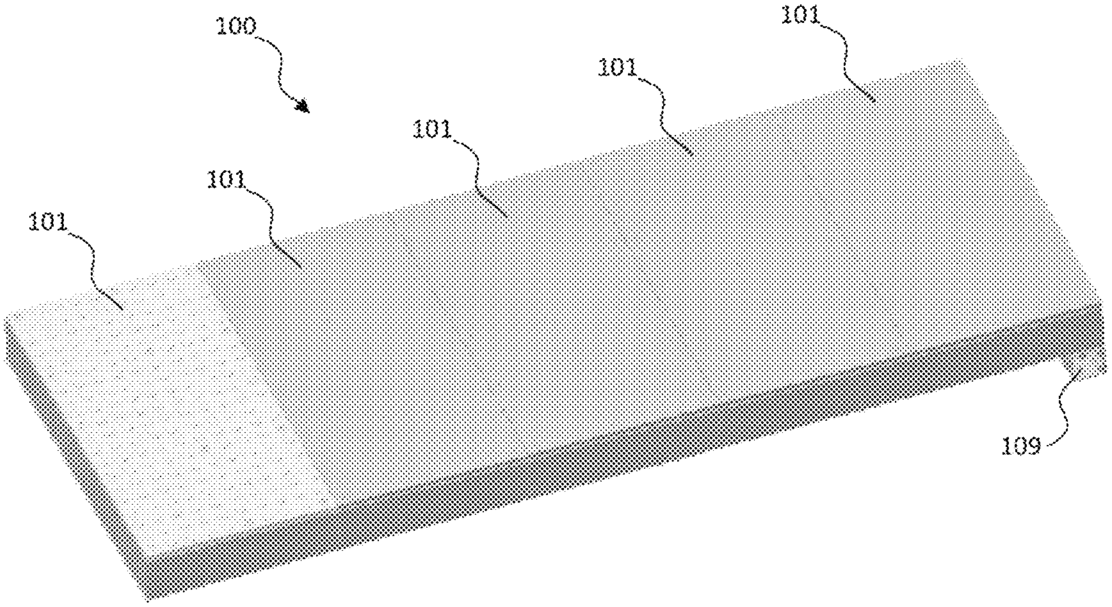
FIG. 8 is a top perspective view of an embodiment of a modular assembly in accordance with the present disclosure.
Figure 9:
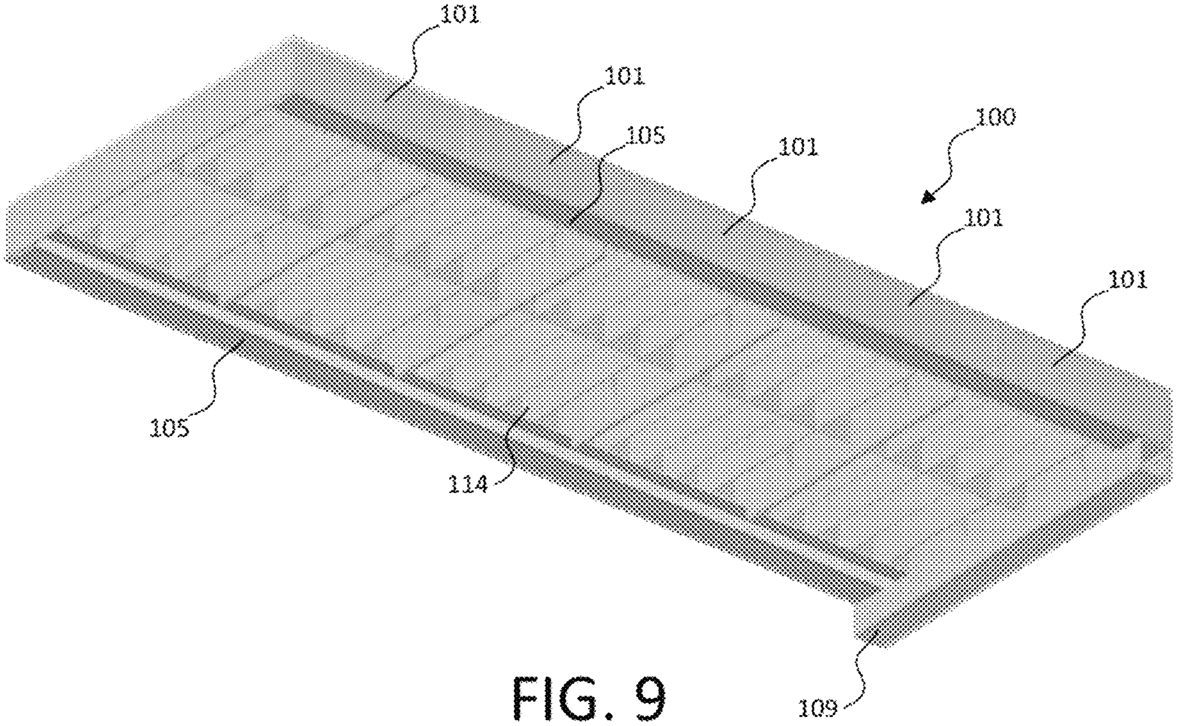
FIG. 9 is a bottom perspective view of an embodiment of a modular assembly in accordance with the present disclosure.

FIG. 8 is a top perspective view of an embodiment of a modular assembly 100 and FIG. 9 is a bottom perspective view of an embodiment of a modular assembly 100. As can be seen in FIG. 9, the bottom of each of the base members 101 can include support ribs 114. The support ribs 114 can provide strength to the base member 101 while providing reduced weight. The support ribs 114 can be in a grid pattern or in other patterns.

The base members 101 can include interlocking mechanisms to fix adjoining base members 101. In one example, the interlocking mechanisms can be tongue and groove designs or other designs. For example, as seen in FIG. 7, the grooves 117 on the edges of the base members 101 can be used as part of an interlocking mechanism. Other shapes of the groove 117 are possible, such as a groove that is positioned over less of the edge of the base member. Multiple interlocking mechanisms also may be used on a single edge of a base member 101, such as including multiple tongue and groove interlocking mechanisms. The interlocking mechanism, such as the groove 117 of a tongue and groove interlocking mechanism, can include a seal to provide a seamless connection between base members 101 and/or to prevent moisture or other materials from falling between the base members 101.

Interlocking mechanisms, such as using one or more tongue and grooves on an edge of a base member 101, can be configured to enable a modular assembly 100 with a surface that includes a non-constant grade. For example, the modular assembly 100 of FIG. 3 can use interlocking mechanisms that are configured to allow for the intersections that provide the non-constant grade. The surfaces of the base members 101 also can be shaped to allow for the intersections that provide the non-constant grade.

Parts of the base members 101 can be made by a compression molding process or method, such as sheet molded compound (SMC) or wet compression molding. Parts of the base members 101 also can be made by pultrusion, hand lay-up, or other suitable methods including resin transfer molding (RTM), vacuum curing and filament winding, automated layup methods, or other methods.

Embodiments of the modular assembly disclosed herein can be assembled in the field or prefabricated. A prefabricated modular assembly may the provided with multiple base members attached to a support member. Thus, a prefabricated base member unit may be provided.

Figure 10:
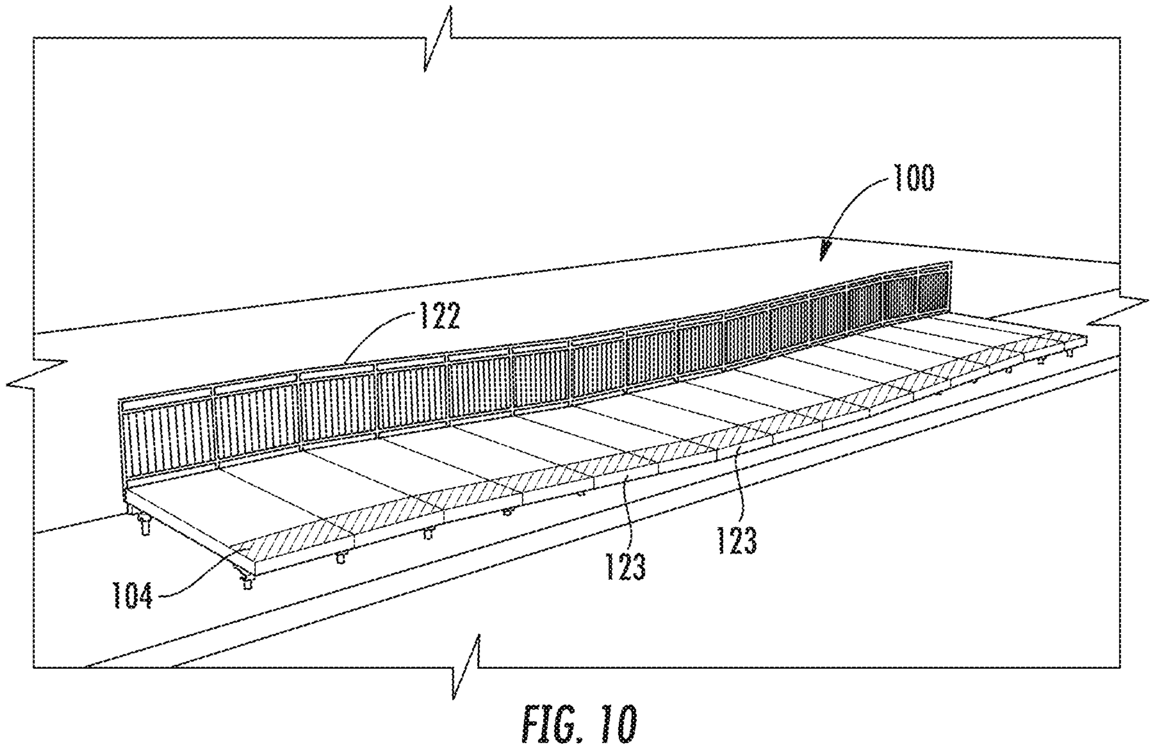
FIG. 10 is a view of an embodiment of a modular assembly.

FIG. 10 is a view of an embodiment of a modular assembly 100 that has been assembled. As seen in FIG. 10, the modular assembly 100 changes elevation and includes a railing 122 and a textured (e.g. tactile) surface 104. The textured surface 104 may be warning tiles. Additional tiles (e.g., armored tiles) may be positioned at the platform edge. In an embodiment, no excavation, wood header, backfilling, or maintenance related to the wood header or asphalt is required. Construction time may be faster than traditional techniques and a snow melt system can be integrated into some or all of the platform.

Figure 11:
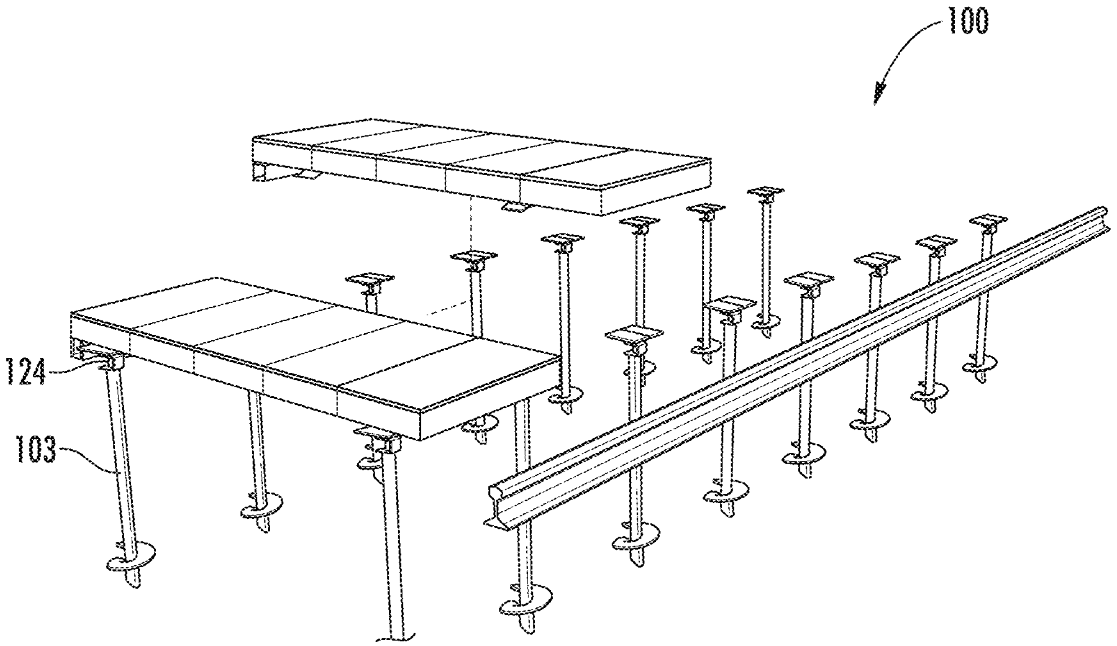
FIG. 11 is an exploded view of a modular assembly on helical piles.
Figure 12:
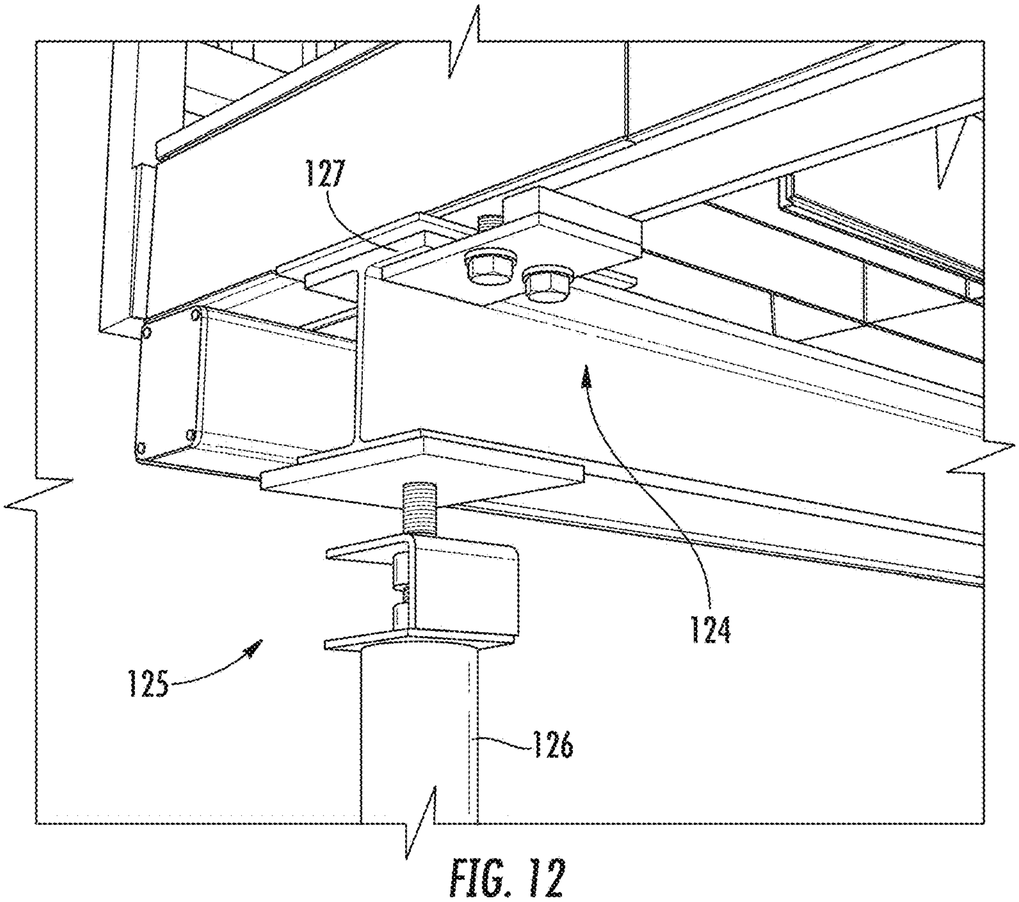
FIG. 12 illustrates a clamp connection to an I-beam.
Figure 13:
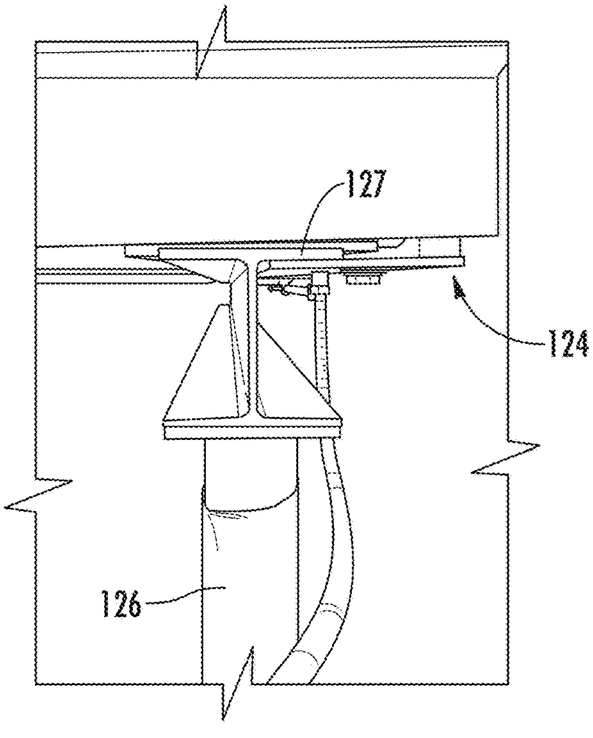
FIG. 13 illustrates a second clamp connection to an I-beam.
Figure 14:
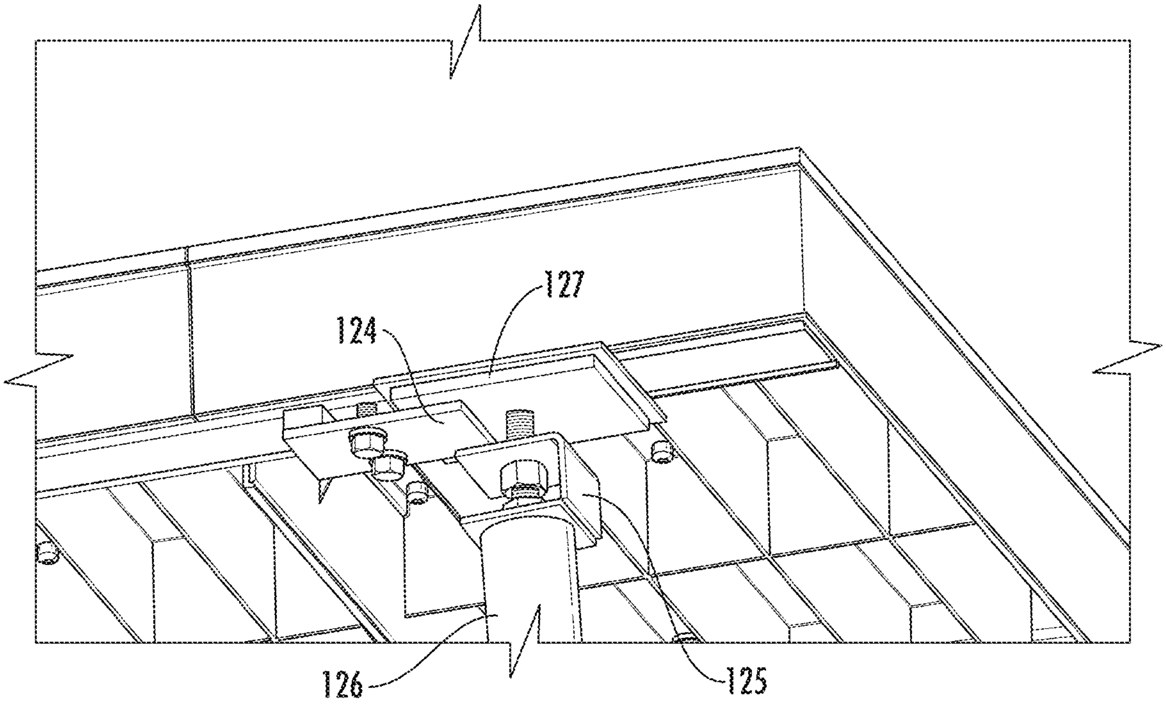
FIG. 14-15 illustrate a leveling mechanism.
Figure 15:
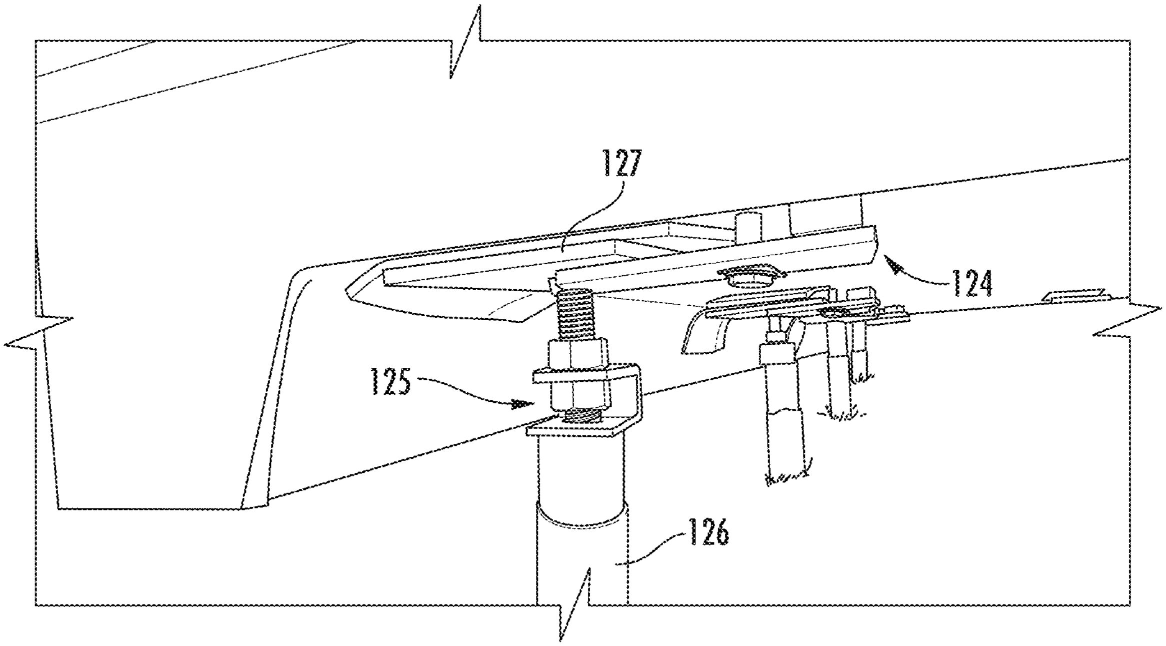

FIG. 11 is an exploded view of a modular assembly 100 on helical piles 103. Helical piles 103 enable a wide range of soil and load applications. Load capacity can be based on torque achieved at installation. An optional height adjustable bearing plate can be included to allow flexibility. For example, a portion of the helical pile 103, and or the mounting bracket 124 may be threaded for the purposes of adjusting the height of the assembly 100.

FIGS. 12-15 illustrate an exemplary mounting bracket 124 and leveling mechanism 125. The mounting bracket 124 can be embodied as a clamp, which fastens a lower support structure 126 to the support member 105. As an example, the mounting bracket 124 can clamp a metal plate 127 of a lower support structure 126, such as a helical pile and/or an I-beam, to the support member 105.

A leveling mechanism 125 can be provided to account for differences in height between the lower support structure (e.g. helical pile) and the support members 105 and/or I-beam. In one example, the leveling mechanism 125 is a threaded connection element of a bearing plate, which allows for in-field adjustment of the height of the helical pile.

Figure 16:
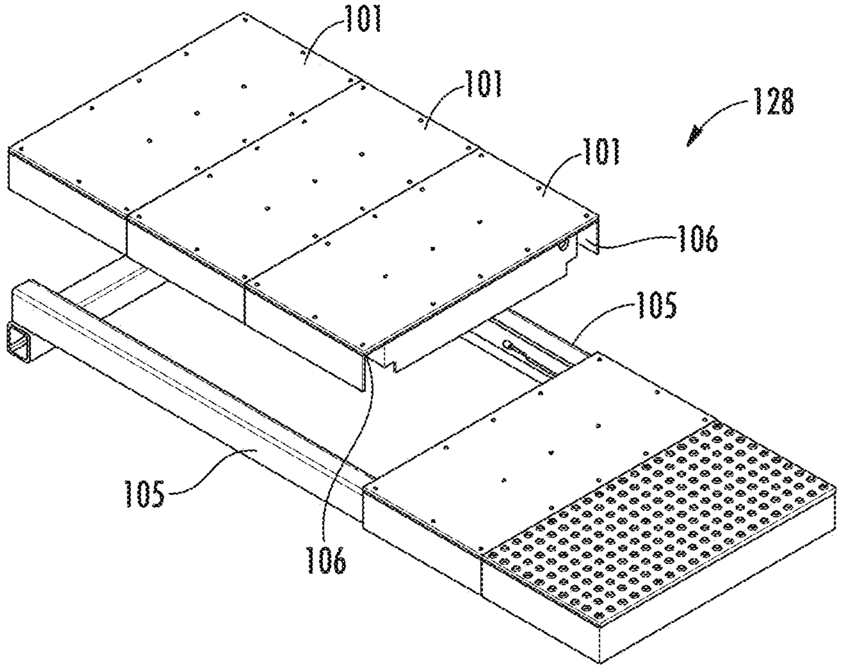
FIG. 16 is a partially exploded view of a base member unit.
Figure 17:
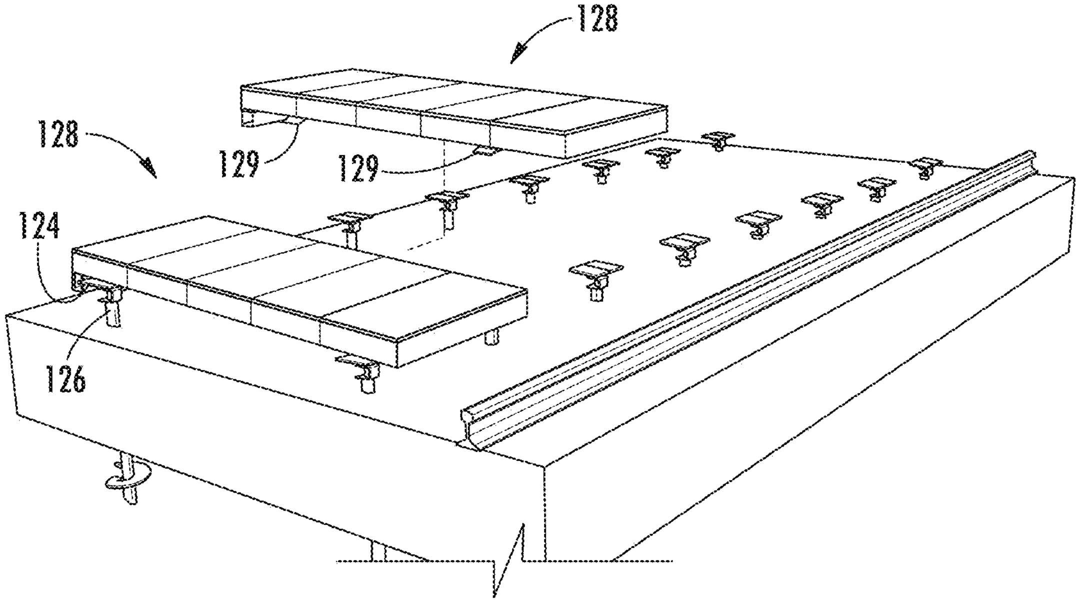
FIG. 17 depicts installation of a modular assembly.

FIGS. 16-17 illustrate installation of a base member to produce a modular assembly 100. A plurality of base members 101 can be positioned on support members 105. Each of the plurality of support members 105 can extend across the plurality of base members 101 and be disposed within the channels 106 of the plurality of base members 101. The base members 101 may be fixed to the support members 105, for example, via fasteners (not shown) to produce a base member unit 128. Each base member unit 128 can be attached to a lower support structure 126, such as a helical pile or an I-beam, for example, by a mounting bracket 124.

As shown in FIG. 17, each base member unit 128 can include one or more alignment plates 129 in order to mechanically join and/or align a base member unit 128 to an adjacent base member unit 128. The alignment plate 129 can form a joint, for example, a shiplap joint. It is alternatively contemplated that adjoining base member units 128 not be mechanically joined, or be fastened together.

Figure 18:
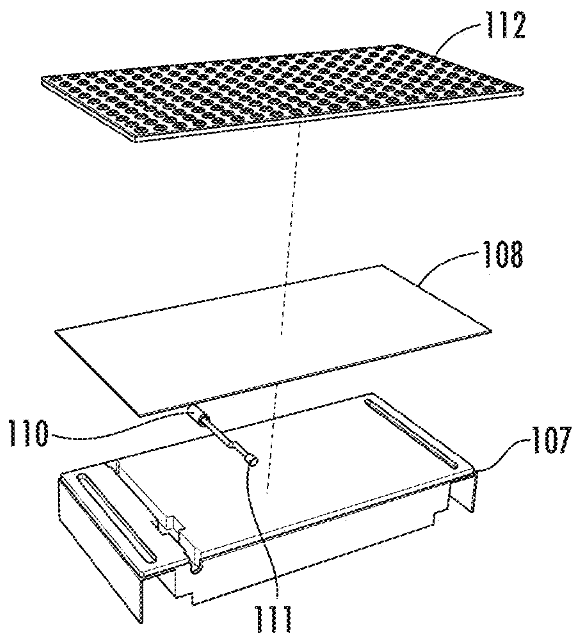
FIG. 18 illustrates the process of accessing a heater assembly.

FIG. 18 illustrates the process of accessing a heater assembly 108 and its related components. Specifically, the surface panel 112 may be removed from the deck module 107. The heater assembly 108, electric enclosure 110, and power cable 111 can be accessed for installation of the heater positioned between the surface panel 112 and the deck module 107.

Figure 19:
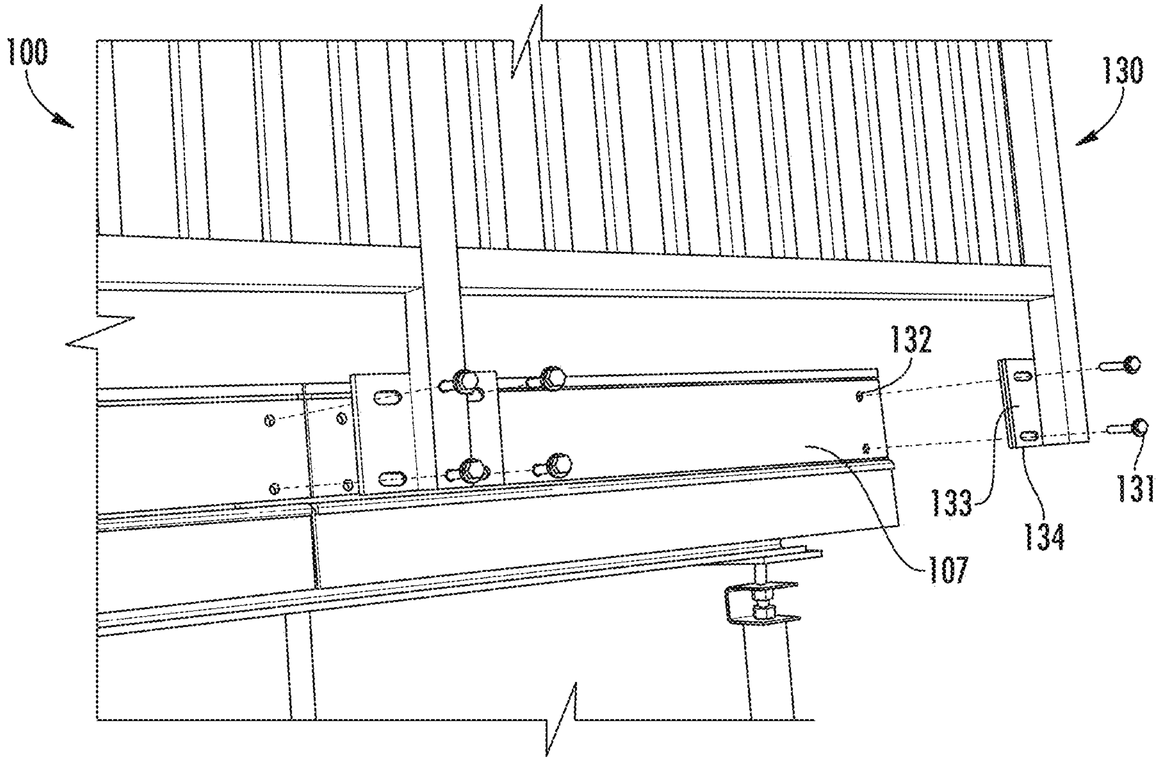
FIGS. 19-20 depicts a railing connection.
Figure 20:
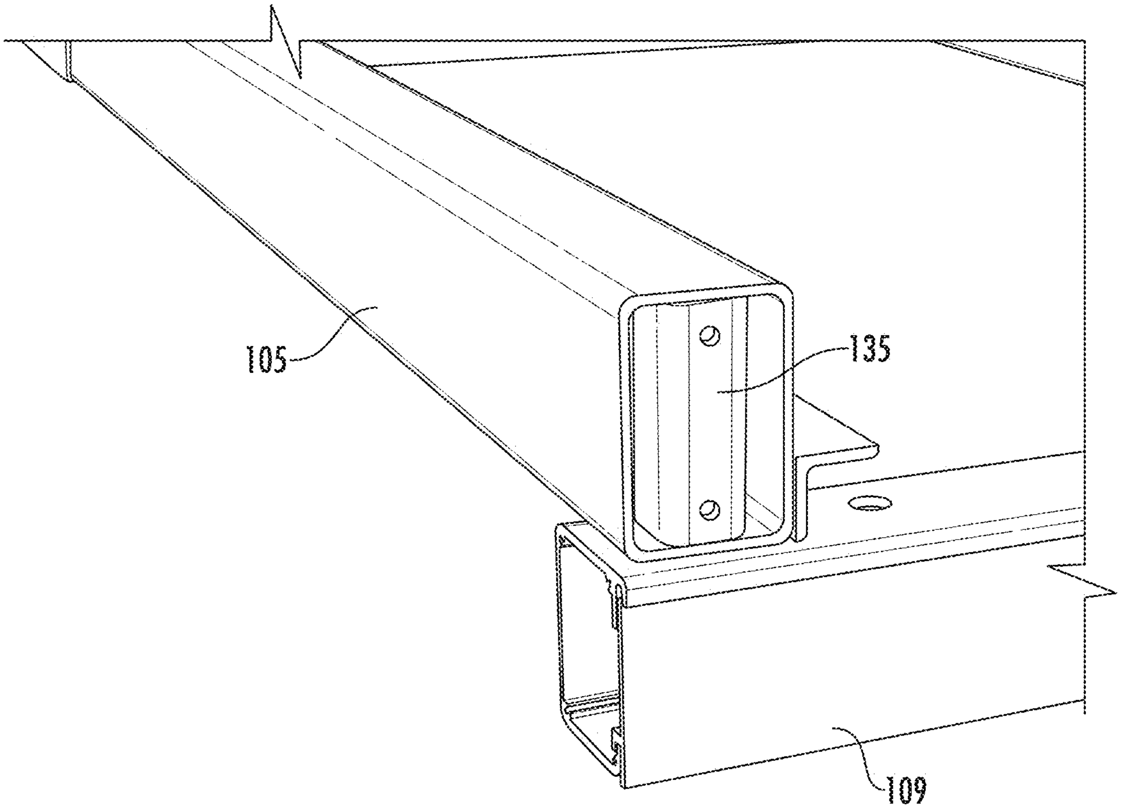

FIGS. 19-20 illustrate the modular assembly 100 receiving a fastened structural element 130, such as a railing connection. According to an embodiment the structural element 130 can be fastened to the support members 105 through the deck module 107. For example, fasteners 131 can pass through apertures 132 in the deck module 107 to fasten the structural element 130 (railing) to the modular assembly 100. The structural element 130 can include a receiving plate 133, including apertures 134, for affixing the structural element 130 to the modular assembly 100. The support member 105 may directly receive the fasteners 131, for example, via a support member receiving plate 135. The support member 105 may also support other structural elements, such as wiring raceway 109, which can be fastened or affixed to a bottom portion of the support member 105. Other examples of fastened elements 130 can include structures or fixtures, such as posts, signage, windbreaks, and the like.

Figure 21:
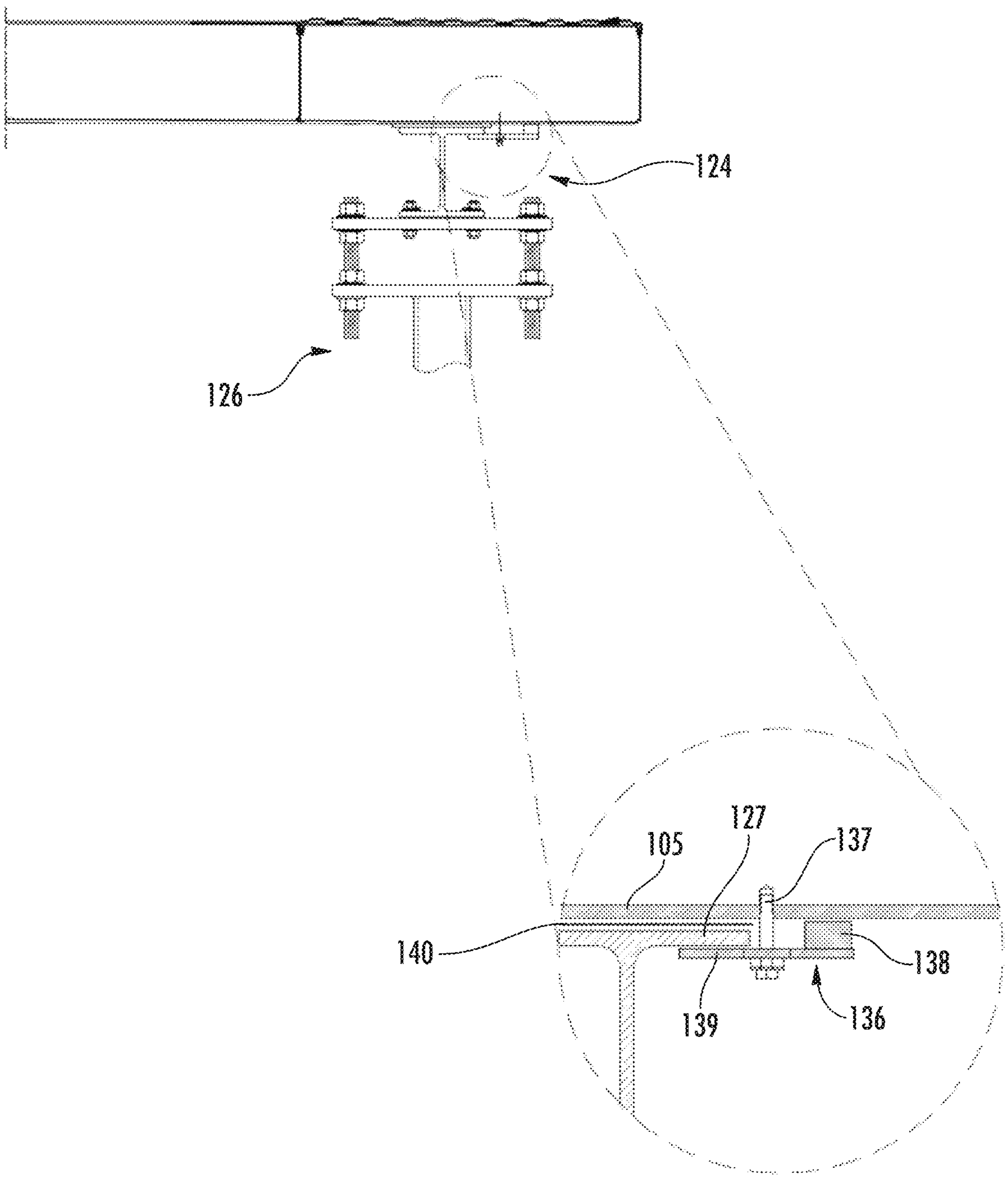
FIG. 21 illustrates another embodiment of a mounting bracket and leveling mechanism.

FIG. 21 illustrates another embodiment of a mounting bracket 124 and leveling mechanism 125. The mounting bracket 124 can include a jaw 136 and a fastener 137. The jaw 136 can have a fulcrum 138 and a bracket 139. The space between the bracket 139 and the support member 105 can define a space for clamping the support member 105 to a metal plate 127 of a lower support structure 126. As an example, the metal plate 127 can be an upper flange of an I-beam or a place attached to a pile. The jaw 136 can be made of a galvanized metal, and be sized 6"×4"×3/16". The fastener 137 can be a stainless steel epoxy coated bolt that extends from the bracket 139 of the jaw 136 through the support member 105. A bearing pad 140, such as a 1/8" neoprene bearing pad, can be positioned between the metal plate 127 and the support member 105.

Figure 22A:
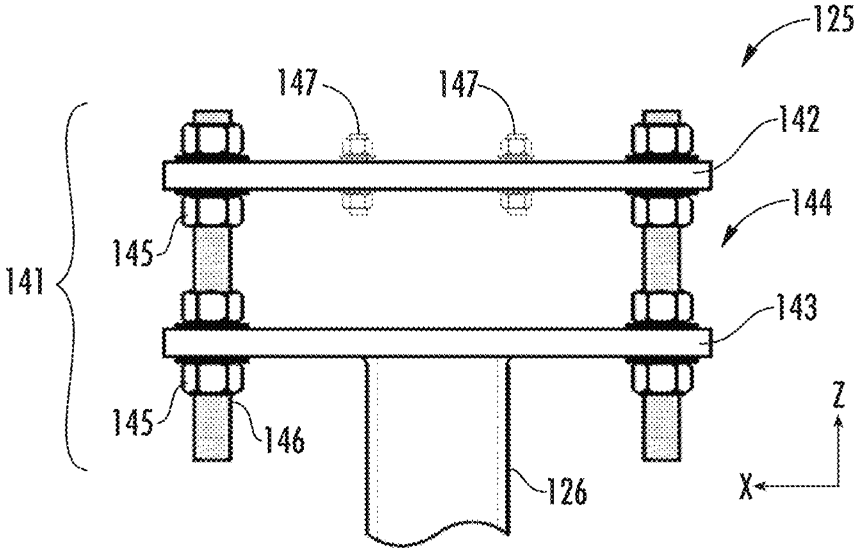
FIGS. 22*a*-22*c* are additional views of a leveling mechanism.
Figure 22B:
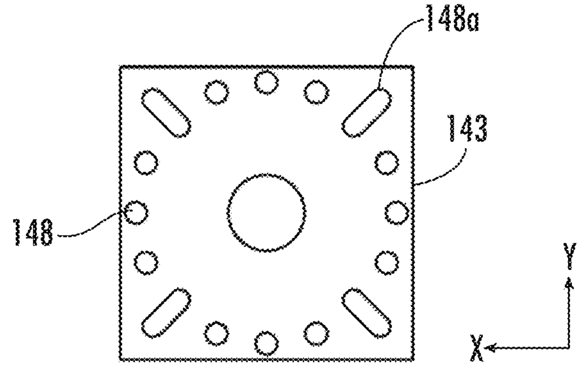
Figure 22C:
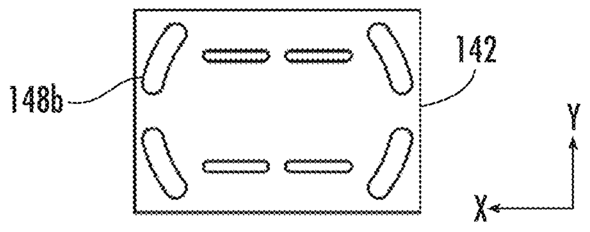

FIGS. 22*a*-22C provide additional views of a leveling mechanism 125 according to an embodiment of the present disclosure. FIG. 22*a* is a side view of a leveling mechanism 125, which includes an adjustment feature 141 for adjusting the height and position of an upper support surface 142 relative to a lower support surface 143. In one example, the lower support surface 143 is fixed to a lower support structure 126 (e.g. by welding to a pile, post, or other support surface) and the upper support surface 142 can be adjusted by adjusting one or more adjustment features of the leveling mechanism. The one or more adjustment features 141 may include a plurality of mechanical elements, such as fasteners, which extend between the upper support surface 142 and the lower support surface 143. In one particular embodiment, the plurality of mechanical elements may be threaded bolts 144. The vertical distance between the upper support surface 142 and the lower support surface 143 can be adjusted by moving a support element 145 of the adjustment features 141 that support the upper support surface 142 and lower support surface 143. In one example, the support element 145 is a threaded nut that threadably attaches to a threaded base 146 of a fastener 144. Rotating the nuts can move the nuts relative to the base to adjust the vertical position of the support surface being supported by the nut. Additional fasteners 147 can be provided on the upper support surface 142 for fastening the base members to the lower support structure. For example, the upper support surface 142 may be fastened to an I-beam that is, in turn, clamped to a mounting bracket 124 of the assembly as previously described.

FIGS. 22*b*-22*c* are top views of an exemplary upper support surface 142 and lower support surface 143, which can be embodied as plates having a plurality of apertures 148. The apertures 148 may receive the plurality of mechanical elements (e.g. bolts 144). The apertures 148 may be elongated (e.g. aperture 148*a*) to allow a mechanical element to move relative to the support surface to adjust a horizontal position of the support surface. Similarly, the apertures 148 may be elongated and curved (e.g. aperture 148*b*) for the purposes rotating the support surface relative to the mechanical element. In the depicted examples, the lower support surface 143 includes elongated apertures 148*a* and the upper support surface 142 includes elongated and curved apertures 148*b*. The upper support surface 142 and lower support surface 143 may be plates, and be made of a metal. The upper support surface 142 and lower support surface 143 may be made of different sized and/or shaped plates. In one particular example, the upper support surface 142 is a 15.5"×11"×3/4" metal plate and the lower support surface 143 is a 15.5"×15.5"×3/4" metal plate.

The leveling mechanism 125 may be used to accommodate spatial differences between the lower support structure 126 (e.g. helical pile) and the support members 105 and/or I-beam. For example, the leveling mechanism 125 may be used to accommodate spatial differences across the longitudinal axis X, lateral axis Y, and/or vertical axis Z. The leveling mechanism 125 may also be used to accommodate rotational differences (e.g. yaw) between the lower support structure 126 and the support members 105. This can be particularly advantageous for situations where the lower support structure 126 cannot precisely be positioned to an acceptable level of accuracy. For example, piles (e.g. a helical pile) can quickly and efficiently produce a lower support structure 126, but positional accuracy of the piles can be difficult to ensure in the field. The leveling mechanisms 125 described herein can accommodate for spatial inaccuracies in an efficient manner. For example, the leveling mechanisms 125 can be adjusted quickly and easily on-site, without the need for more costly or difficult assembly procedures.

Figure 23:
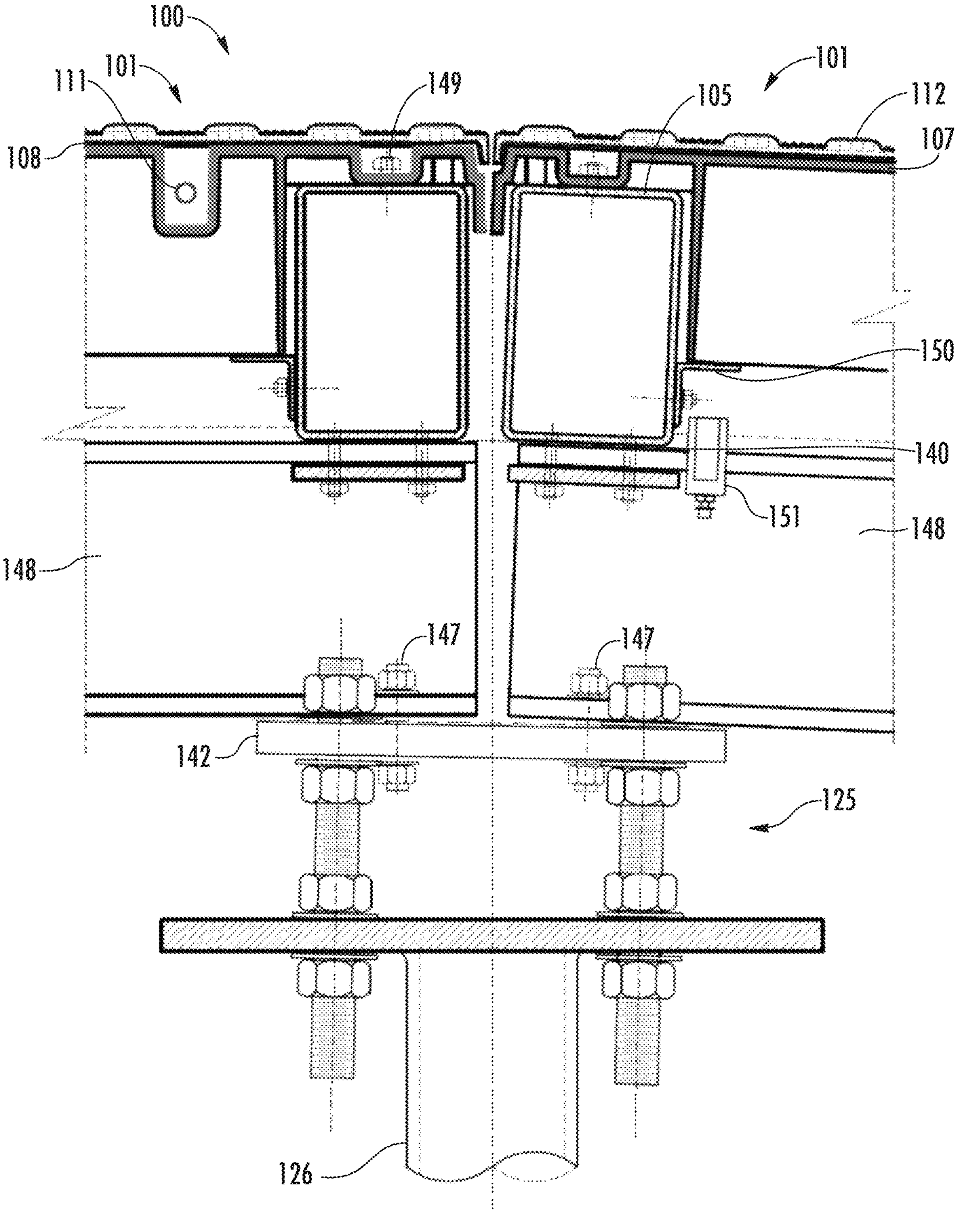
FIGS. 23-24 are cross-sectional views of a modular assembly.

FIG. 23 is a cross-sectional view of a modular assembly 100 where adjoining base members 101 are angled relative to one another to adjust the pitch of a platform created by the base members. Depending on the ultimate application of the modular assembly 100, it may be desired to adjust the pitch so that portions of the platform meet certain height or positional requirements. For example, the pitch may need to be adjusted to meet a train platform crossing, to meet an adjoining structure, or the like. With reference to FIG. 23, the angle of a fastened support member (e.g. support member 105 and/or I-beam 148) can be adjusted by adjusting fasteners 147 and/or shimming (e.g. with a bearing pad). It is also contemplated that an upper support surface 142 can be angled (not shown) to accommodate an angled support member 105 and/or I-beam 148.

FIG. 23 also shows a modular assembly 100 having base members 101 that include a tactile surface panel 112, a heater assembly 108, a power cable 111 for powering the heater assembly 108, and a deck module 107. Each deck module 107 is fastened to a support member 105 via fasteners 149. An additional support angle 150 can be provided to support a rib 114 of the deck module 107 relative to the support member 105. A mounting bracket 124 can clamp the support member 105 to a lower support structure, such as an I-beam 148. In this way, a mechanical connection can be made without welding and/or without a fastener that extends through the lower support structure. A bearing pad 140 may be provided between the I-beam 148 and the support member 105. A retainer clamp 151 can be provided to temporarily retain the support member 105 relative to the I-beam 148 before the mounting bracket 124 is clamped into position. The retainer clamp 151 can thereby avoid sliding of the support member 105 relative to the I-beam 148. This can be useful during assembly where the base members 101 are not level (e.g. pitched).

The I-beam 148 can be fastened via fasteners 147 to the upper support surface 142 of a leveling mechanism 125. The leveling mechanism can include a lower support surface 143 fixed (e.g. via welding) to a lower support structure 126. The lower support structure can include a pile, such a 4" in diameter pier.

Figure 24:
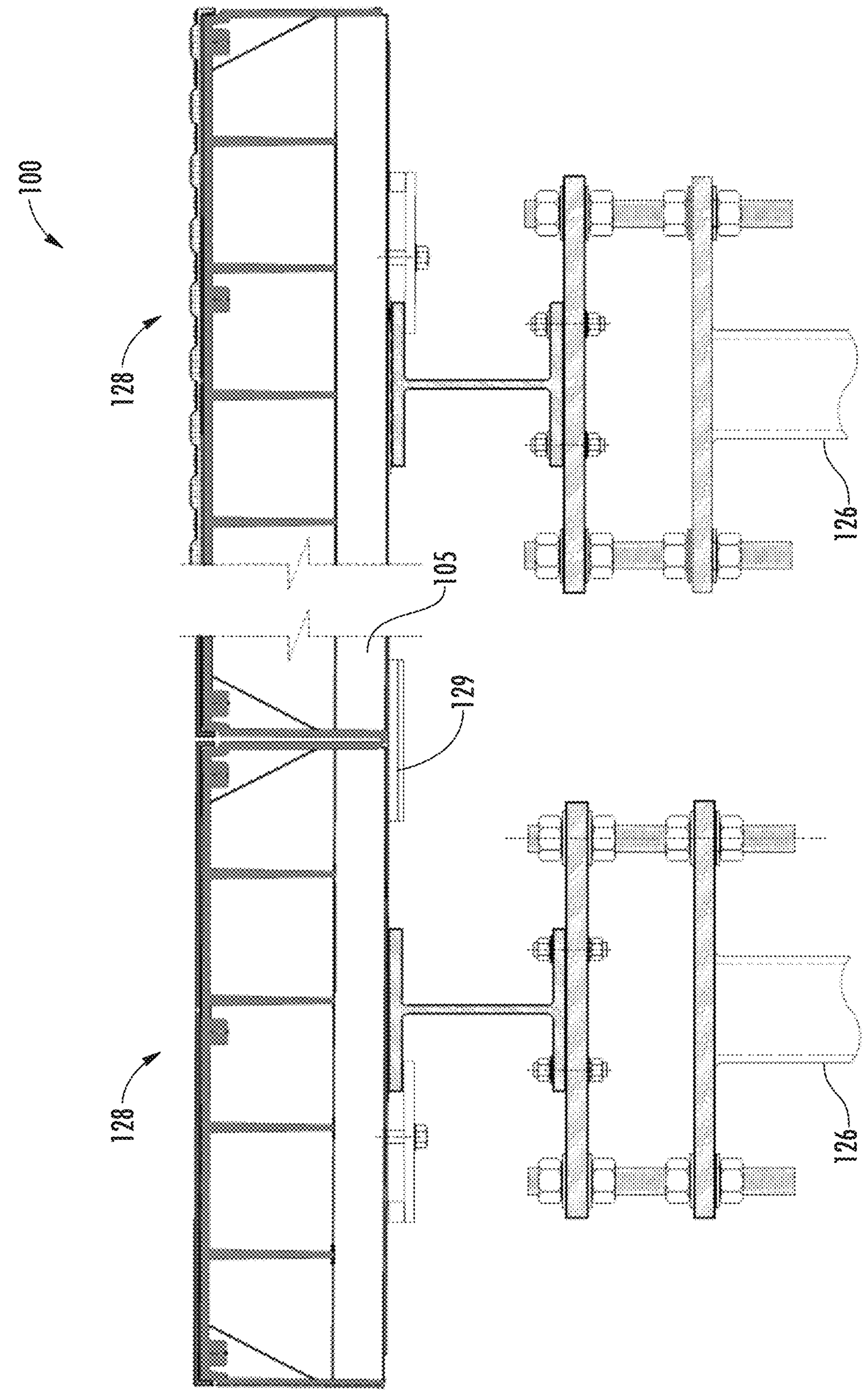
Figure 25A:
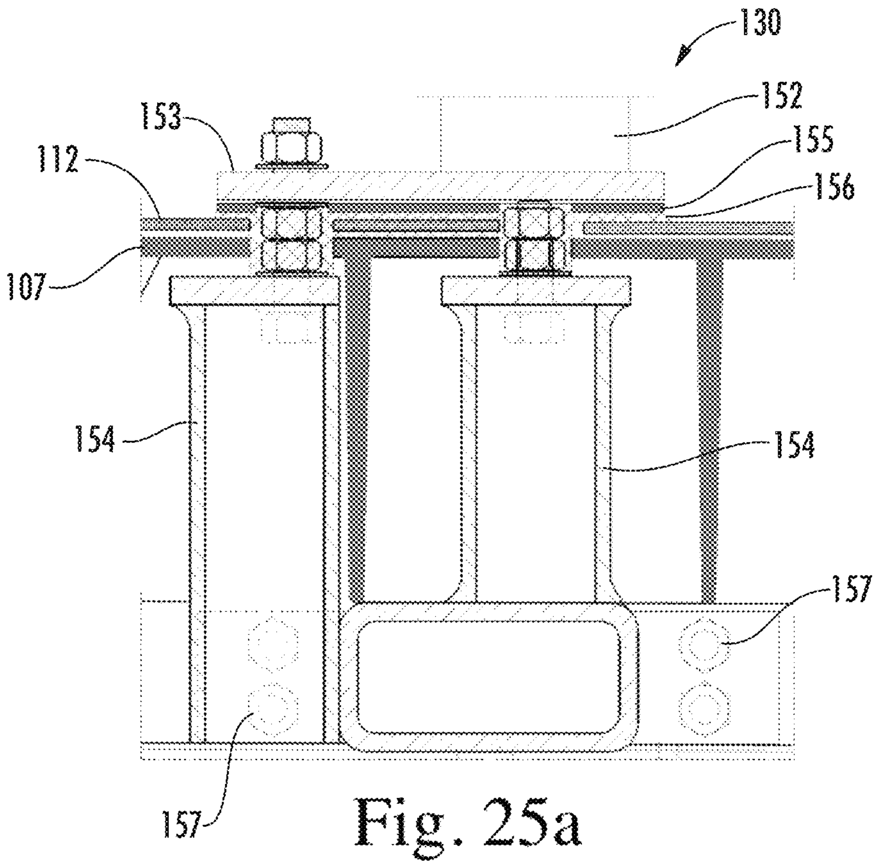
FIGS. 25*a*-25*b* are cross-sectional views illustrating an above-surface structure connected to the modular assembly.
Figure 25B:
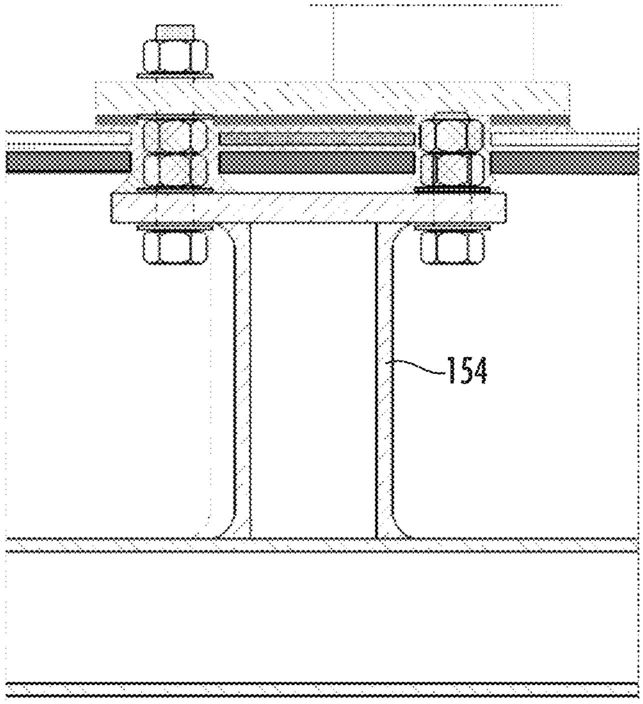

FIG. 24 is a cross-sectional view of a modular assembly 100, including a plurality of base member units 128 respectively supported by support structures 126. Each adjacent base member unit 128 may be mechanically interlocked with one another, for example, by adjoining respective alignment plates 129. The alignment plates 129 may be fixed to the support member 105 an can produce a mechanical lock that can hold adjacent base members 101 relative to one another. Although the alignment plates 129 can be additionally fastened or welded to one another, it is contemplated that the alignment plates 129 can mate with one another without fastening or welding.

FIGS. **25*a*-25*b* illustrate an above-surface structural element 130 (e.g. structure, fixture, post, signage, or the like) affixed to the modular assembly 100. The structural element 130 can include a vertical structure 152, and a base plate 153. The base plate 153 can be fastened through a surface panel 112 and deck module 107 to a lower support structure 154 via fasteners. A layer of fiberglass 155 and/or a sealant 156 can be applied between the base plate 153 and the surface panel 112. The lower support structure 154 can be affixed to an I-beam and/or support member 105 (not shown), for example via fasteners 157**.

Figure 26:
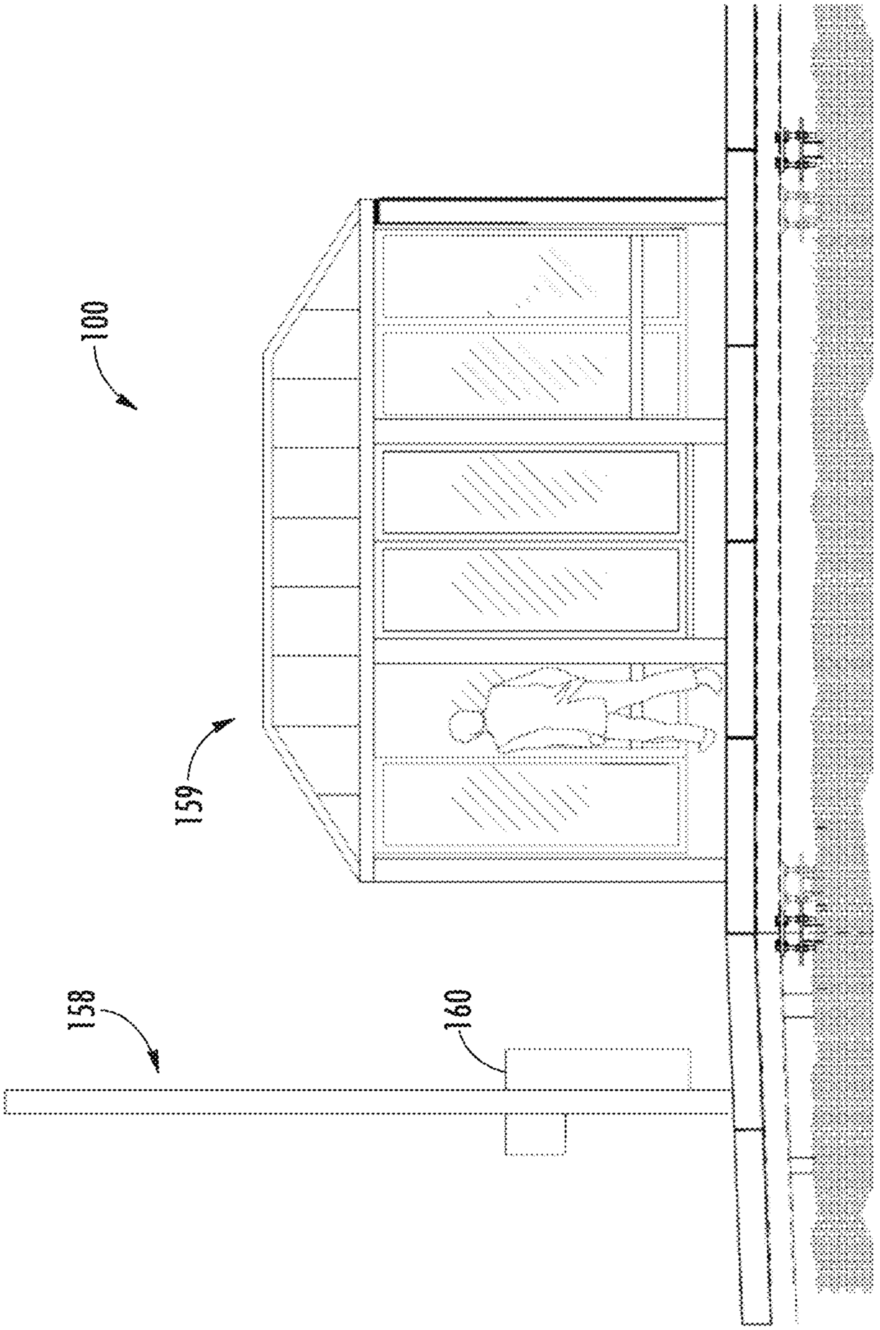
FIG. 26 is an elevation view of a modular assembly having above-surface structures affixed-thereto.

FIG. 26 depicts a modular assembly 100 with exemplary above-surface structural elements 130. Specifically, the modular assembly 100 includes a post 158 and a windbreak 159. The post 158 can be used to hold lighting, sensors, signage, electrical panels, or the like. In one particular example, the post 158 can include a sensor array (not shown) with weather sensors (e.g. wind, temperature, moisture) and an electrical panel 160. The sensor array can be used to control a heater assembly (not shown) disposed in the modular assembly 100 as previously described.

Figure 27:
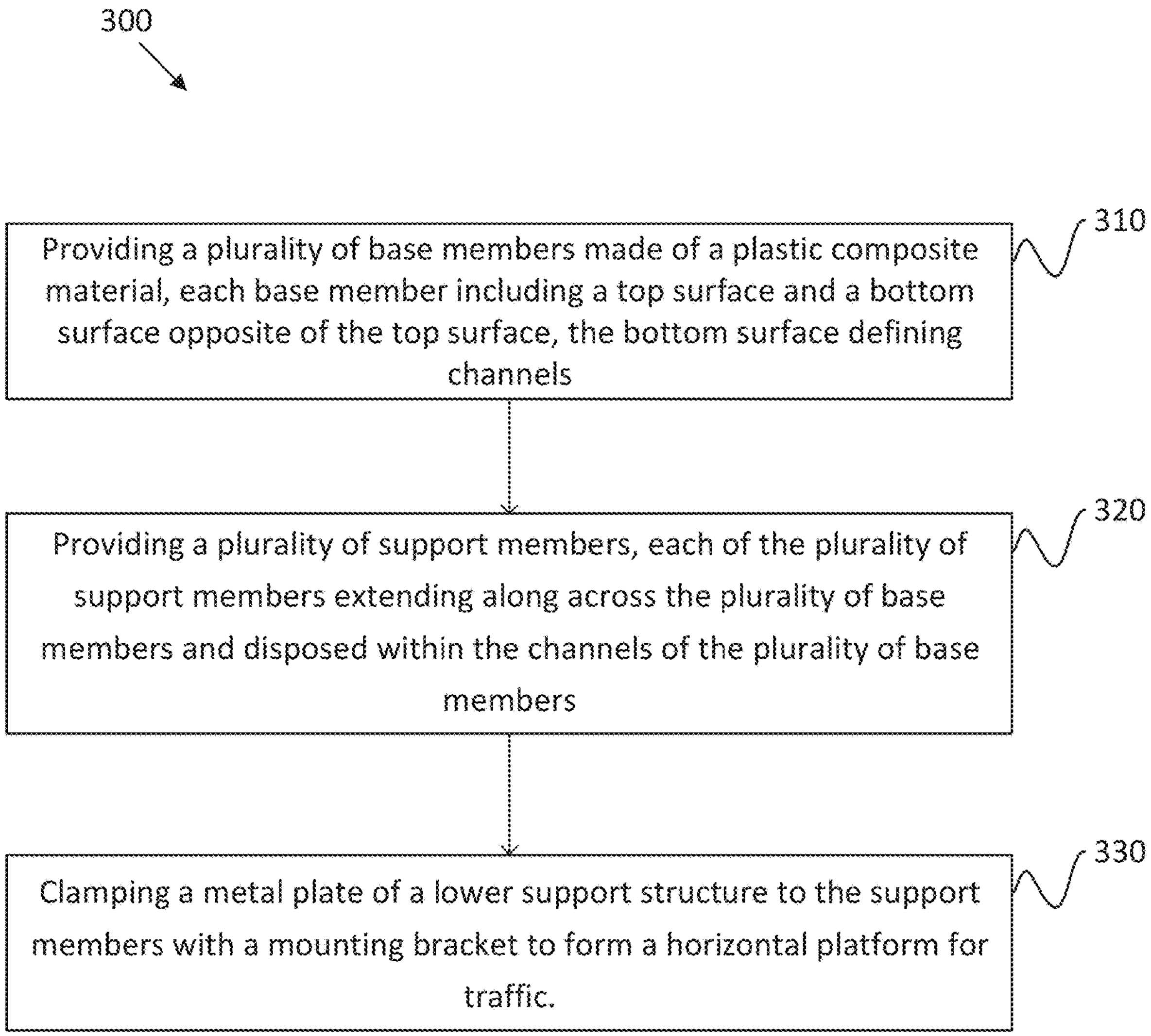
FIG. 27 depicts a method of installing a modular assembly.

FIG. 27 depicts a method of installing a modular assembly according to another embodiment of the present disclosure. The method 300 includes providing 310 a plurality of base members made of a plastic composite material, each base member including a top surface and a bottom surface opposite of the top surface, the bottom surface defining channels. A plurality of support members can be provided 320, each of the plurality of support members extending across the plurality of base members and disposed within the channels of the plurality of base members. A metal plate of a lower support structure can be clamped 330 to the support members with a mounting bracket to form a horizontal platform for traffic.

Figure 28:
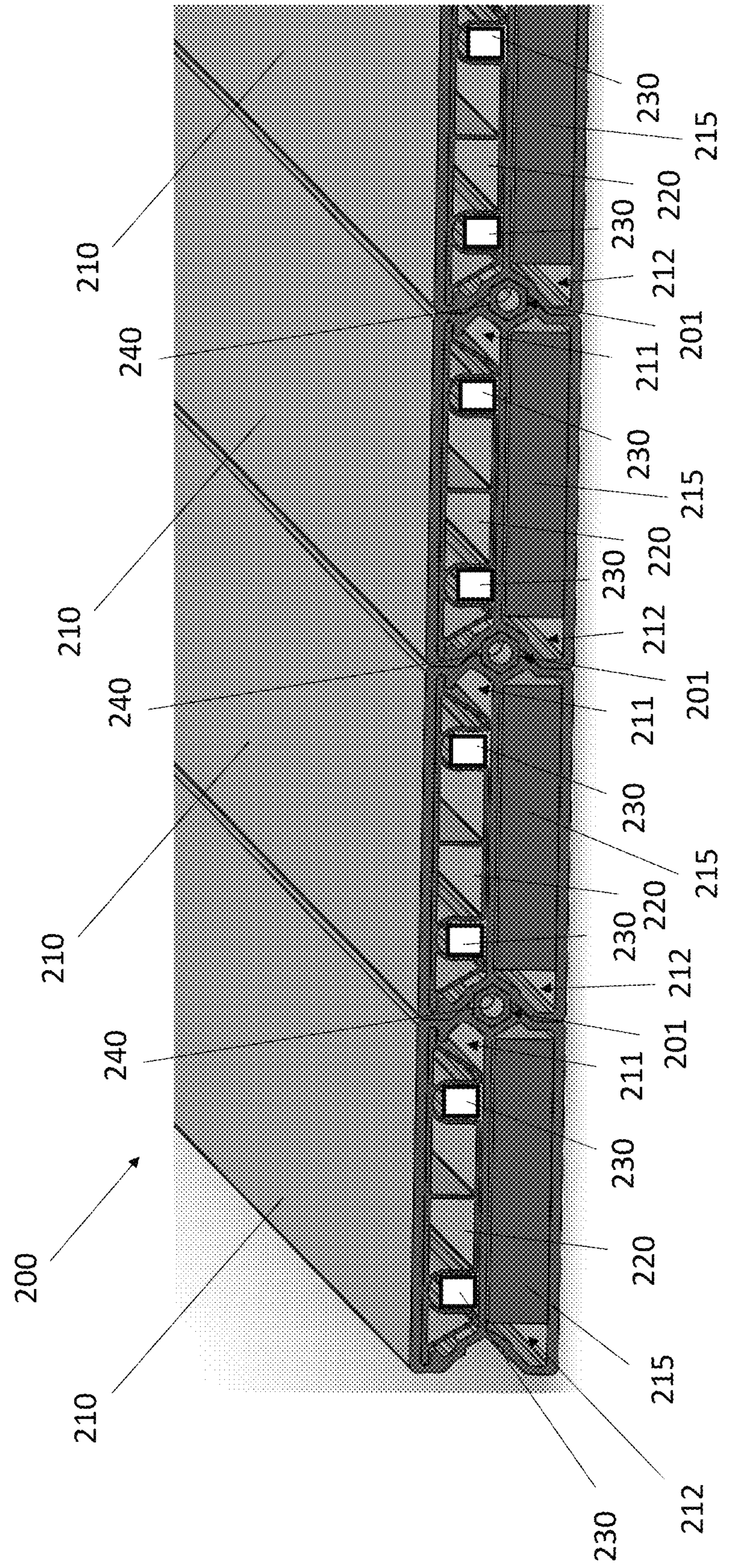
FIG. 28 is a perspective view of a modular assembly according to an embodiment of the present disclosure.

FIG. 28 depicts a modular assembly 200 according to an embodiment of the present disclosure. The modular assembly 200 may comprise a plurality of base members 210. The plurality of base members 210 may be made of a plastic composite material, such as those described in prior embodiments. For example, base members 210 may be made of any suitable polymer plastic material or fiberglass type material. The base members 210 may be manufactured using a pultrusion method or any other suitable manufacturing method. Each base member 210 may be a monolithic structure defined by a top wall **210*a*, a bottom wall 210*b*, and opposing side walls 210*c*, 210*d*. The opposing side walls 210*c*, 210*d* may define a channel 211. The channel 211 may extend longitudinally through the base member 210. At least one end of the channel 211 may be open. One end of the channel 211** may be closed.

Figure 29:
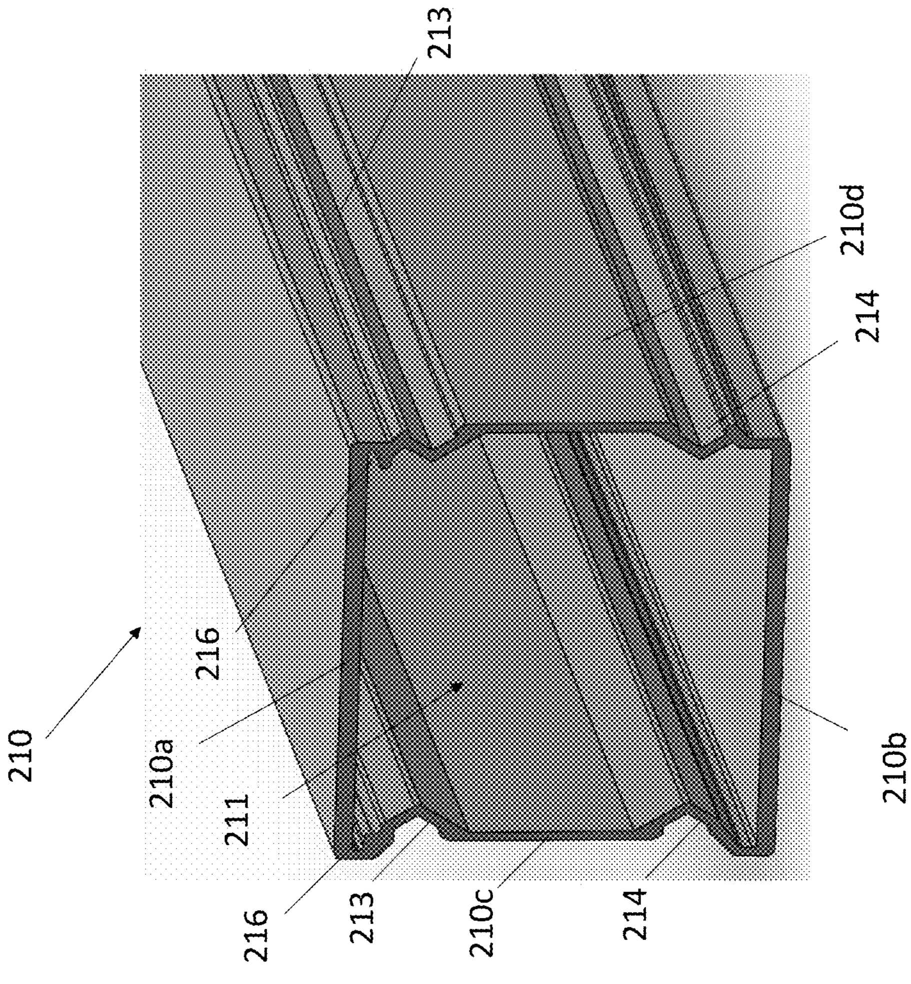
FIG. 29 is a perspective view of a base member according to an embodiment of the present disclosure.

FIG. 29 depicts a base member 210 according to an embodiment of the present disclosure. The base member 210 may have a width of about 6 inches and a height of about 6 inches. The top wall **210*a* of the base member 210** may be about 0.25 inches thick.

Figure 30:
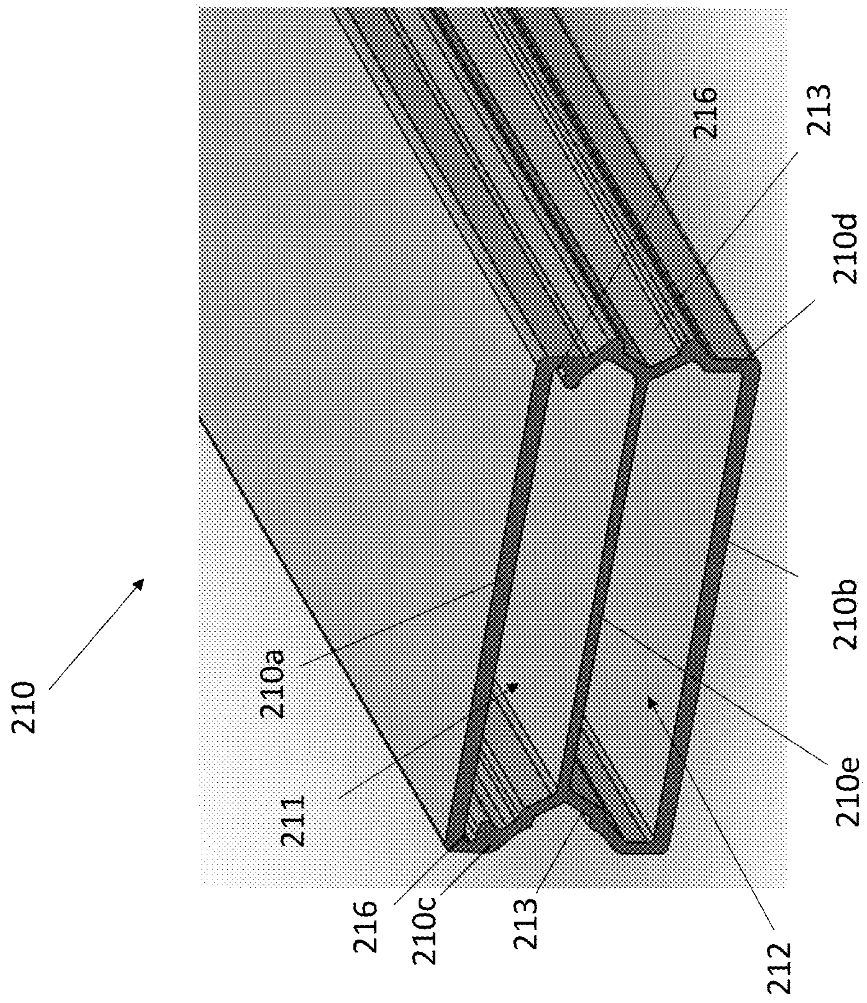
FIG. 30 is a perspective view of a base member according to another embodiment of the present disclosure.

FIG. 30 depicts a base member 210 according to another embodiment of the present disclosure. The base member 210 may have a width of about 6 inches and a height of about 2.5 inches. The top wall **210*a* of the base member 210 may be about 0.25 inches thick. The base member 210 may include an intermediary wall 210*e*, which extends between the opposing side walls 210*c*, 210*d*. The channel 211 may be defined by the top wall 210*a*, the opposing side walls 210*c*, 210*d*, and the intermediary wall 210*e*. A cavity 212 may be defined by the bottom wall 210*b*, the opposing side walls 210*c*, 210*d*, and the intermediary wall 210*e***.

Figure 31:
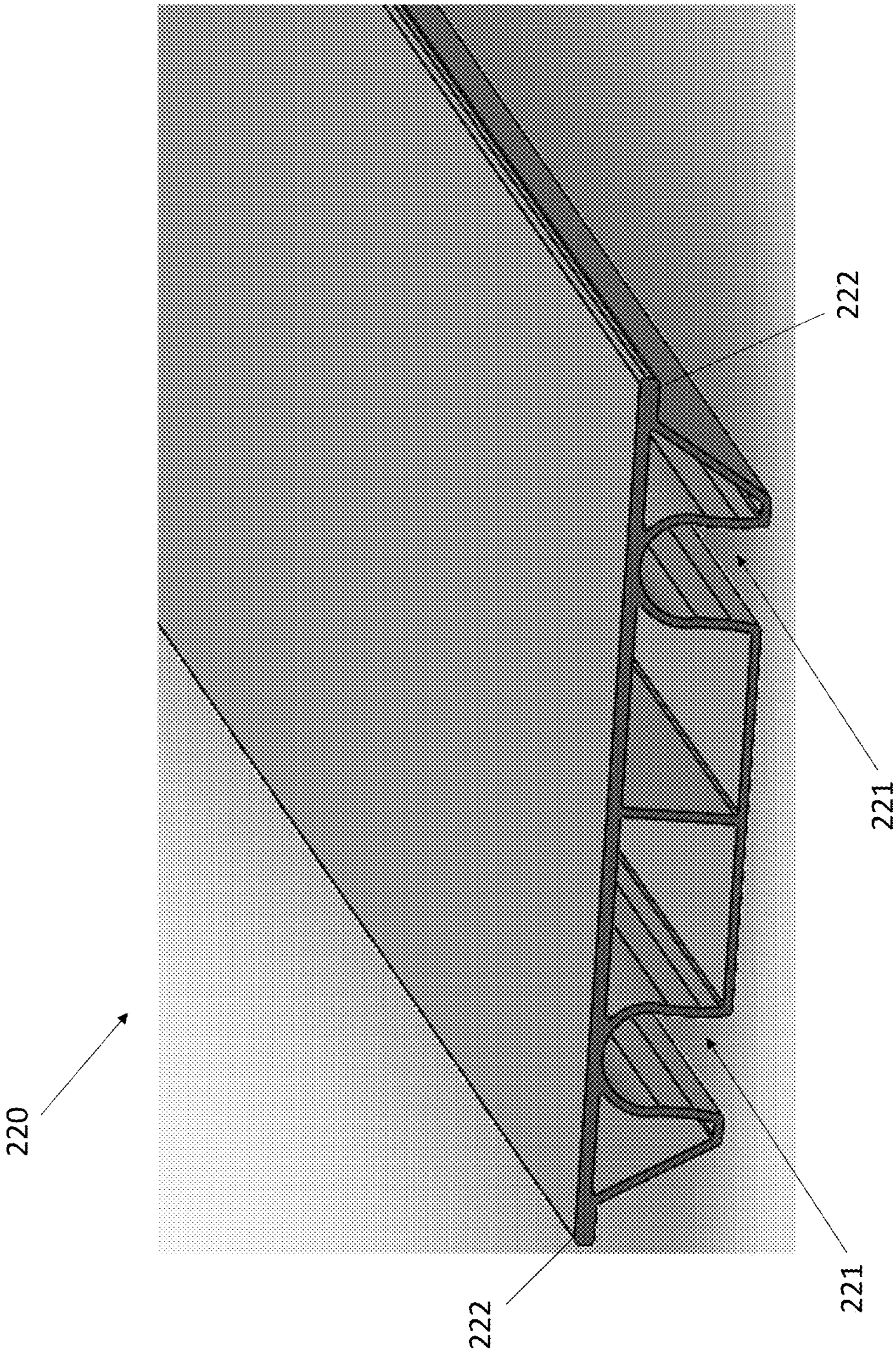
FIG. 31 is a perspective view of a heater tray according to an embodiment of the present disclosure.

The modular assembly 200 may further comprise a heater tray 220. As shown in FIG. 31, the heater tray 220 may be a monolithic structure. The heater tray 220 may be made of a thermally conductive material. For example, the heater tray 220 may be made of aluminum or another metal. The heater tray 220 may be manufactured using extrusion or any other suitable manufacturing process. The heater tray 220 may be configured to be slidably received within the channel 211 of each base member 210. For example, a width of the heater tray 220 may be less than a width of the channel 211, and a height of the heater tray 220 may be less than a height of the channel 211. In this way, a running or sliding fit may be established between the heater tray 220 and the channel 211, for insertion and removal of the heater tray 220 from the base member 210. The heater tray 220 may include tabs 222. The tabs 222 may be provided on opposite sides of the heater tray 220, and may extend in opposite directions. The base member 210 may include grooves 216 in an upper portion of the side walls **210*c*, 210*d*, close to the top wall 210*a*. The tabs 222 of the heater tray 220 may be received in the grooves 216 of the base member 210**.

The heater tray 220 may include a heating channel 221. The heating channel 221 may extend longitudinally along the heater tray 220. The heating channel 221 may be an open trough or a closed tube. For example, the heating channel 221 may be a C-channel, a D-channel, a U-channel or the like. The heating channel 221 may have a width of about 0.625 inches.

The heater tray 220 may comprise more than one heating channel 221. For example, the heater tray 220 may include two heating channels 221, which extend parallel to one another along the heater tray 220. Each of the heating channels 221 may have the same shape or different shapes. More than two heating channels 221 may be provided.

The modular assembly 200 may further comprise a heating element 230. The heating element 230 may be configured to heat the heating tray 220. The heating element 230 may be received within the heating channel 221 of the heater tray 220. The heating element 230 may be an electrically-powered heater. In such a case, the heating element 230 may be a stationary component located within the heating channel 221 that is configured to generate heat as electricity passes through the heating element 230. Alternatively, the heating element 230 may be a fluid-based heat exchanger. In such a case, the heating element 230 may be configured to circulate a heat exchange fluid through the heating channel 221 to heat the heater tray 220.

According to embodiments of the present disclosure where more than one heating channel 221 is provided in the heater tray 220, one of the heating channels 221 may be configured as a supply channel and the other of the heating channels 221 may be configured as a return channel. In this way, the heat exchange fluid may pass through one the supply channel first, and then pass through the return channel during circulation. Heat exchange fluid may pass through the heating channels 221 in the same or opposite directions.

When received in the channel 211, the heater tray 220 may be adjacent to the top wall 210*a* of the base member 210. For example, the heater tray 220 may be in contact with the top wall 210*a* of the base member 210. In this way, when the heater tray 220 is heated by the heating element 230, heat may be transferred to the top wall 210*a* of the base member 210 by conduction. This heat may melt snow or ice present on top of the base member 210.

As shown in FIG. 28, the modular assembly 200 may further comprise an insulative support member 215 disposed within the cavity 212 of each base member 210. The insulative support member 215 may be made of foam. The insulative support member 215 may be adjacent to the intermediary wall 210*e* and the bottom wall 210*b* of the base member 210. For example, the insulative support member 215 may be in contact with the intermediary wall 210*e* and the bottom wall 210*b* of the base member 210. In this way, when the heater tray 220 is heated by the heating element 230, the bottom wall 210*b* of the base member 210 may be insulated to thereby improve efficiency of heat transfer with the top wall 210*a*. The insulative support member 215 may further be a resilient member, capable of absorbing compressive forces on the base member 210 when under high loads, e.g., due to vehicles or other loads on the base member 210.

As shown in FIG. 28, each of the plurality of base members 210 may adjoin one another in an assembled state to form a horizontal platform for traffic. For example, the plurality of base members 210 may be adjoined side-by-side to form a horizontal platform for traffic. Each of the plurality of base members 210 may be adjoined via fasteners or with an adhesive. For example, a fastener or adhesive may be provided between the side wall 210*c* and side wall 210*d* of adjacent base members 210 to secure the adjoined modular assembly 200 together.

As shown in FIGS. 29-30, each of the opposing side walls 210*c*, 210*d* may include a first detent 213. The first detent 213 may be defined by a pair of protrusions and/or indents in the side walls 210*c*, 210*d*. The first detent 213 may be evenly-spaced between the top wall 210*a* and the bottom wall 210*b*. When the plurality of base members 210 are adjoined, the first detents 213 of adjacent side walls 210*c*, 210*d* may align to form a first aperture 201. The first aperture 201 may have a polygonal shape. For example, the first aperture 201 may have a hexagonal shape.

Figure 33:
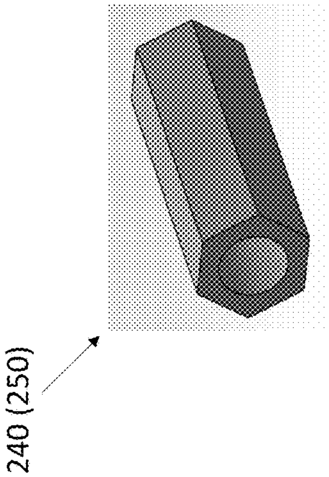
FIG. 33 is a perspective view of a coupler according to an embodiment of the present disclosure.

According to an embodiment of the present disclosure, the modular assembly 200 may further comprise a first coupler 240. The first coupler 240 may be a threaded coupler. For example, the first coupler 240 may have internal threading. As shown in FIG. 28, the first coupler 240 may be received in the first aperture 201. For example, the first coupler 240 may be secured via an adhesive or fastener in the first aperture 201. The first coupler 240 may have an external shape that corresponds to the shape of the first aperture 201. For example, as shown in FIG. 33, the first coupler 240 may have a hexagonal shape, so as to fit within the hexagonal shape of the first aperture 201.

As shown in FIG. 29, each of the opposing side walls 210*c*, 210*d* may include a second detent 214. The second detent 214 may be defined by a pair of protrusions and/or indents in the side walls 210*c*, 210*d*. The second detent 214 may be vertically spaced from the first detent 213. For example, the first detent 213 may be adjacent to the top wall 210*a* and the second detent 214 may be adjacent to the bottom wall 210*b*. When the plurality of base members 210 are adjoined, the second detents 214 of adjacent side walls 210*c*, 210*d* may align to form a second aperture 202. The second aperture 202 may have a polygonal shape. For example, the second aperture 202 may have a hexagonal shape.

Figure 32:
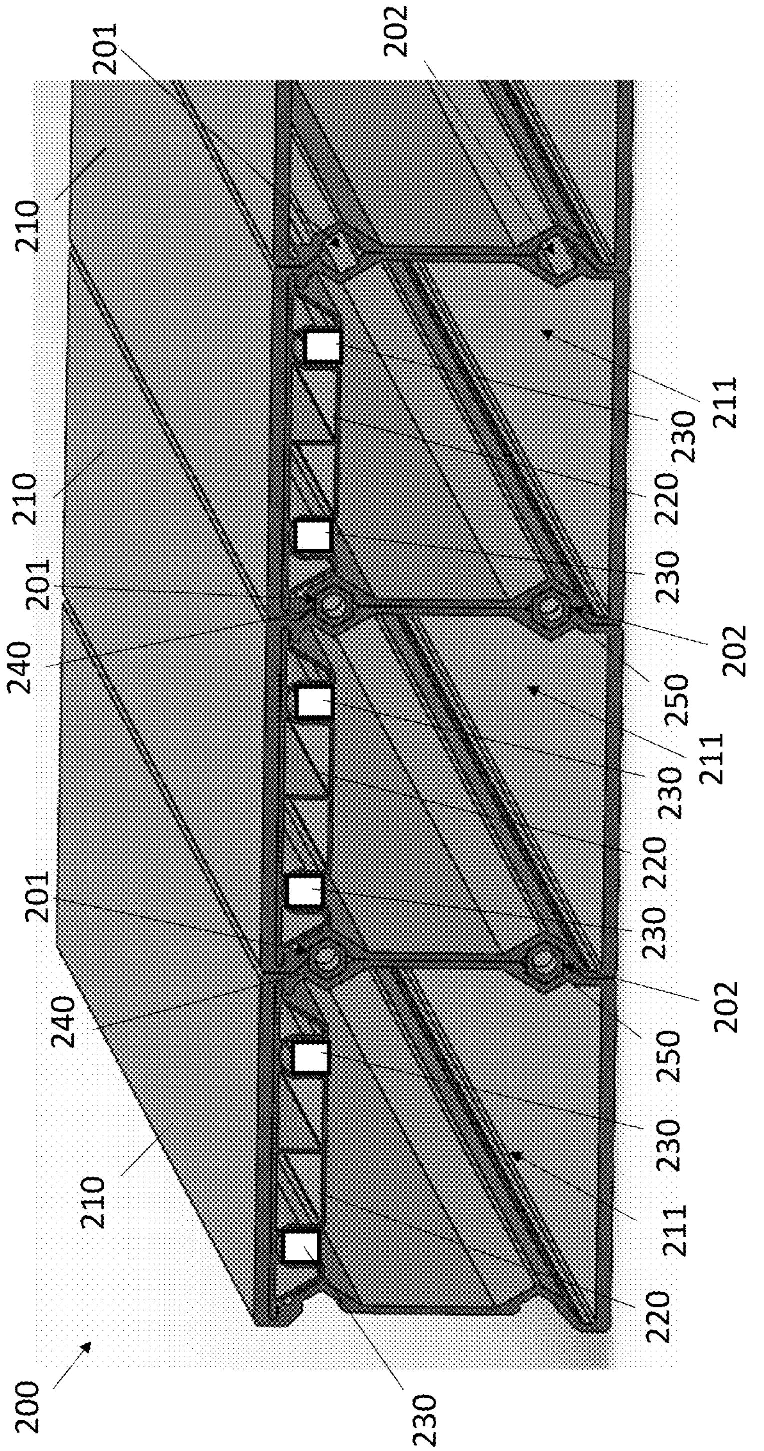
FIG. 32 is a perspective view of a modular assembly according to another embodiment of the present disclosure.

According to an embodiment of the present disclosure, the modular assembly 200 may further comprise a second coupler 250. The second coupler 250 may be a threaded coupler. For example, the second coupler 250 may have internal threading. As shown in FIG. 32, the second coupler 250 may be received in the second aperture 202. The second coupler 250 may have an external shape that corresponds to the shape of the second aperture 202. For example, as shown in FIG. 33, the second coupler 250 may have a hexagonal shape, so as to fit within the hexagonal shape of the second aperture 202.

Figure 34:
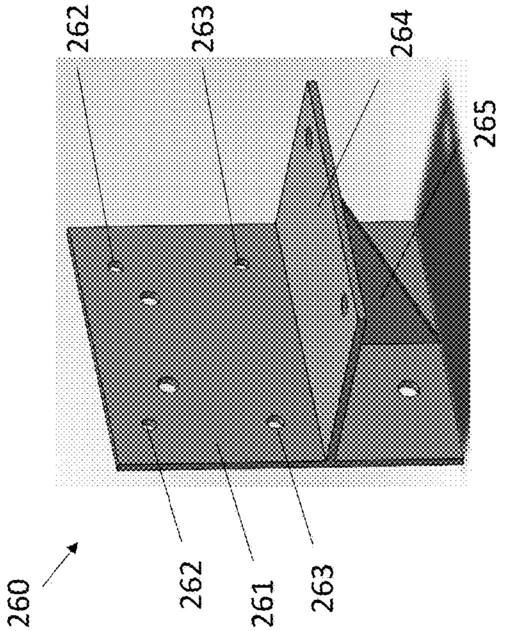
FIG. 34 is a perspective view of a mounting bracket according to an embodiment of the present disclosure.
Figure 35:
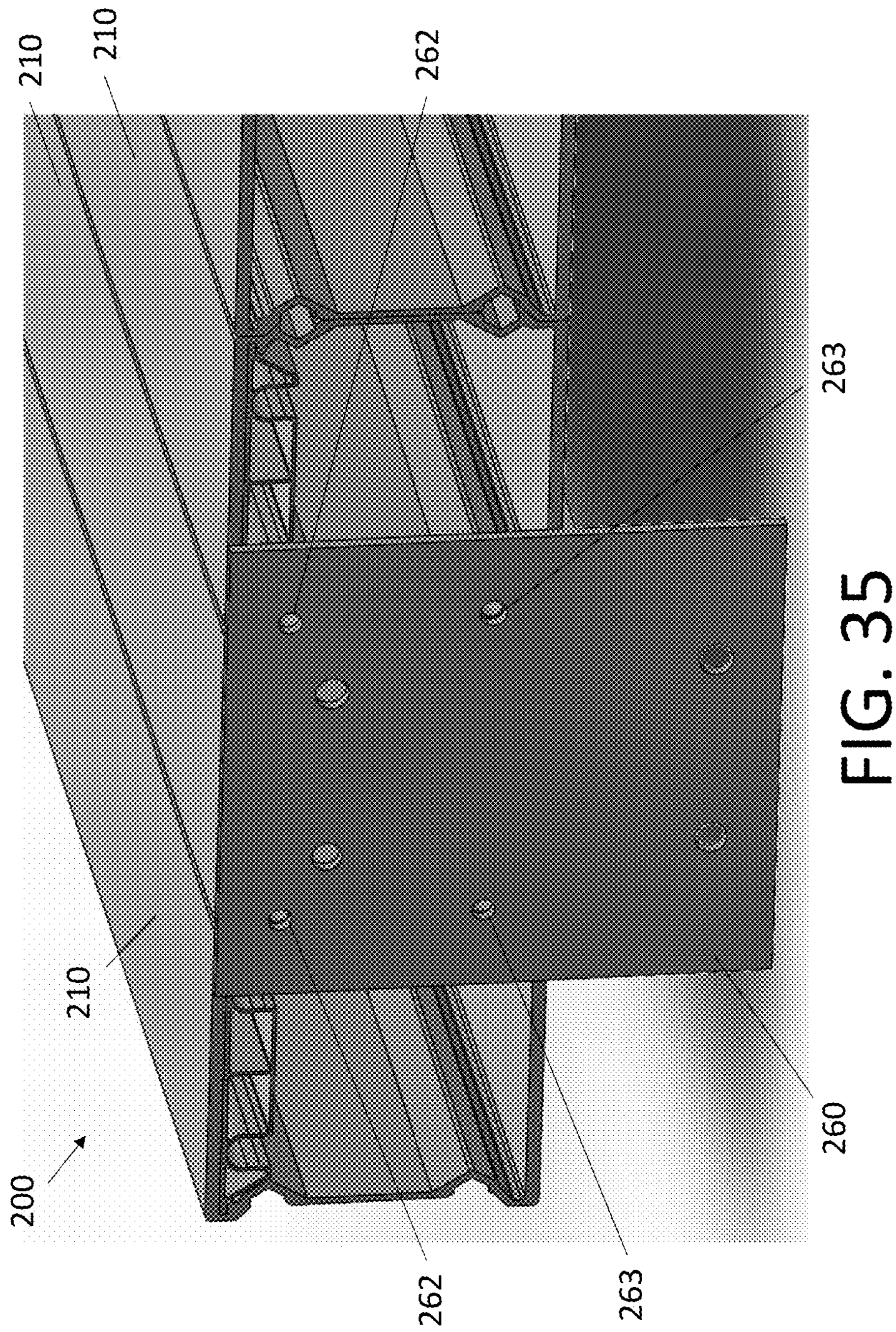
FIG. 35 is a perspective view of a modular assembly having a mounting bracket affixed-thereto.

As shown in FIGS. 34-35, the modular assembly 200 may further comprise a mounting bracket 260. The mounting bracket 260 may include a vertical plate 261. The vertical plate 261 may include a first pair of apertures 262. The first pair of apertures 262 may align with two first apertures 201 of the plurality of base members 210. The first pair of apertures 262 may be configured to each receive a bolt. The bolt may be threaded to engage with the first coupler 240 disposed in the two first apertures 201. In this way, the vertical plate 261 may secure adjacent base members 210 together.

The vertical plate 261 may further include a second pair of apertures 263. The second pair of apertures 263 may align with two second apertures 202 of the plurality of base members 210. The second pair of apertures 263 may be configured to each receive a bolt. The bolt may be threaded to engage with the second coupler 250 disposed in the two second apertures 202. In this way, the vertical plate 261 may further secure the adjacent base members together.

The mounting bracket 260 may further include a horizontal plate 264. The horizontal plate 264 may extend from the vertical plate 261. The bottom wall 210*b* of the base member 210 may rest on the horizontal plate 264. The bottom wall 210*b* of the base member 210 may be secured to the horizontal plate 264. The horizontal plate 264 may be supported by a brace member 265. The brace member 265 may be a triangular member that extends from the vertical plate 261 to the underside of the horizontal plate 264. The mounting bracket 260 may be configured to connect the modular assembly 200 to adjacent structures, such as walls, guard rails, and the like. For example, the mounting bracket 260 may include additional apertures to secure the modular assembly 200 to adjacent structures and other components.

Figure 36:
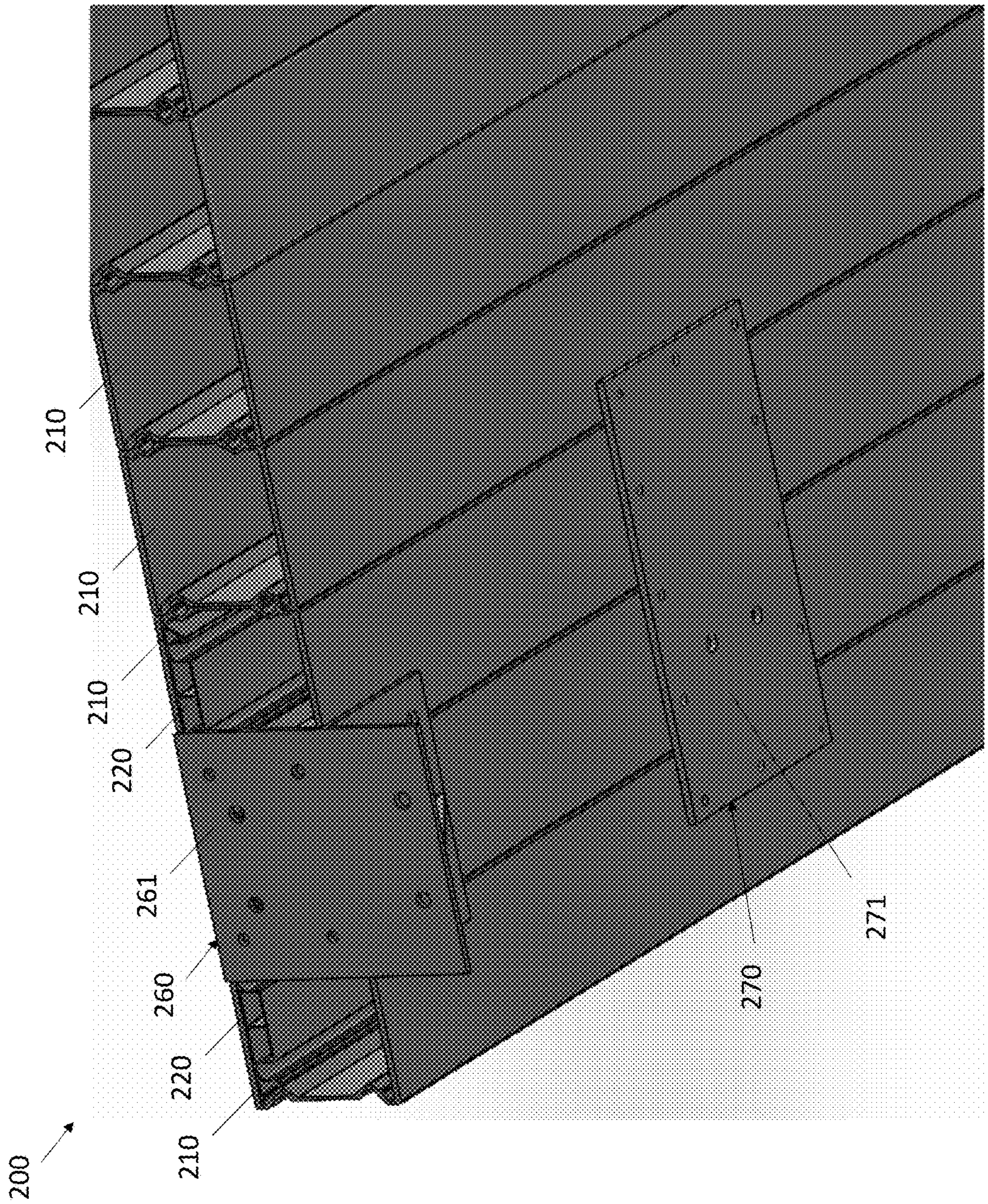
FIG. 36 is a bottom perspective view of a modular assembly having a mounting bracket and a lower support structure affixed-thereto.

As shown in FIG. 36, the modular assembly 200 may further comprise a lower support structure 270. The lower support structure 270 may include a metal plate 271. The metal plate 271 may be secured to the bottom wall 210*b* of adjacent base members 210. For example, the metal plate 271 may be riveted to the bottom wall 210*b* of adjacent base members 210. In this way, adjacent base members 210 may be further secured together. The lower support structure 270 may be configured to connect the modular assembly 200 to ground structures. For example, the lower support structure 270 may include apertures to secure the modular assembly 200 to underneath structures and components.

Figure 37:
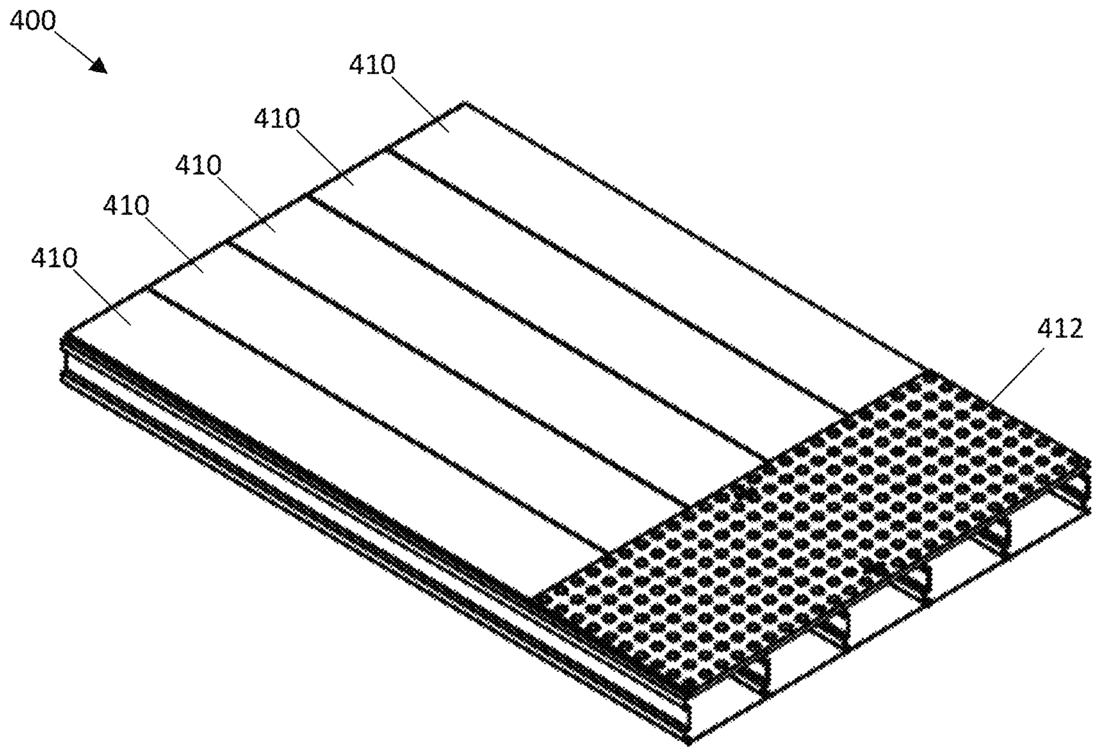
FIG. 37 is a perspective view of a modular assembly according to another embodiment of the present disclosure.

FIG. 37 depicts a modular assembly 400 according to another embodiment of the present disclosure. The modular assembly 400 may comprise a plurality of base members 410. The plurality of base members 410 may be made of a plastic composite material. For example, base members 410 may be made of any suitable polymer plastic material or fiberglass type material. The base members 410 may be manufactured using a pultrusion method or any other suitable manufacturing method. The base member 410 may be configured to retain heat. For example, a wire (e.g. metallic, such as aluminum) mesh may be integrated during the pultrision or other manufacturing process, which may contribute to heat distribution and retention in the base member 410. Minerals or other dense materials, such aluminum, copper, basalt or the like, may be added to the resin or plastic material to increase the thermal mass of at least part of the base member 410 (e.g., the top wall 410*a*) for heat conduction and/or retention. Each base member 410 may be a monolithic structure defined by a top wall 410*a*, a bottom wall 410*b*, and opposing side walls 410*c*, 410*d*. At least a portion of the top wall 410*a* may have a textured (e.g. tactile) surface 412 to provide slip resistance and/or indicate proximity to an edge of the modular assembly 400. The textured surface 412 can also comply with the Americans with Disabilities Act (ADA): Accessibility Guidelines for Buildings and Facilities sets the requirements for the use of detectable warnings at curb ramps, walking surfaces, transit platforms and the like to warn visually impaired people of hazards. The texture surface 412 may also be a separate component disposed on the top wall 410*a*. The opposing side walls 410*c*, 410*d* may define a channel 411. The channel 411 may extend longitudinally through the base member 410. At least one end of the channel 411 may be open. One end of the channel 411 may be closed.

Figure 38:
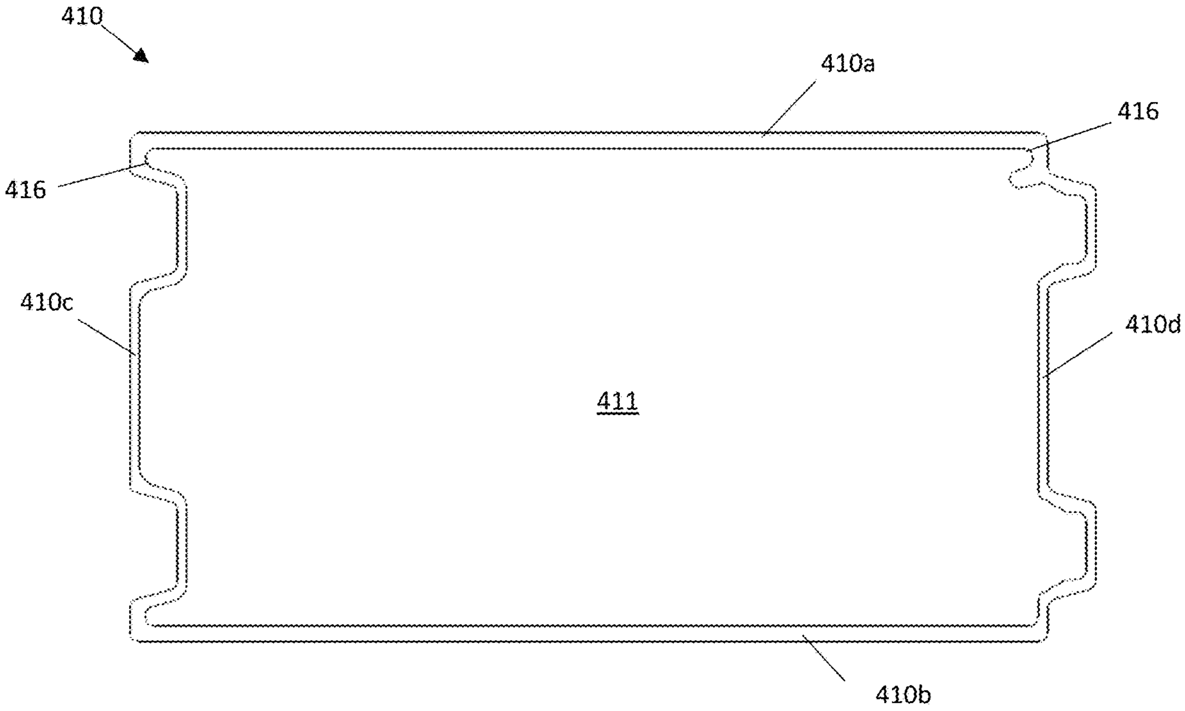
FIG. 38 is an end view of a base member according to an embodiment of the present disclosure.

FIG. 38 depicts a base member 410 according to an embodiment of the present disclosure. The base member 410 may have a width of about 12 inches and a height of about 6 inches. The top wall 410*a* of the base member 410 may be about 0.2 inches thick.

Figure 39:
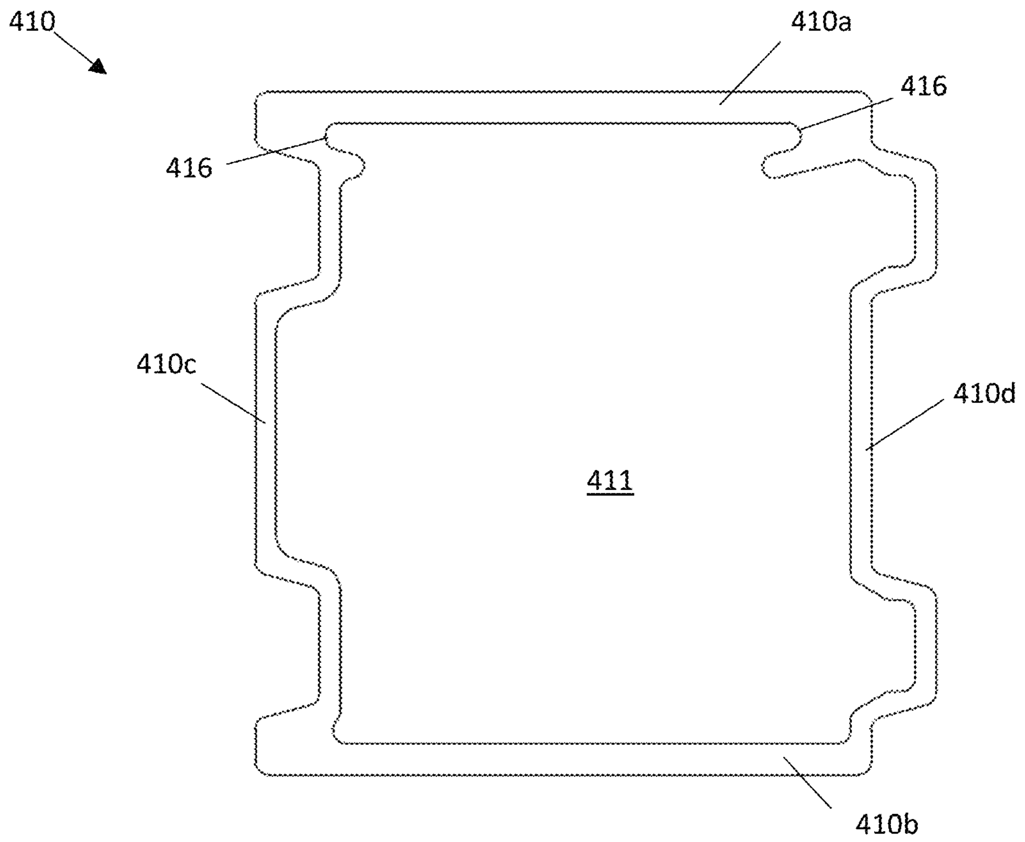
FIG. 39 is an end view of a base member according to another embodiment of the present disclosure.

FIG. 39 depicts a base member 410 according to another embodiment of the present disclosure. The base member 410 may have a width of about 6 inches and a height of about 6 inches. The top wall 410*a* of the base member may be about 0.3 inches thick. Compared to the base member 410 shown in FIG. 38, the base member 410 shown in FIG. 39 may have a substantially square profile, and may be suitable for heavier loads.

Figure 40A:
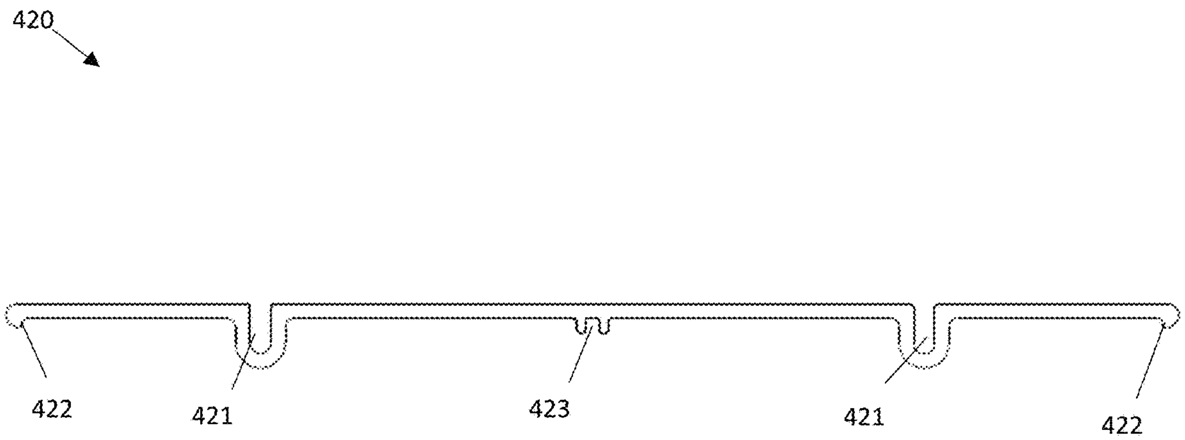
FIG. 40A is an end view of a heater tray according to an embodiment of the present disclosure.
Figure 40B:
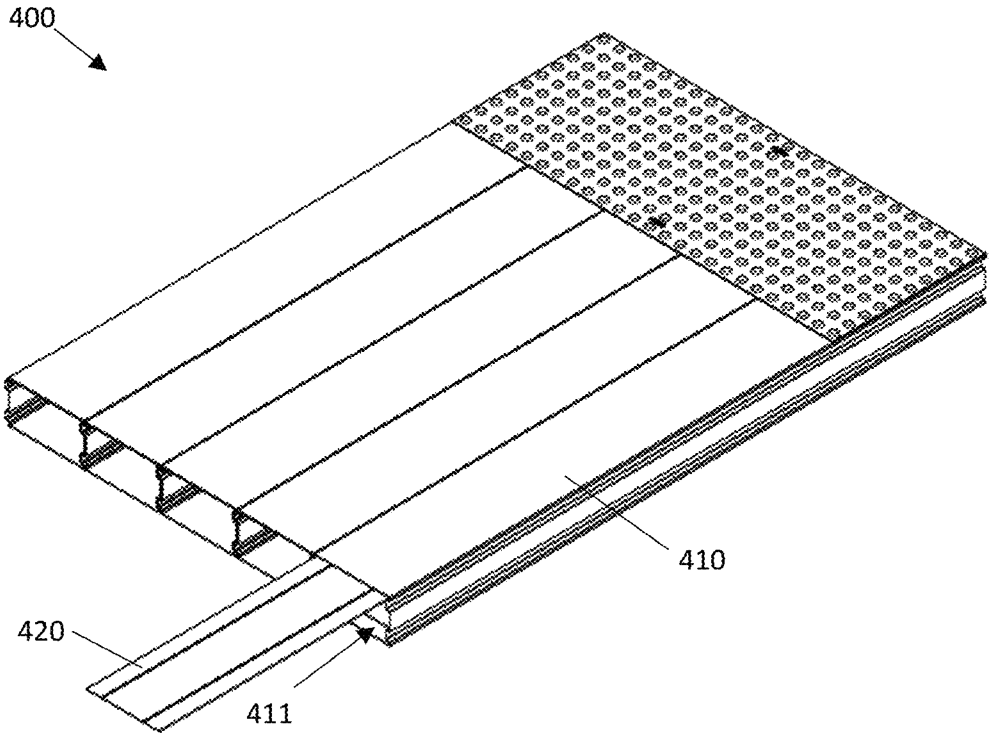
FIG. 40B is a perspective view of a heater tray being inserted into a modular assembly according to an embodiment of the present disclosure.

The modular assembly 400 may further comprise a heater tray 420. As shown in FIG. 40A, the heater tray 420 may be a monolithic structure. The heater tray 420 may be made of a thermally conductive material. For example, the heater tray 420 may be made of aluminum or another metal. Alternatively, the heater tray 420 may be made of a rigid foam material having a metallic foil top surface. The heater tray 420 may be manufactured using extrusion, roll-forming, or any other suitable manufacturing process. The heater tray 420 may be configured to be slidably received within the channel 411 of each base member 410, as shown in FIG. 40B. A width of the heater tray 420 may be less than a width of the channel 411, and a height of the heater tray 420 may be less than a height of the channel 411. For example, the heater tray 420 may have a width of less than 12 inches or less than 6 inches, so as to fit within the channel 411 of the base member 410 shown in FIG. 38 or FIG. 39. In this way, a running or sliding fit may be established between the heater tray 420 and the channel 411, for insertion and removal of the heater tray 420 from the base member 410.

The heater tray 420 may include a heating channel 421. The heating channel 421 may extend longitudinally along the heater tray 420. The heating channel 421 may be an open trough or a closed tube. For example, the heating channel 421 may be a C-channel, a D-channel, a U-channel or the like. The heating channel 421 may have a width of about 0.2 inches.

The heater tray 420 may comprise more than one heating channel 421. For example, the heater tray 420 may include two heating channels 421, which extend parallel to one another along the heater tray 420. Each of the heating channels 421 may have the same shape or different shapes. More than two heating channels 421 may be provided.

Figure 40C:
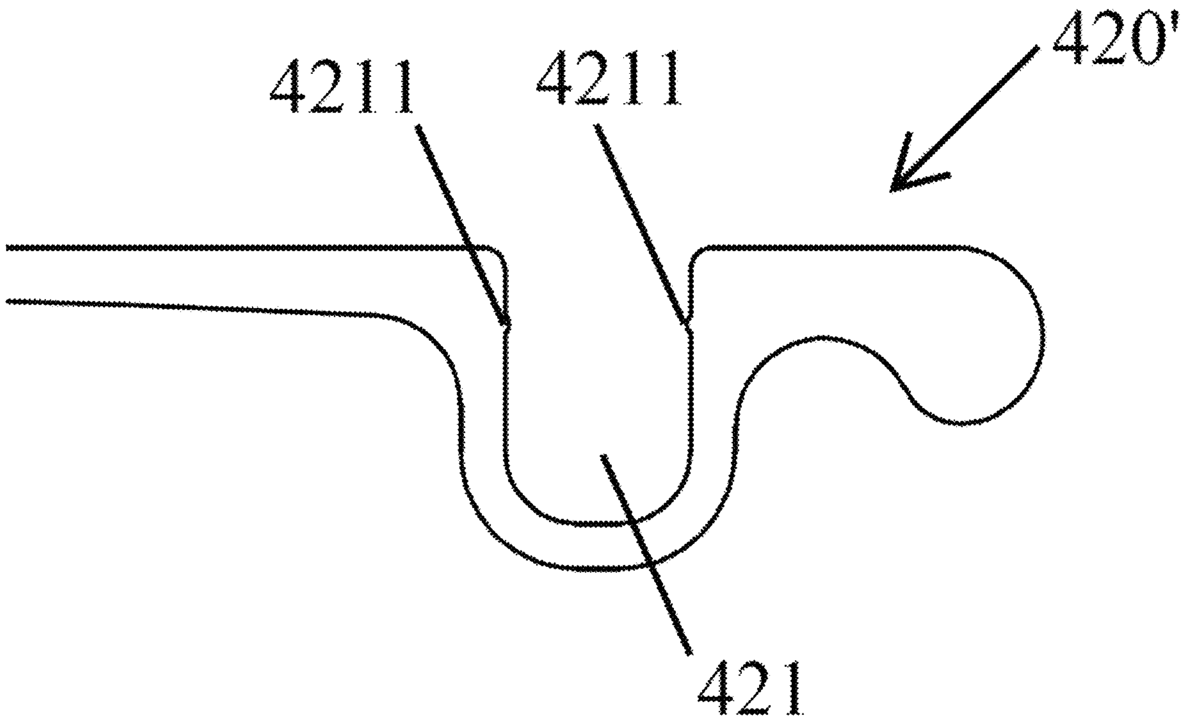
FIG. 40C is a detail view of another embodiment of a heater tray according to the present disclosure.

FIG. 40C is a detail view of another embodiment of a heater tray 420'. As illustrated, the heater tray 420' has a heating channel 421 that further includes one or more protrusions 4211. Such protrusions 4211 may be used to create a physical barrier to help hold a heating element 430 (described in further detail below) in a fixed position within the heating channel 421. For instance, the protrusion 4211 can provide a frictional fit, to hold a heating element 430 in place. While the protrusions 4211 are illustrated as being generally rounded, the protrusions 4211 can be alternative shapes or designs, including, but not limited to, a ridge, knob, pin, lip, or teeth depending upon the specific requirements of the application. It should also be realized that the protrusions 4211 may either be symmetrically positioned and/or have symmetrical profiles about a central axis of the heating channel 421 (as illustrated in 40C), or be asymmetrically positioned and/or have asymmetrical profiles (not illustrated) depending on the desired application.

The modular assembly 400 may further comprise a heating element 430. The heating element 430 may be configured to generate heat. The heating element 430 may be received within the heating channel 421 of the heater tray 420. The heating element 430 may be an electrically-powered heater. In such a case, the heating element 430 may be a stationary component (e.g., wiring or cables) located within the heating channel 421 that is configured to generate heat as electricity passes through the heating element 430. Alternatively, the heating element 430 may be a hydronic heater. In such a case, the heating element 430 may be configured to circulate a heat exchange fluid through the heating channel 421 to heat the heater tray 420. The heating element 430 may have a first end 431 and a second end 432 connected to an electrical source or a fluid source to generate heat.

Figure 44A:
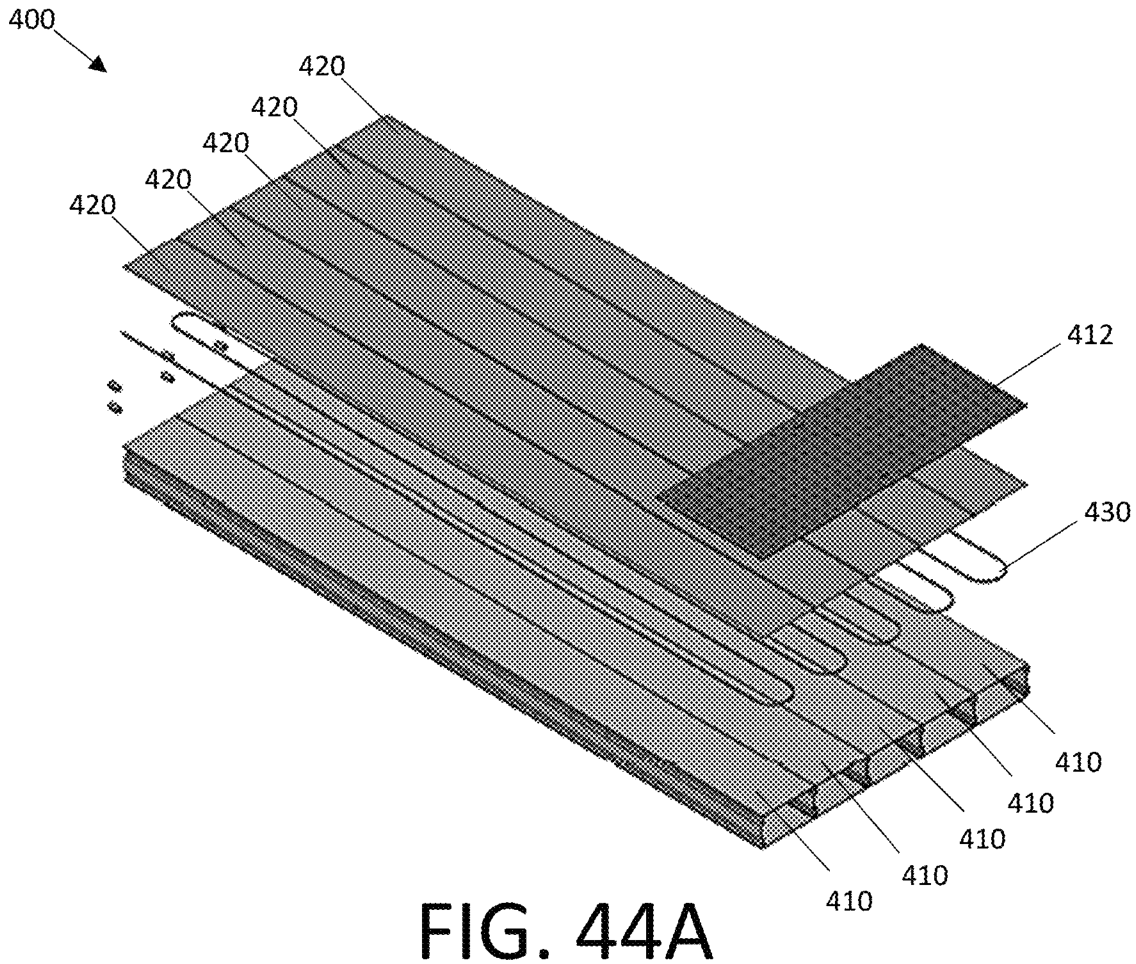
FIG. 44A is an exploded view of a modular assembly according to an embodiment of the present disclosure.

As shown in FIG. 44A, the heating element 430 and the heater tray 420 may be separate components. In some embodiments, the heating element 430 and the heater tray

Figure 44B:
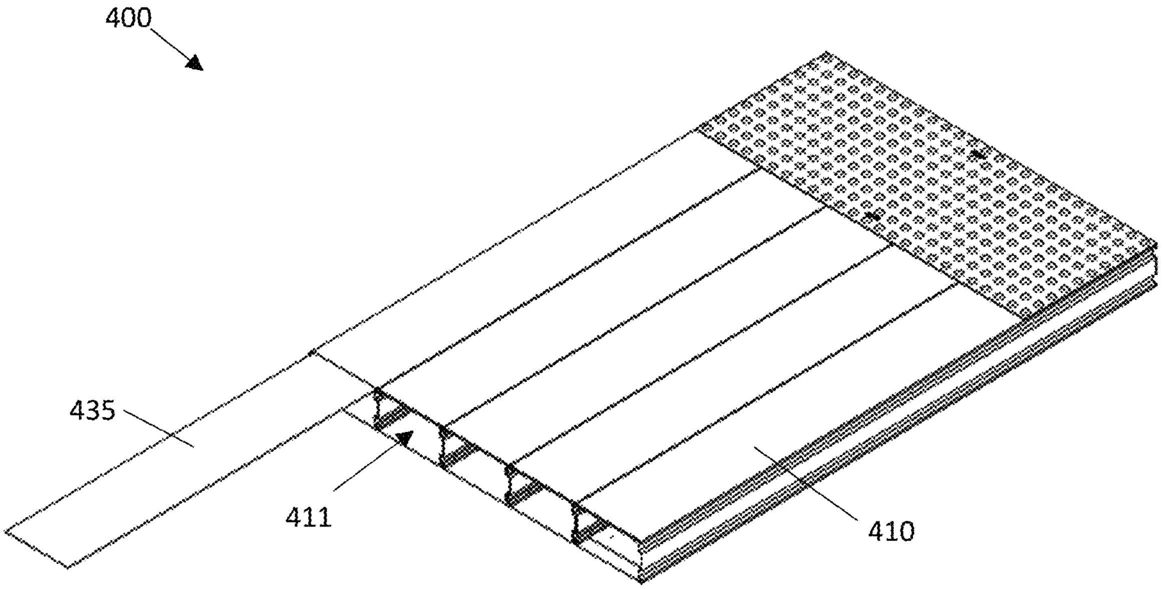
FIG. 44B is a perspective view of a heater panel being inserted into a modular assembly according to an embodiment of the present disclosure.

420 may combined as a flat heater panel 435, as shown in FIG. 44B. The flat heater panels 435 may be received within the channel 411 of the base member 410, similar to the heater tray 420, as shown in FIG. 45B.

According to embodiments of the present disclosure where more than one heating channel 421 is provided in the heater tray 420, one of the heating channels 421 may be configured as a supply channel and the other of the heating channels 421 may be configured as a return channel. In this way, the heat exchange fluid may pass through one the supply channel first, and then pass through the return channel during circulation. Heat exchange fluid may pass through the heating channels 421 in the same or opposite directions.

When received in the channel 411, the heater tray 420 may be adjacent to the top wall 410*a* of the base member 410. For example, the heater tray 420 may be in contact with the top wall 410*a* of the base member 410. In this way, when the heater tray 420 is heated by the heating element 430, heat may be transferred to the top wall 410*a* of the base member 410 by conduction. This heat may melt snow or ice present on top of the base member 410.

The heater tray 420 may further include tabs 422. The tabs 422 may be provided on opposite sides of the heater tray 420, and may extend in opposite directions. The base member 410 may include grooves 416 in an upper portion of the side walls 410*c*, 410*d*, close to the top wall 410*a*. The tabs 422 of the heater tray 420 may be received in the grooves 416 of the base member 410 to retain the heater tray 420 within the channel 411.

Figure 41:
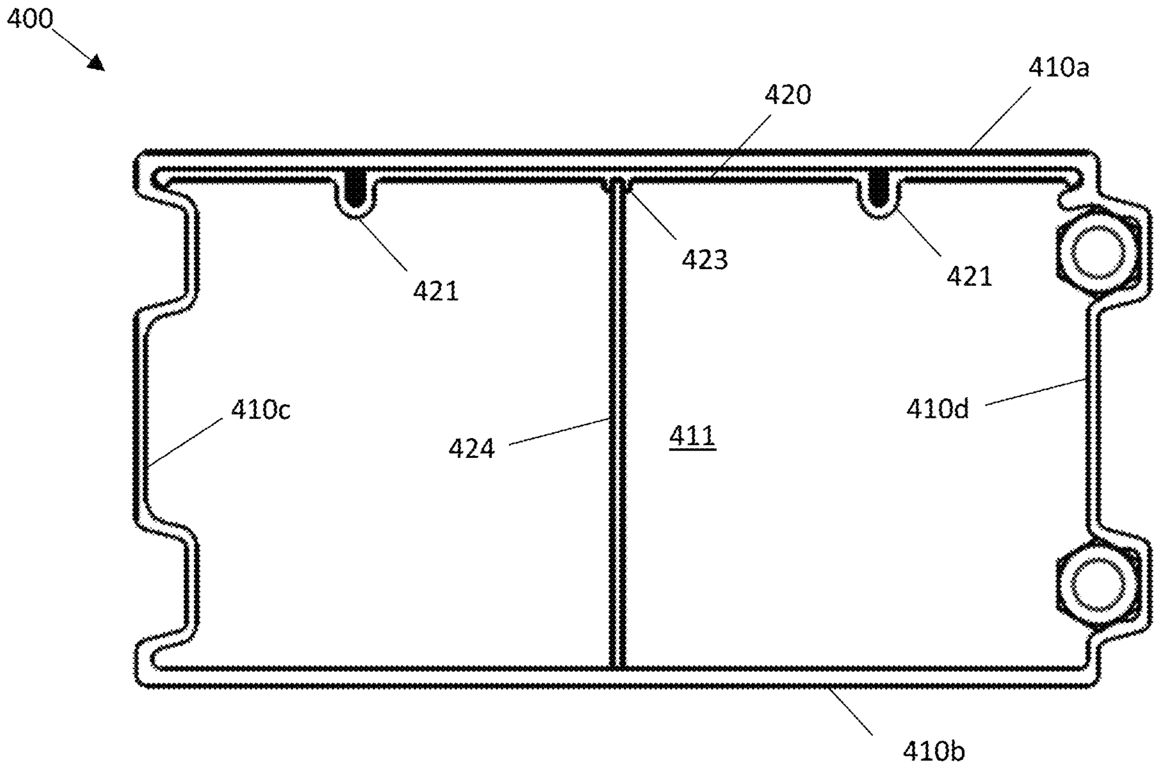
FIG. 41 is an end view of modular assembly including a vertical support according to an embodiment of the present disclosure.

The heater tray 420 may further include a central groove 423 on the underside of the heater tray 420. The central groove 423 may extend longitudinally along the heater tray 420. The central groove 423 may be configured to receive a vertical support 424 that extends to the bottom wall 410*b* of the base member 410. As shown in FIG. 41, when the vertical support 424 is received in the central groove 423, structural stability of the modular assembly 400 may be improved. The vertical support 424 may also be configured to push the heater tray 420 against the top wall 410*a* of the base member 410, so as to improve heat conduction between the heating element 430 and the top wall 410*a*.

Referring to FIGS. 42A-42D, the modular assembly 400 may further comprise a removable support, such as a v-shaped support 425. The v-shaped support 425 may be inserted into the channel 411 beneath the heater tray 420, and may be configured to bias the heater tray 420 against the top wall 410*a* of the base member 410, so as to improve heat conduction between the heating element 430 and the top wall 410*a*. The v-shaped support 425 may comprise a pair of extensions 426 connected at a pivot point 427. The extensions 426 may be in contact with the underside of the heater tray 420 and/or the underside of the heating channels 421. The pivot point 427 may be in contact with the bottom wall 410*b* of the base member 410. The pivot point 427 may be configured to snap fit the pair of extensions 426 together. When snapped together, the pair of extensions 426 may apply pressure to the underside of the heater tray 420 and/or the underside of the heating channels 421, so as to push the heater tray 420 against the top wall 410*a* of the base member 410. The pair of extensions 426 may be snapped together by inserting panels 428 in the channel 411 on either side of the pivot point 427. The panels 428 may be longitudinally tapered, so that they may press the pair of extensions 426 together as the panels 428 are slid through the channel 411. After snapping the pair of extensions 426 together, the panels 428 may be removed from the channel 411 or may remain as part of the modular assembly 400. The v-shaped support 425 may be made of aluminum or another thin flexible material that can act as a spring to apply constant pressure.

Figure 42A:
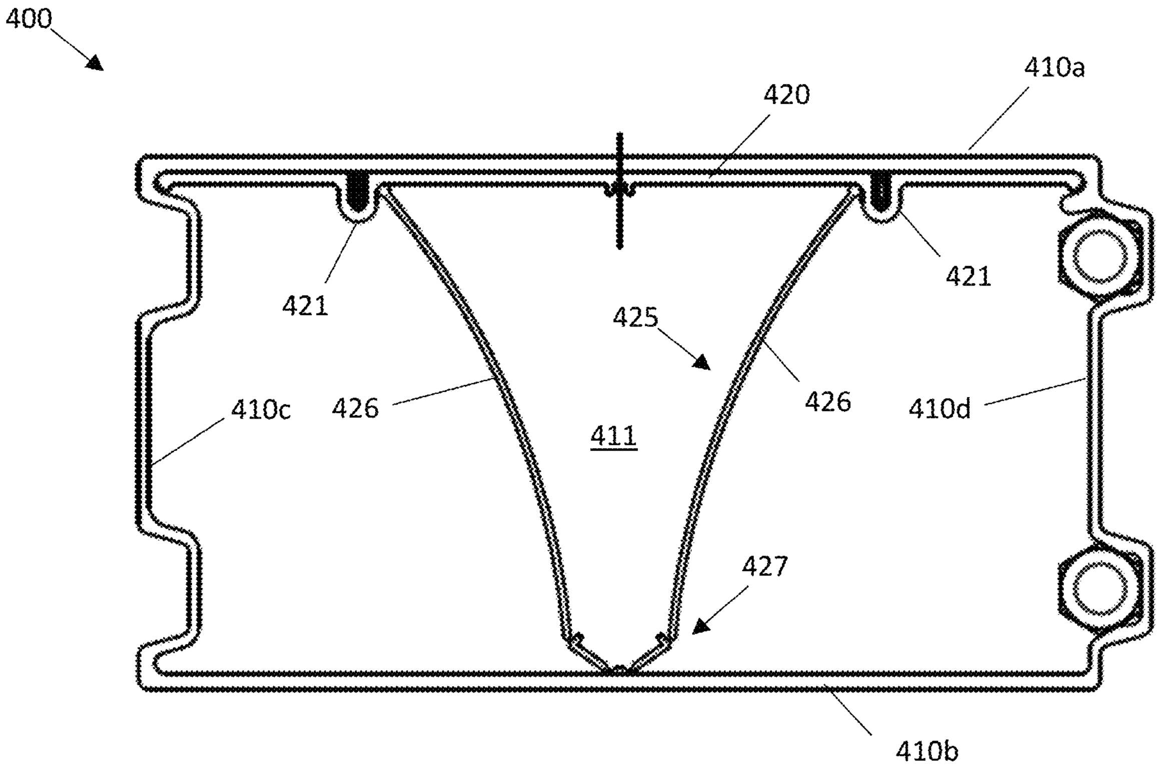
FIGS. 42A-42D illustrate a sequence of end views of a v-shaped support being installed in a modular assembly according to an embodiment of the present disclosure.
Figure 42B:
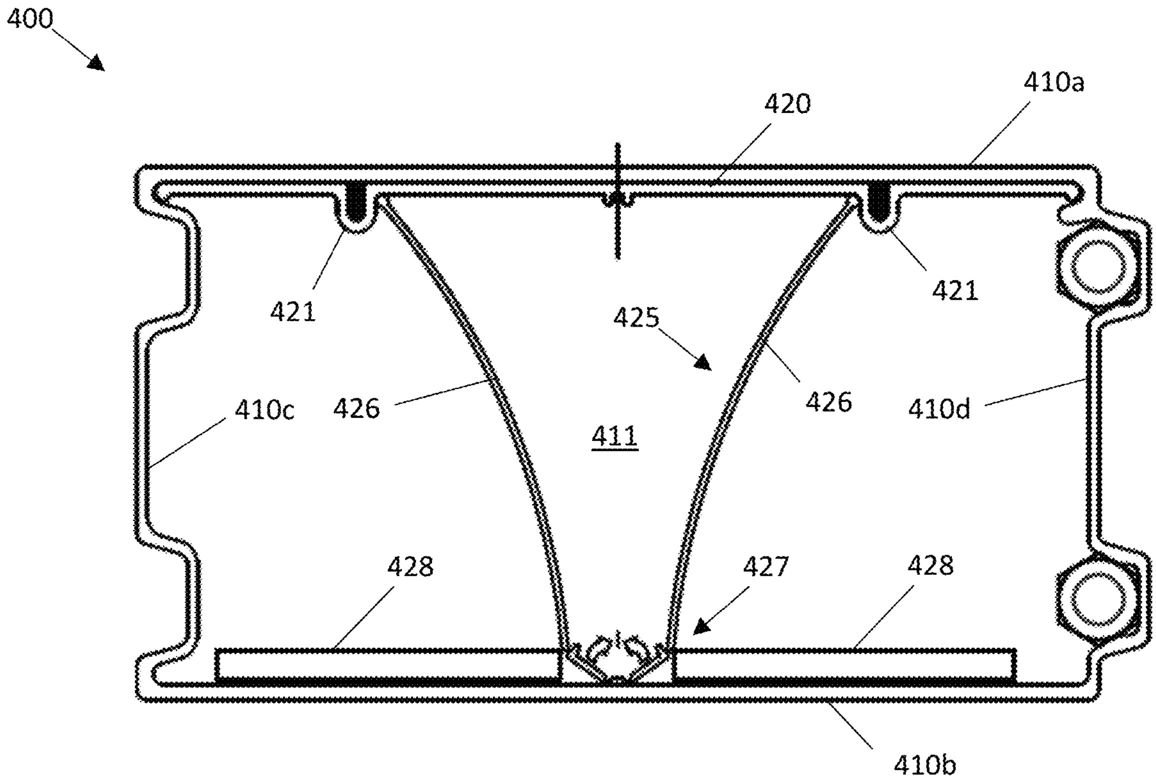
Figure 42C:
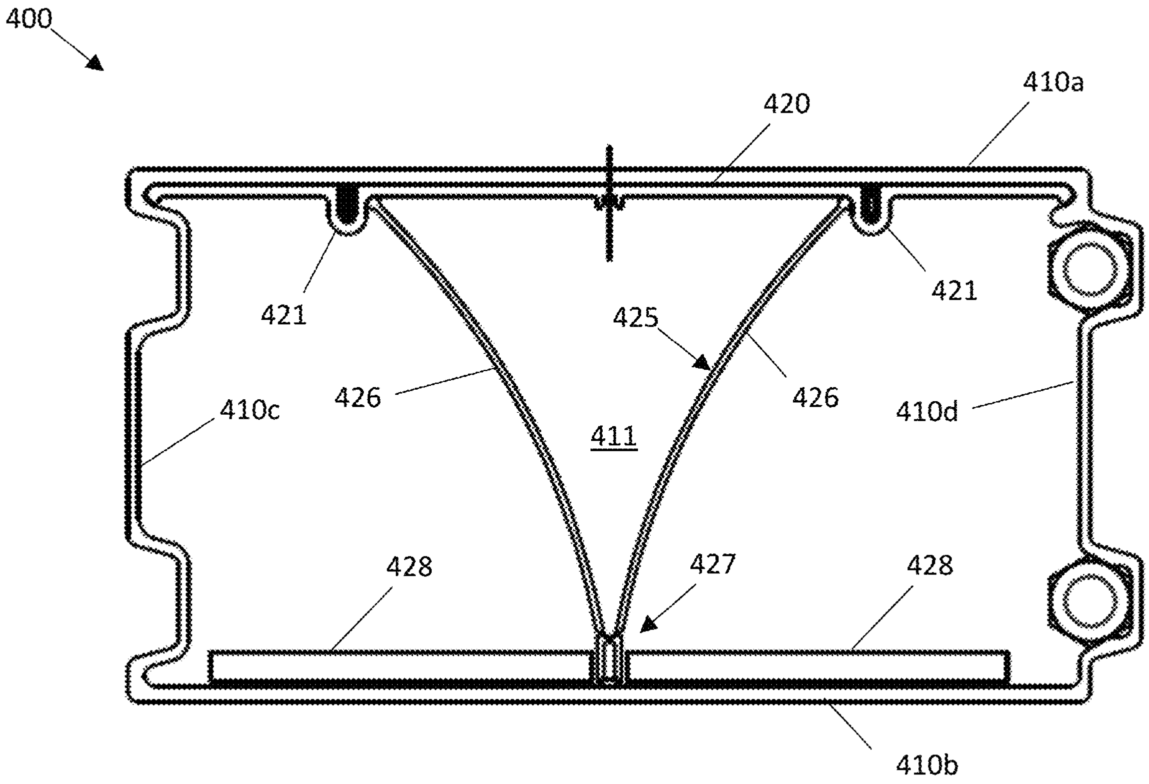
Figure 42D:
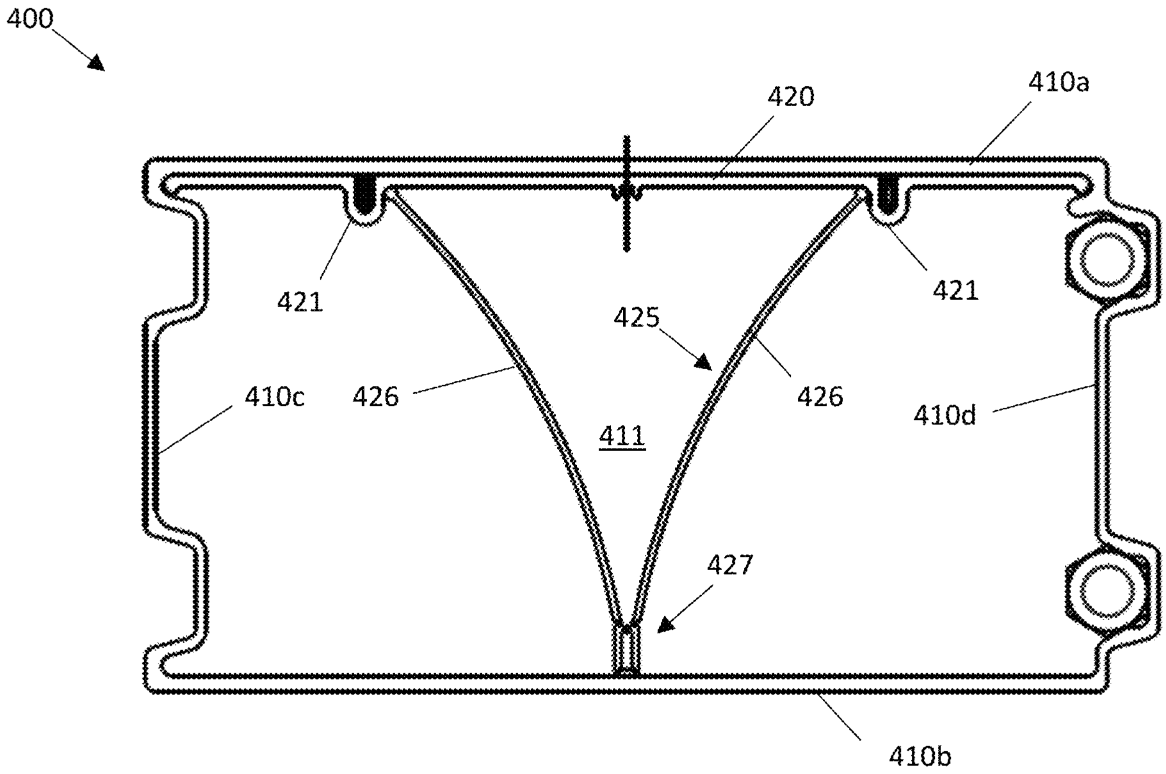

For example, a process of installing the v-shaped support 425 in the modular assembly may be as follows. The v-shaped support 425 may be inserted into the channel 411 of the base member 410, as shown in FIG. 42A. The panels 428 may be inserted into the channel 411 on either side of the pivot point 427, as shown in FIG. 42B. The panels 428 may be slid through the channel 411, so as to press the pair of extensions 426 together to be snap fit, as shown in FIG. 42C. Optionally, the panels 428 may be removed from the channel 411, as shown in FIG. 42D, and the pair of extensions 426 may remain snapped together.

With the vertical support 424 or the v-shaped support 425 inserted into the channel 411, an air gap between the heater tray 420 and the top wall 410*a* of the base member 410 may be minimized. Heat transfer between the heater tray 420 and the top wall 410*a* may be reduced by the presence of an air gap, based on thermal convection through the air gap. The vertical support 424 and the v-shaped support 425 may therefore increase the heat transfer, as the contact between the heater tray 420 and the top wall 410*a* may allow direct thermal conduction.

Each of the plurality of base members 410 may adjoin one another in an assembled state to form a horizontal platform for traffic, as shown in FIG. 37. For example, the plurality of base members 410 may be adjoined side-by-side to form a horizontal platform for traffic. Each of the plurality of base members 410 may be adjoined via fasteners or with an adhesive. For example, a fastener or adhesive may be provided between the side wall 410*c* and side wall 410*d* of adjacent base members 410 to secure the adjoined modular assembly 400 together. When adjoined, the top walls 410*a* of each base member 410 may be connected to form a continuous surface. Alternatively, the top walls 410*a* of each base member 410 may be separated by gaps. Joint seals may be disposed in these gaps to form a continuous surface with the top walls 410*a* of each base member 410.

Figure 43:
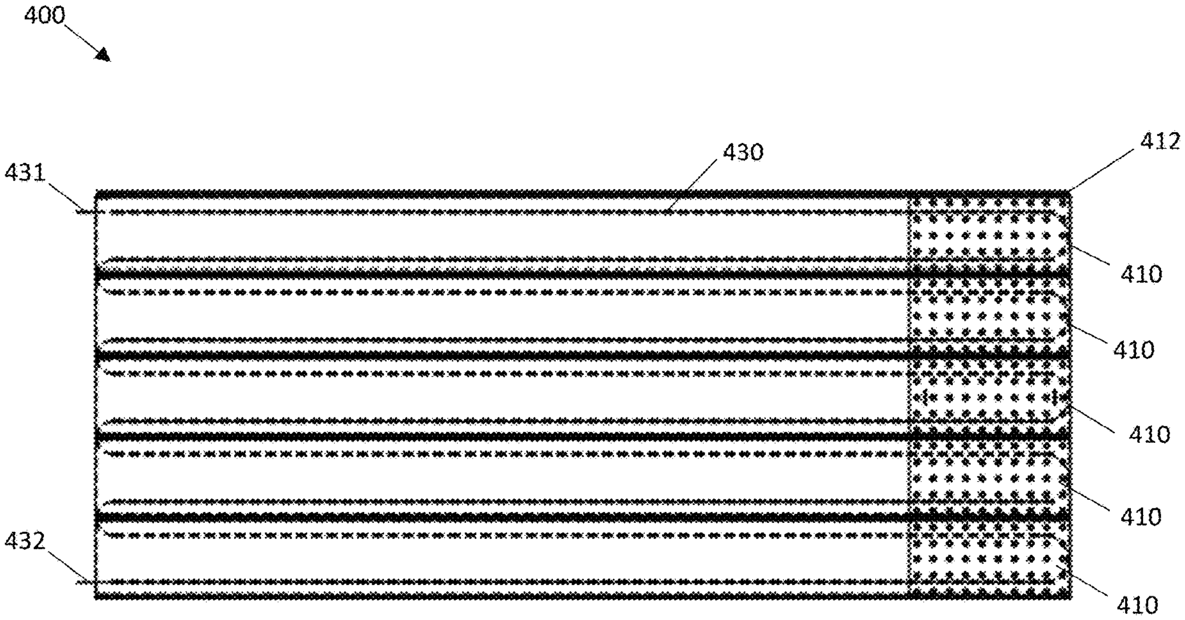
FIG. 43 is a top view of a modular assembly according to an embodiment of the present disclosure.

In an embodiment, the modular assembly 400 may be produced in 5-foot sections. For example, the modular assembly 400 may comprise five of the base members 410 shown in FIG. 38, or ten of the base members 410 shown in FIG. 39 to produce a 5-foot section. The heater trays 420 and heating elements 430 of each of the base members 410 may be installed in the respective base members 410 so as to connect each of the base members 410. For example, each heating element 430 may be connected in series or in parallel to each other in their respective heating trays 420, and may be simultaneously or successively inserted in the channel 411 of each respective base member 410. Assembled 5-foot sections are shown in FIG. 37 and FIG. 43, and an exploded view is shown in FIG. 44A. As shown in FIG. 43, the heating elements 430 of each base member 410 are connected in series, such that the circuit can be completed by connecting the first end 431 and the second end 432 to an electrical source or fluid source to generate heat in all base members 410. The first end 431 and the second end 432 of the heating element 430 are disposed at the same end of modular assembly for convenient connection to the electrical source or fluid source, or to connect to adjacent 5-foot sections.

Figure 44C:
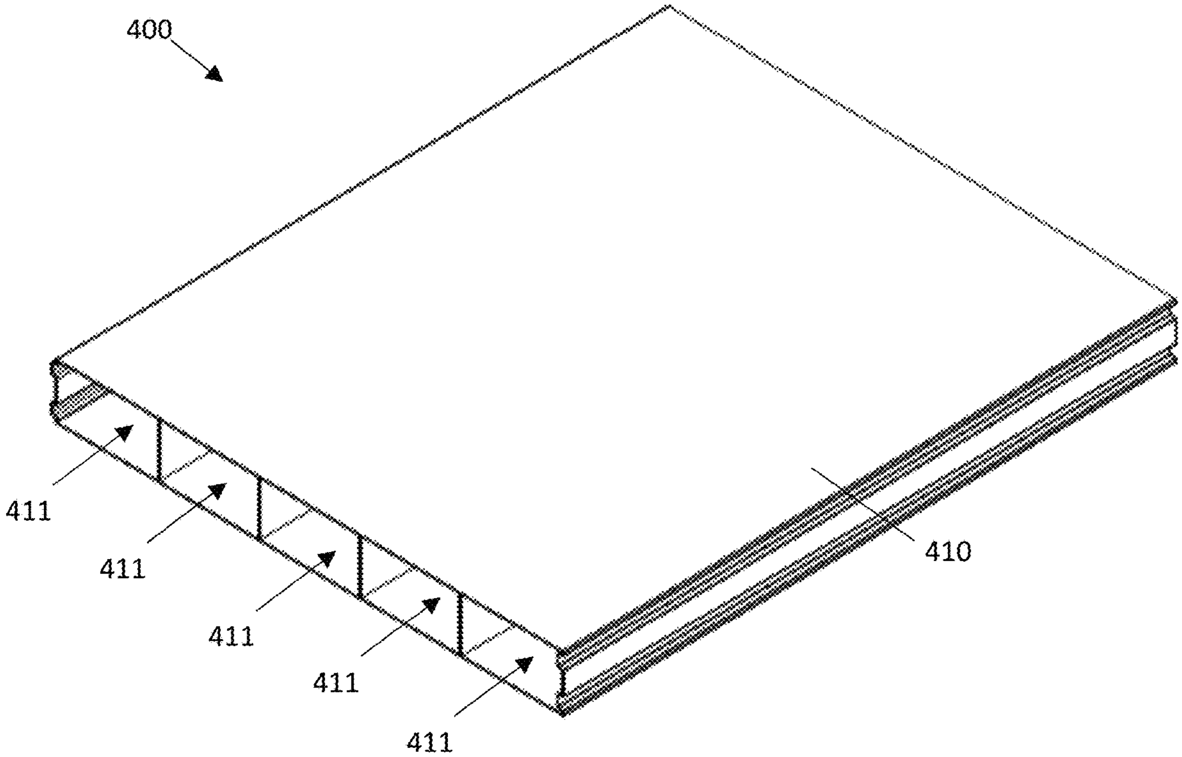
FIG. 44C is a perspective view of a modular assembly according to another embodiment of the present disclosure.

In some embodiments, the modular assembly 400 may be produced as a 5-foot section of a single base member 410, as shown in FIG. 44C, instead of assembling a plurality of base members 410. In such a case, the modular assembly

400 may still have a plurality of channels 411 configured to receive the same heater trays 420 received by the base members 410.

The heating elements 430 may be controlled to operate according to a heating cycle. For example, the heating elements 430 may be configured to generate heat in an ON state and to turn off in an OFF state. The heating cycle may define when a heating element 430 is in the ON state and the OFF state. For example, the heating cycle may control one or more of the heating elements 430 to be in the ON state at a time, while the other heating elements 430 are in an OFF state. After a period of time, one or more of the heating elements 430 may change to the ON state and/or change to the OFF state. It should be understood that the base members 410 may be configured to retain heat, so as to operate off of the residual heat, even when the heating element 430 contained within the respective base member 410 is in the OFF state. In addition, the heating elements 430 of adjacent base members 410 or 5-foot sections may provide heat to the adjacent base members 410. Thus, the heating elements 430 may be coordinated to heat the overall modular assembly 400. The heating cycle may therefore be designed to control the periods of time that each of the heating elements 430 are in the ON state and the OFF state so as to provide effective heating to the modular assembly 400.

Figure 45A:
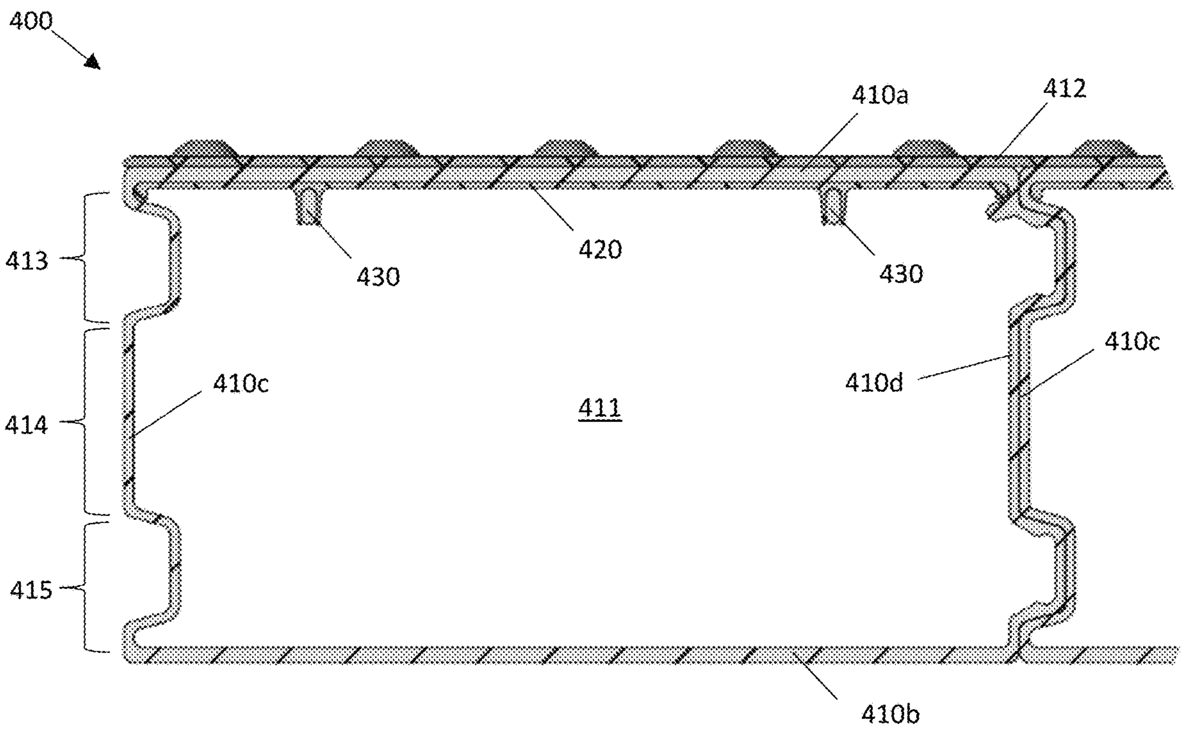
FIG. 45A is a cross-sectional view of a portion of a modular assembly according to an embodiment of the present disclosure.
Figure 45B:
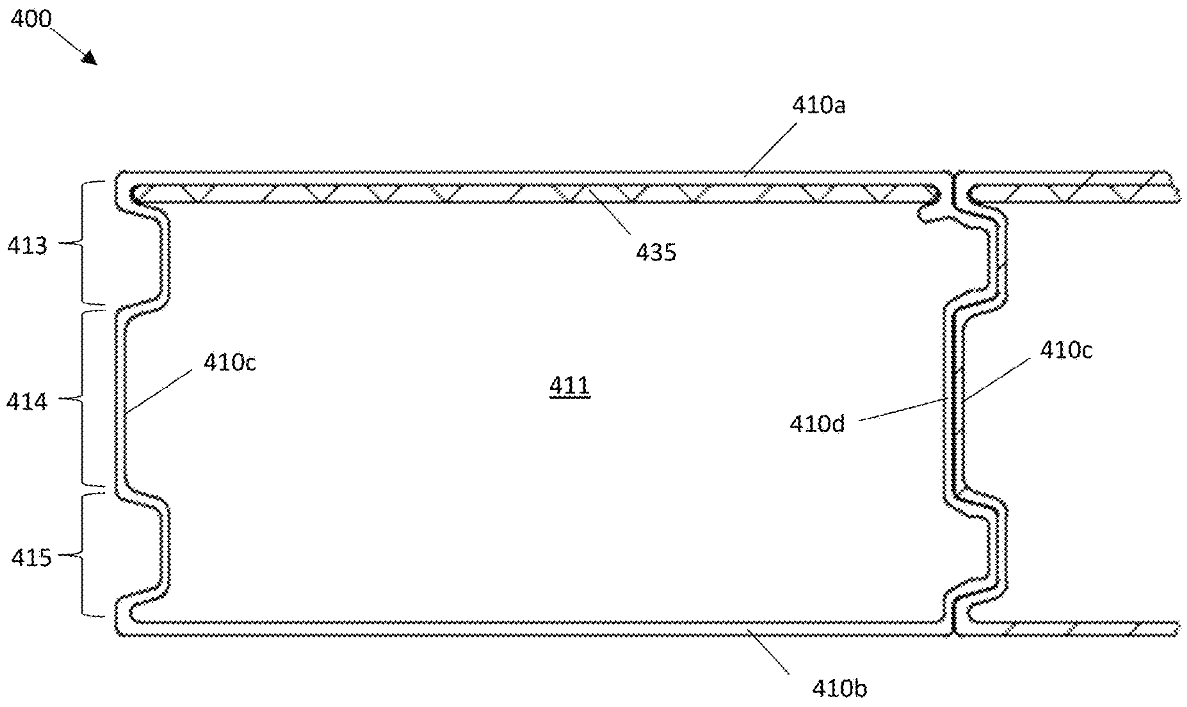
FIG. 45B is a cross-sectional view of a portion of a modular assembly according to another embodiment of the present disclosure.

As shown in FIG. 45A and FIG. 45B, each of the opposing side walls 410*c*, 410*d* may have cooperating profiles. For example, the side walls 410*c*, 410*d* may each include a first section 413, a second section 414, and a third section 415. The first section 413 may be proximal to the top wall 410*a*, the third section 415 may be proximal to the bottom wall 210*b*, and the second section 414 may be arranged between the first section 413 and the third section 415. The three sections 413-415 may have alternating structures. For example, first section 413 and the third section 415 may have similar structure that differs from the structure of the second section 414. The first section 413 and the third section 415 may protrude in the same direction. For example, the first section 413 and the third section 415 may protrude inwardly or outwardly. The first section 413 and the third section 415 of the side walls 410*c*, 410*d*, may also protrude in the same direction. For example, the first section 413 and the third section 415 of side wall 410*c* may protrude inwardly, and the first section 413 and the third section 415 of the side wall 410*d* may protrude outwardly, such that both the first section 413 and the third section 415 of the side walls 410*c*, 410*d* protrude to the right as shown in FIG. 42. The second section 414 may be aligned with the top wall 410*a* and bottom wall 410*b*, such that it does not protrude. When the plurality of base members 410 are adjoined, the three sections 413-415 of adjacent side walls 410*c*, 410*d* may cooperate based on their corresponding profiles. For example, the inward protrusions of the first section 413 and the third section 415 of the side wall 410*c* may be received by the outward protrusions of the first section 413 and the third section 415 of the adjacent side wall 410*d*. The second sections 414 of each side wall 410*c*, 410*d*, may similarly be flush with one another.

Figure 46:
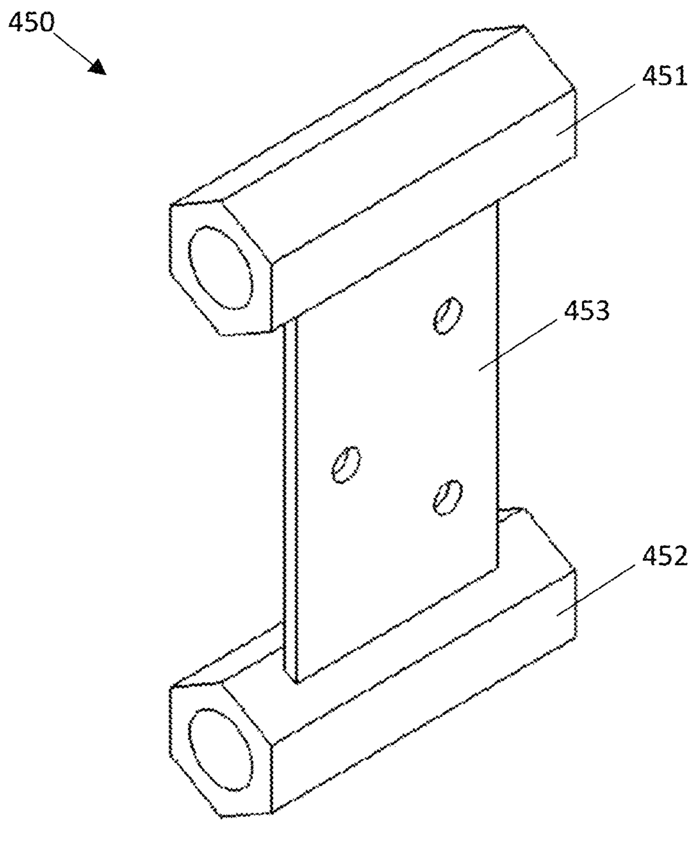
FIG. 46 is a perspective view of a coupler assembly according to an embodiment of the present disclosure.
Figure 47:
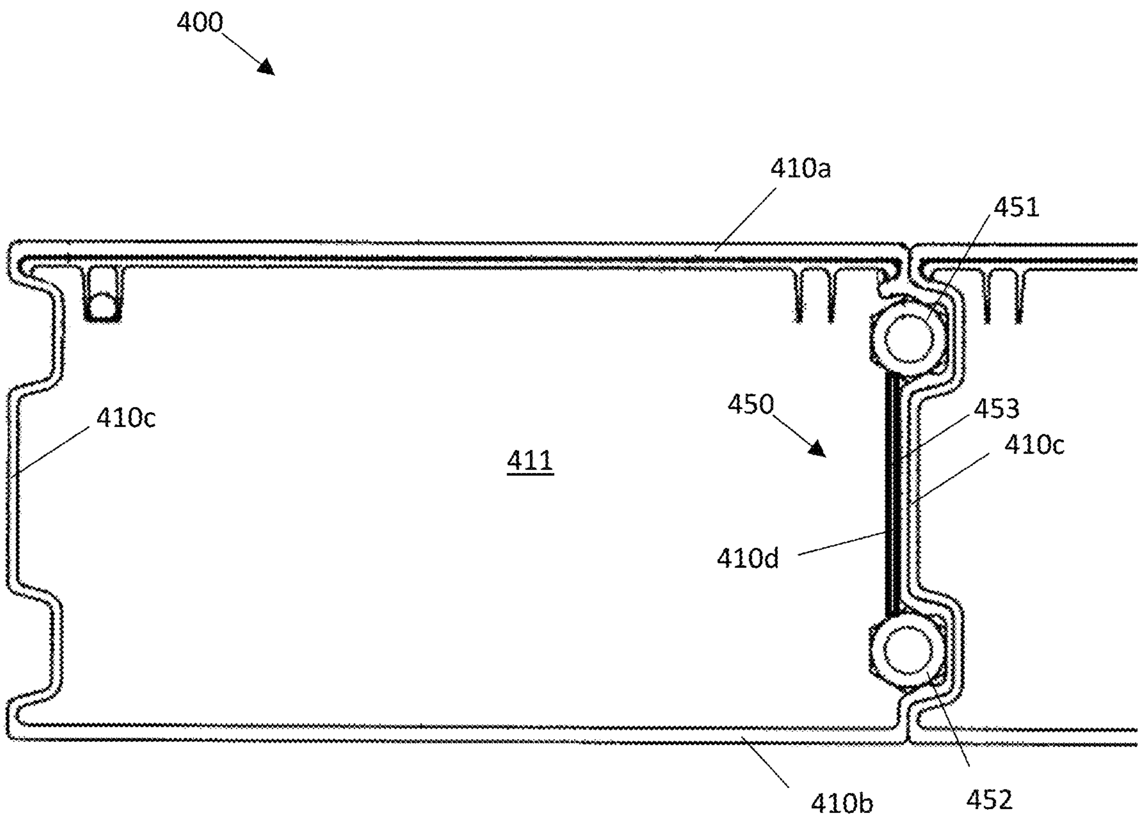
FIG. 47 is a cross-sectional view of a portion of a modular assembly according to an embodiment of the present disclosure.

The modular assembly 400 may further comprise a coupler assembly 450. As shown in FIG. 46, the coupler assembly 450 may comprise a first coupler 451, a second coupler 452, and a connecting plate 453. The first coupler 451 and the second coupler 452 may have internal threading. The first coupler 451 may be received in the first section 413 of the side wall 410*c*, and the second coupler 452 may be received in the third section 415 of the side wall 410*d*. For example, the first coupler 451 and the second coupler 452 may be secured via an adhesive or fastener in the first section 413 and third section 415 respectively. The first coupler 451 and the second coupler 452 may have an external shape that corresponds to the shape of the first section 413 and third section 415, respectively. For example, as shown in FIG. 47, the first coupler 451 and the second coupler 452 may have a hexagonal shape, which fit within the shapes of the first section 413 and third section 415. The connecting plate 453 may connect the first coupler 451 and the second coupler 452. The connecting plate 453 may be received in the second section 414 of the side wall 410*d*. For example, the connecting plate 453 may be secured via an adhesive or fastener to the second section 414. The connecting plate 453 may have holes to fasten adjoining side walls 410*c*, 410*d* together.

Figure 48:
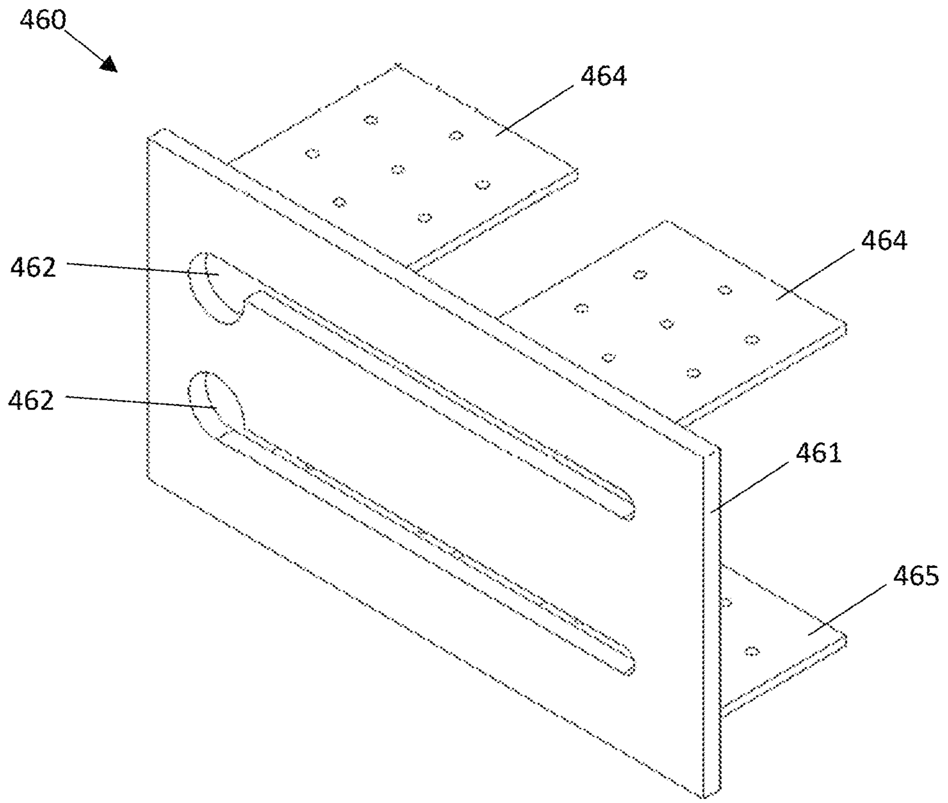
FIG. 48 is a perspective view of a mounting bracket according to an embodiment of the present disclosure.
Figure 49:
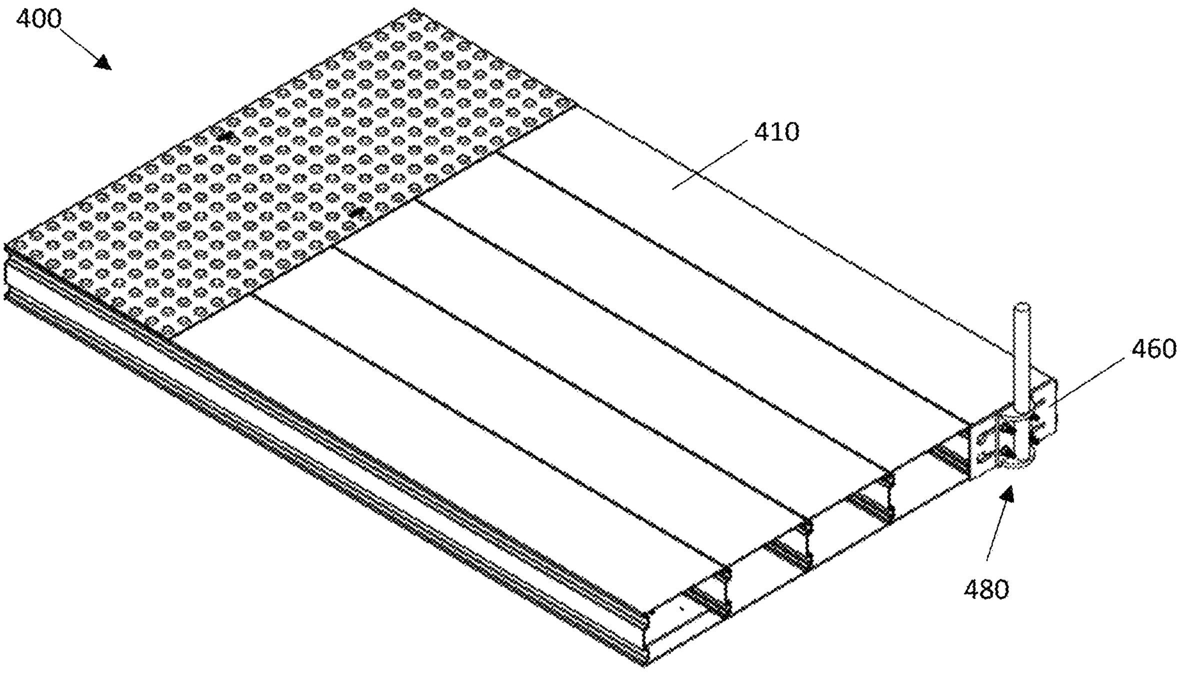
FIG. 49 is a perspective view of a modular assembly with a mounting bracket showing an above-surface structure connected thereto.
Figure 50:
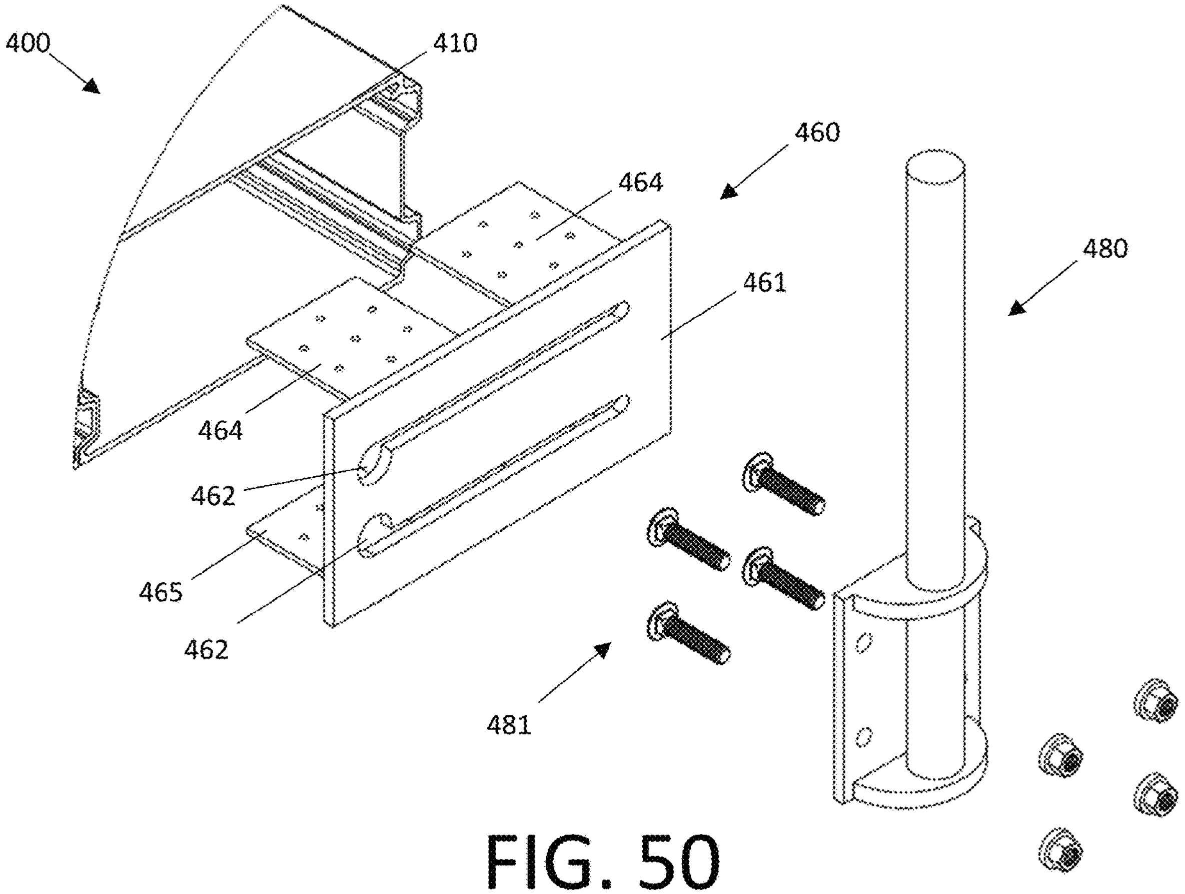
FIG. 50 is an exploded view of a portion of a modular assembly with a mounting bracket and connectable structure.

The modular assembly 400 may further comprise a mounting bracket 460, shown in FIG. 48. The mounting bracket 460 may include a vertical plate 461. The vertical plate 461 may comprise a pair of keyways 462. The pair of keyways 462 may extend horizontally along the vertical plate 461 in parallel. The mounting bracket 460 may be configured to connect the modular assembly 400 to adjacent or above-surface structures 480, such as walls, guard rails, and the like. For example, as shown in FIG. 50, fasteners 481 may extend through each of the keyways 462 to connect to adjacent structures 480 and other components. When connected to the mounting bracket 460, the fasteners 481 may be slidable within the keyways 462, so as to adjust the horizontal placement of a connected structure 480 (e.g., a railing post), as shown in FIG. 49. The mounting bracket 460 may include additional apertures to secure the modular assembly 400 to other adjacent structures and components.

The mounting bracket 460 may include an upper horizontal plate 464 and a lower horizontal plate 465. The upper horizontal plate 464 and the lower horizontal plate 465 may extend from the vertical plate 461. The upper horizontal plate 464 may be secured to the top wall 410*a* of the base member 410, and the lower horizontal plate 465 may be secured to the bottom wall 410*b* of the base member 410.

Figure 51:
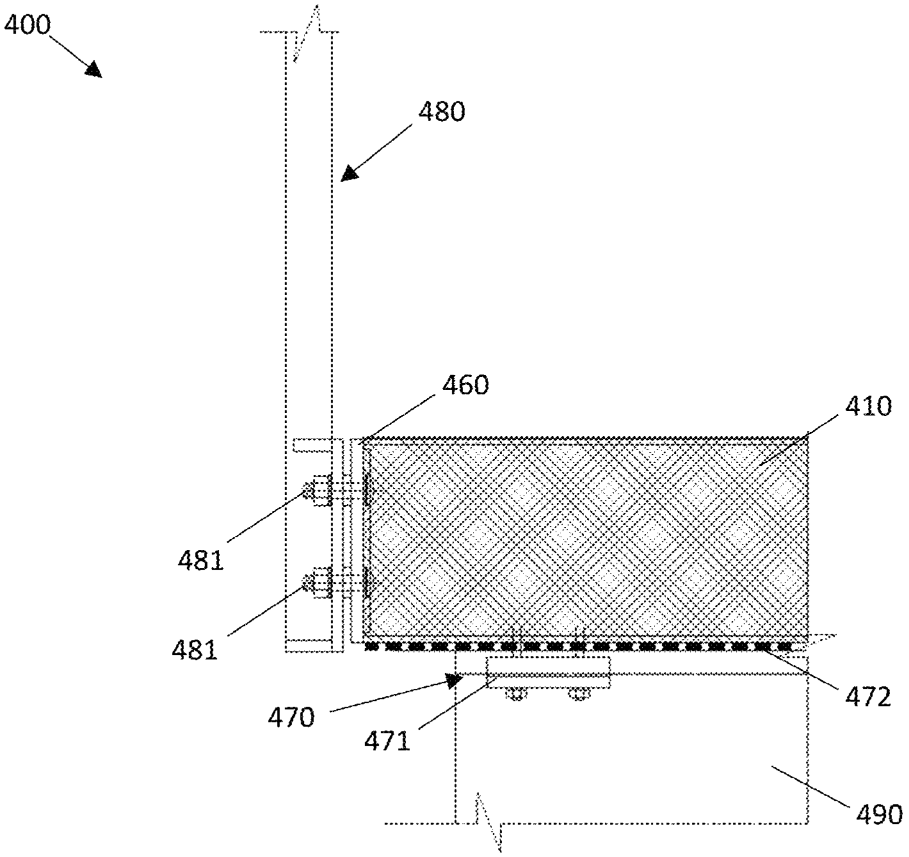
FIG. 51 is a side view of a portion of a modular assembly with a mounting bracket and lower support structure showing above-surface and below-surface structures connected thereto.
Figure 54:
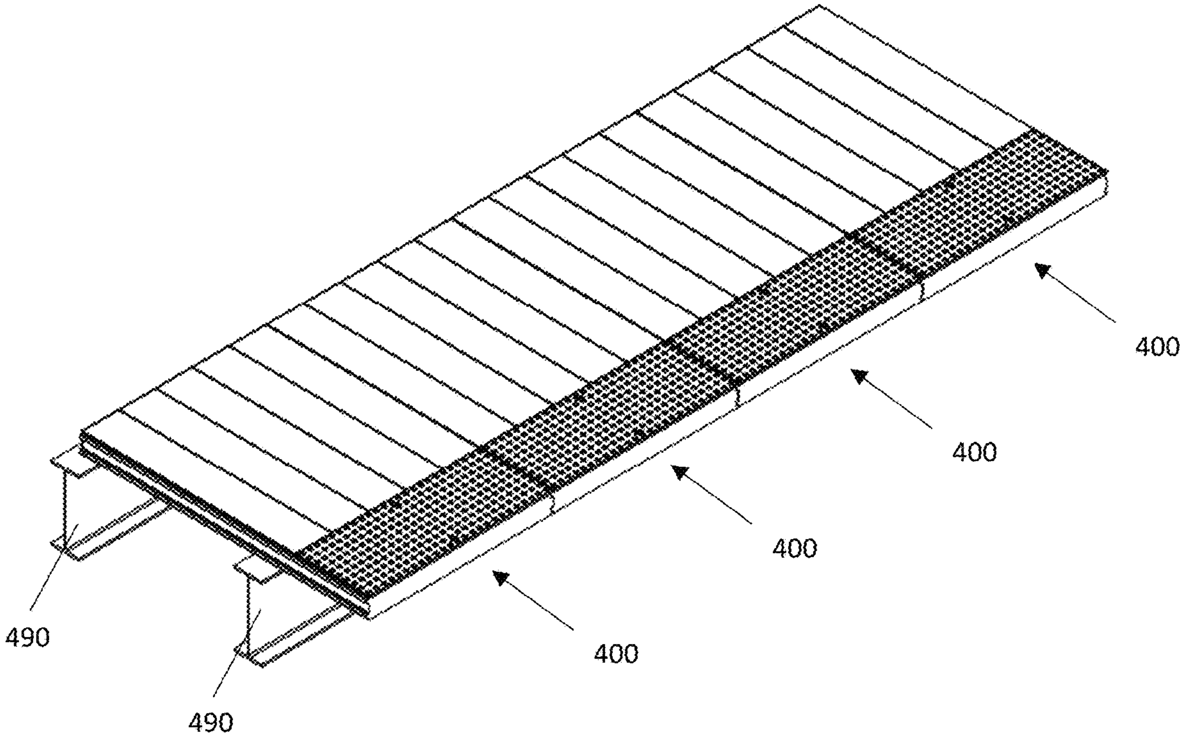
FIG. 54 is a perspective view of a modular assembly according to an embodiment of the present disclosure.

As shown in FIG. 51, the modular assembly 400 may further comprise a lower support structure 470. The lower support structure 470 may include a metal plate 471. The metal plate 471 may be secured to the bottom wall 410*b* of adjacent base members 410. For example, the metal plate 471 may be riveted to the bottom wall 410*b* of adjacent base members 410. In this way, adjacent base members 410 may be further secured together. The lower support structure 470 may be configured to connect the modular assembly 400 to below-surface or ground structures 490. For example, as shown in FIG. 54, the lower support structure 470 may include apertures to secure the modular assembly 400 to below-surface or ground structures 490, such as an I-beam. A bearing pad 472 may be disposed between the bottom wall 410*b* and the connected structures and sandwiched by the lower support structure 470. The bearing pad 472 may be made of a flexible material, such as neoprene.

Figure 52:
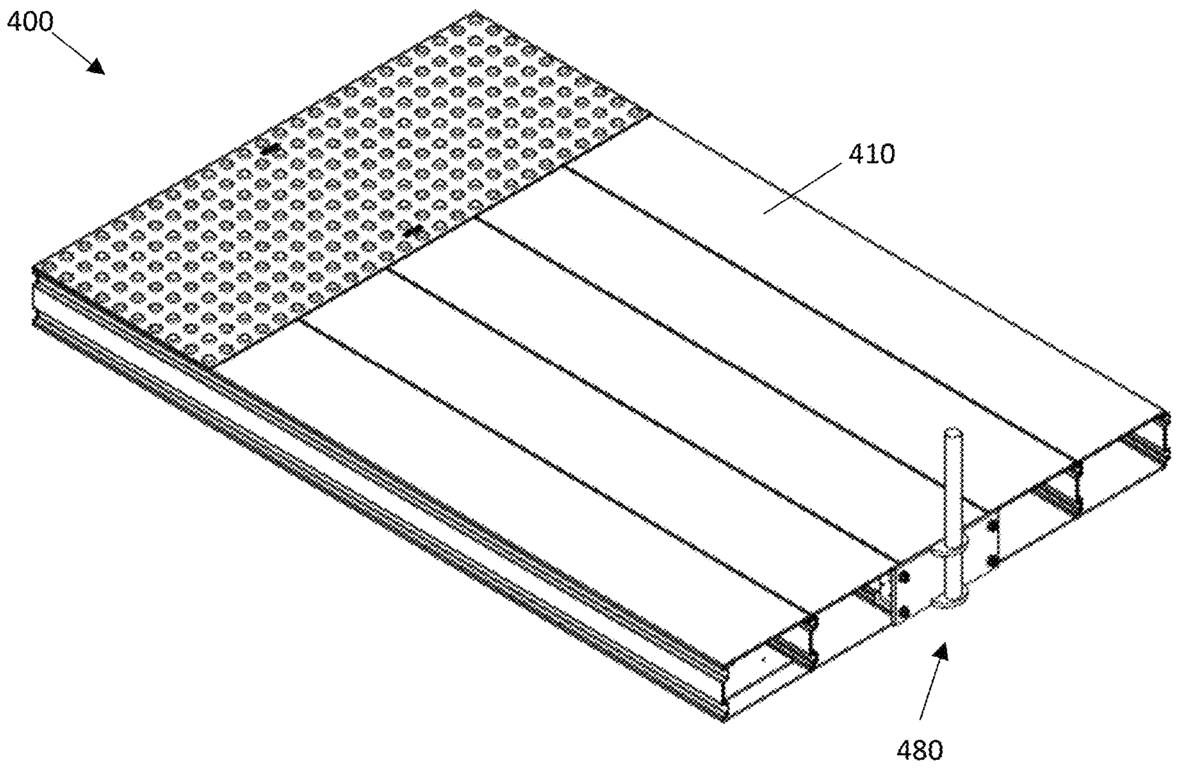
FIG. 52 is a perspective view of a modular assembly showing another above-surface structure connected thereto.
Figure 53:
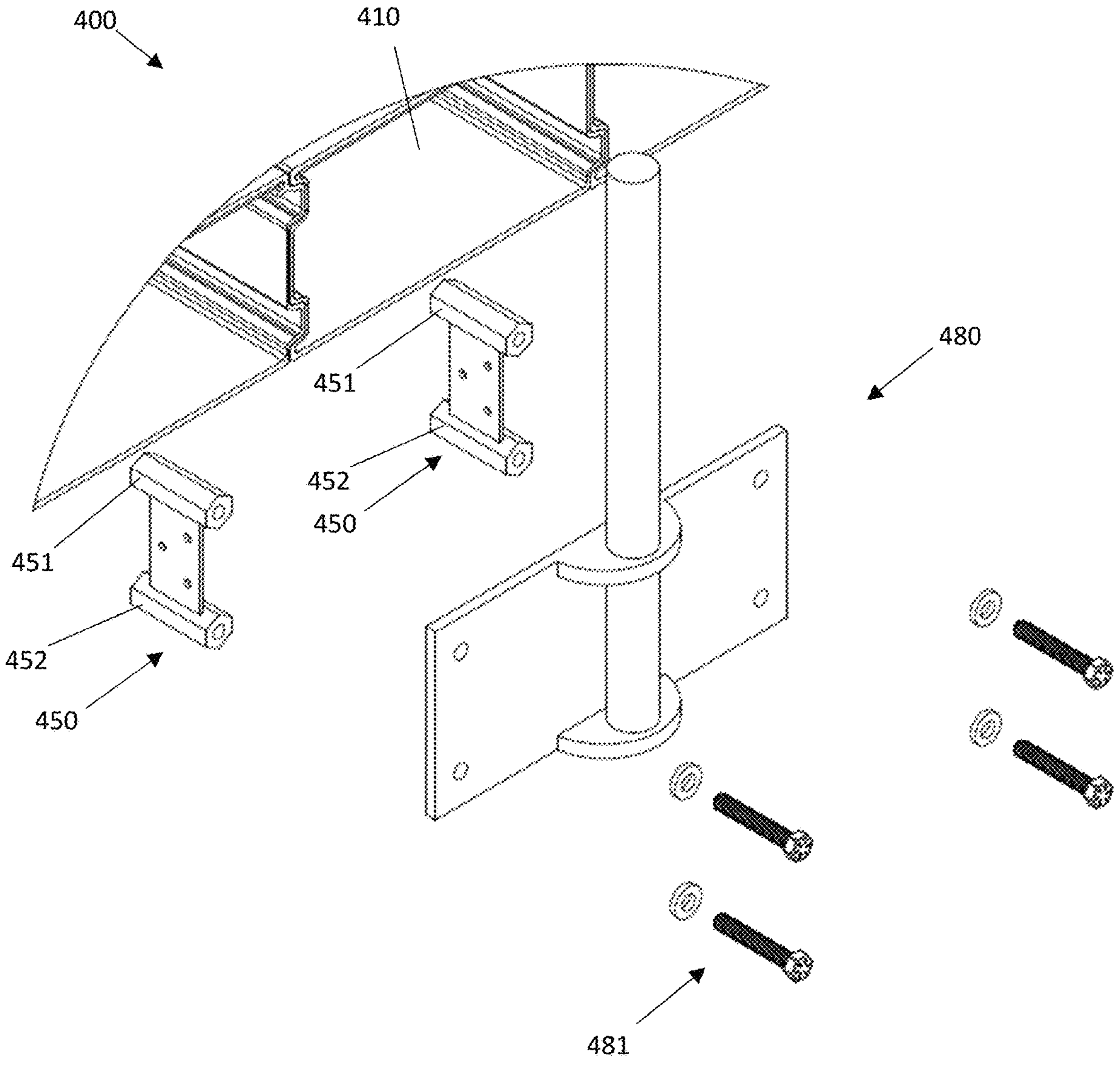
FIG. 53 is an exploded view of a portion of a modular assembly with a connectable structure and corresponding coupling assemblies.

As shown in FIGS. 52-53, the above-surface structures 480 may be connected to the modular assembly 400 by the coupler assemblies 450. For example, the fasteners 481 may be connected to the first coupler 451 and second coupler 452 of adjacent coupler assembles 450.

Figure 55:
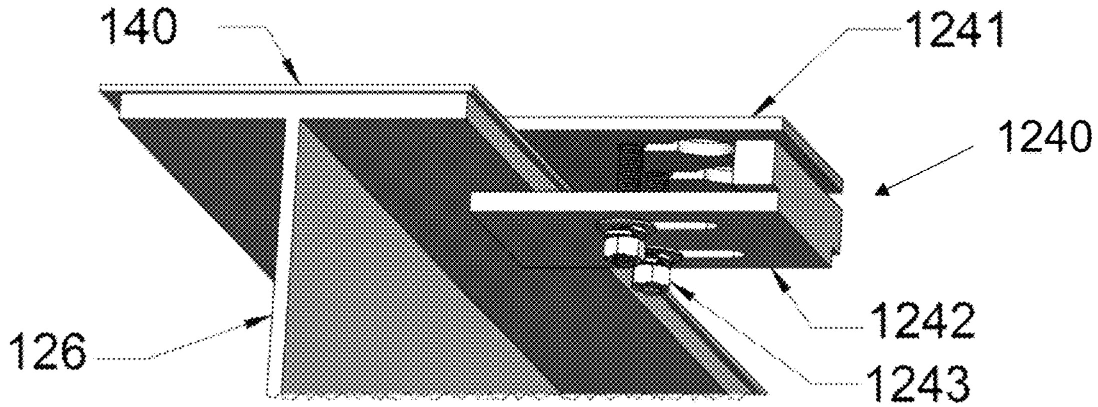
FIG. 55 is a perspective view of a mounting bracket according to another embodiment of the present disclosure fixed to a lower support structure.
Figure 56:
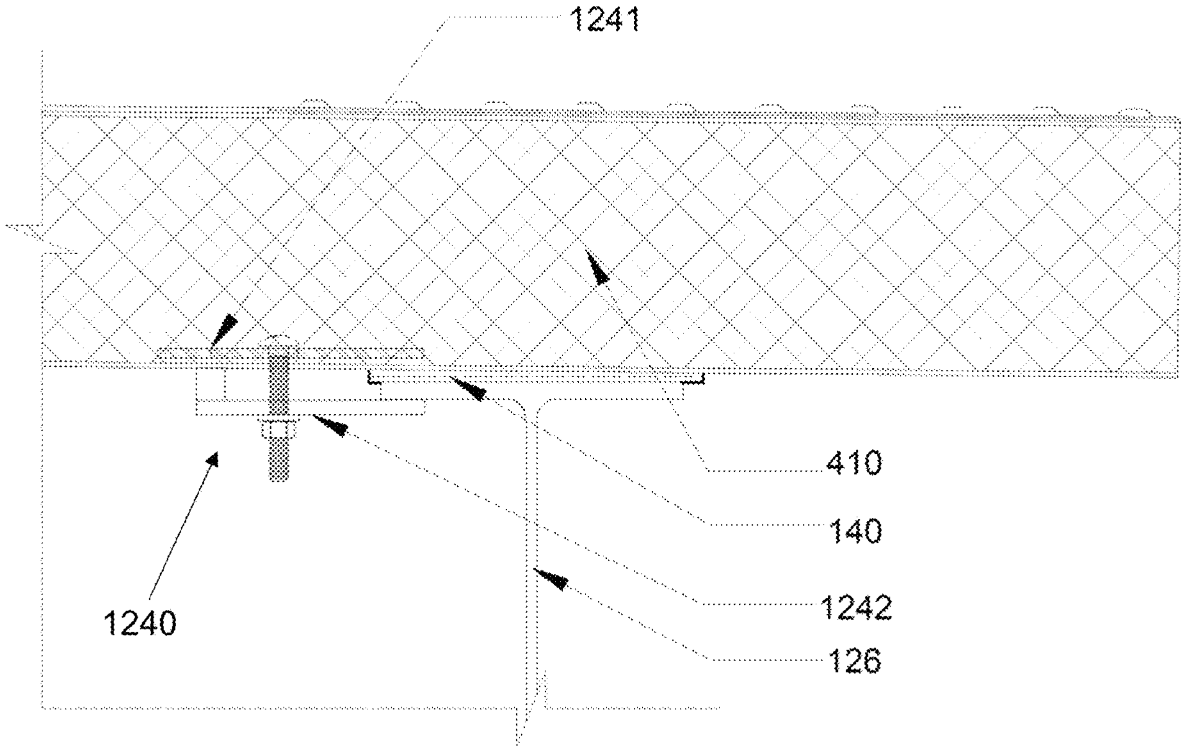
FIG. 56 is a partial section view the mounting bracket fixed to a lower support structure and a base member of the present disclosure.

FIGS. 55-56 illustrate another exemplary mounting bracket 1240, which can be used to fasten a base member 410 to a lower support structure 126, such as a helical pile and/or an I-beam as described throughout the present disclosure. As shown in FIG. 54, the mounting bracket 1240 can include an upper plate 1241, a lower plate 1242, and fasteners 1243. As shown in FIG. 55, the upper plate 1241 can be disposed within a wall of the base member 410, to allow the base member 410 to be secured (e.g., clamped) to a lower support structure 126. As generally described with respect to other embodiments of the present disclosure, a bearing pad 140, such as a ⅛" neoprene bearing pad, can be positioned between the base member 410 and the lower support structure 126.

Figure 57:
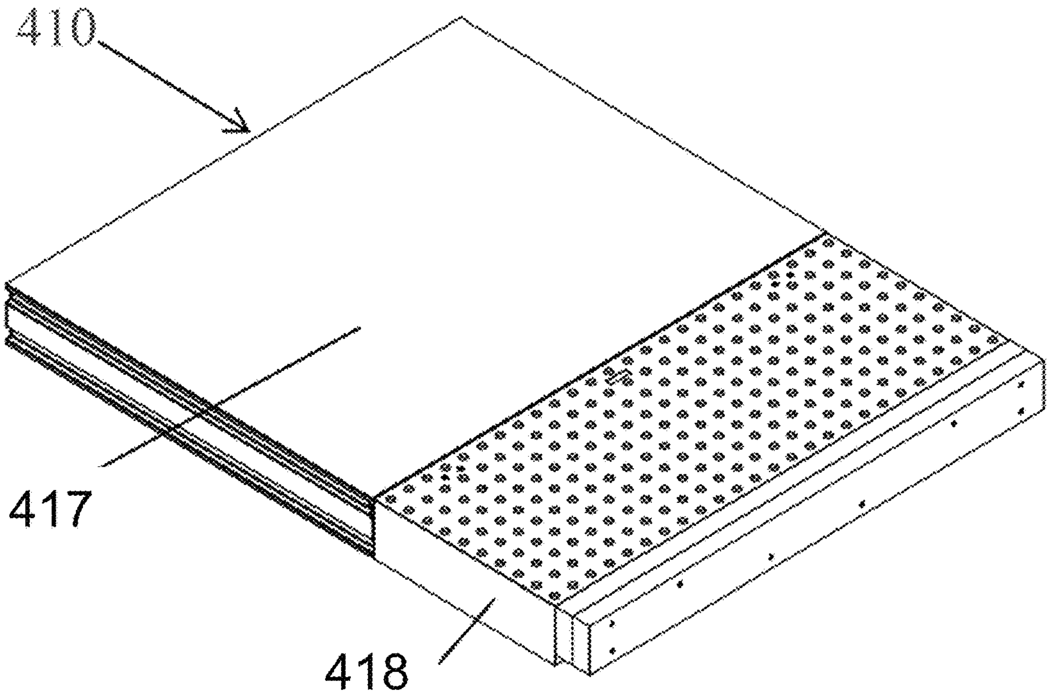
FIG. 57 is a perspective view of a modular assembly according to an embodiment of the present disclosure having a retractable edge in a lowered position.
Figure 58:
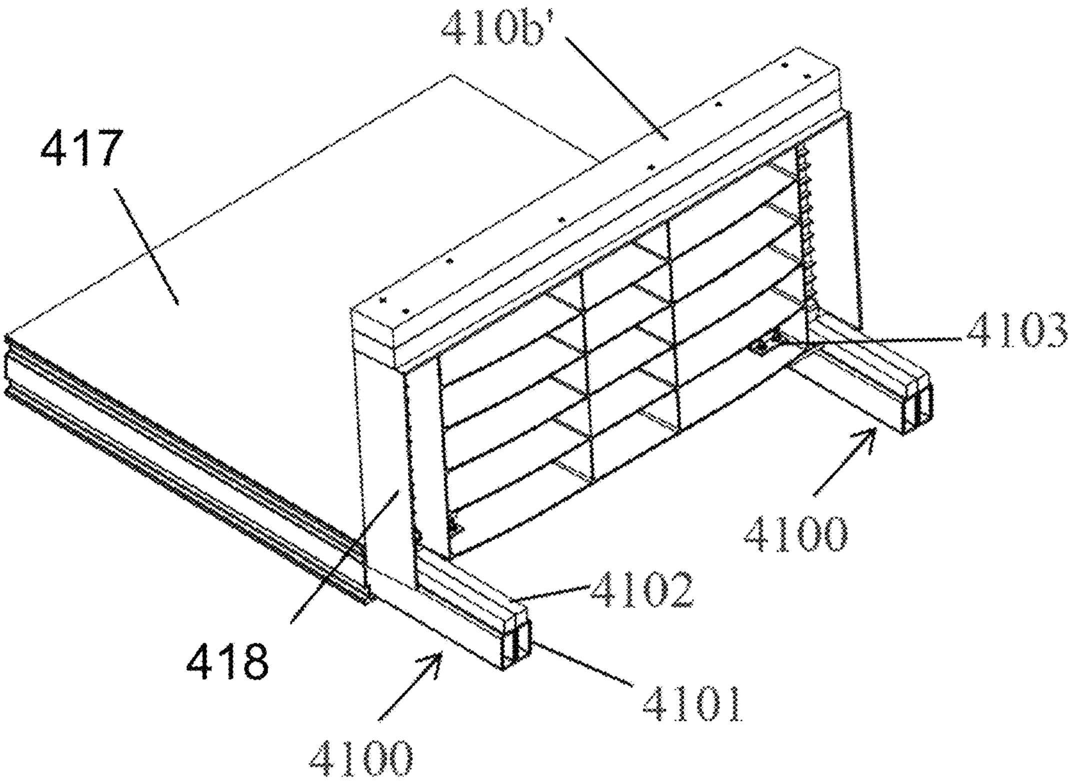
FIG. 58 is a perspective view of the modular assembly with the retractable edge in a retracted position.
Figure 59:
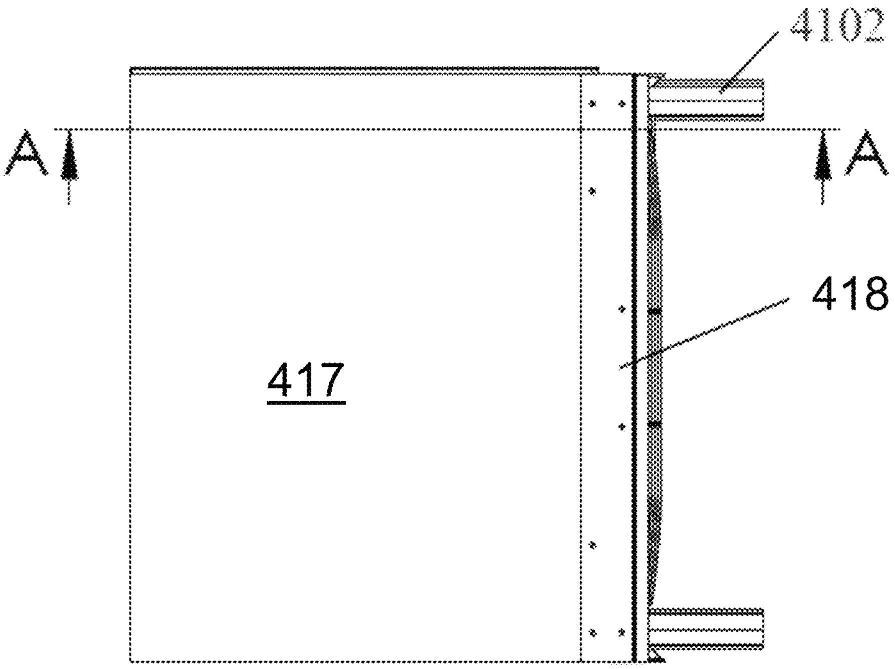
FIG. 59 is a top view of the modular assembly with the retractable edge in the retracted position.
Figure 60:
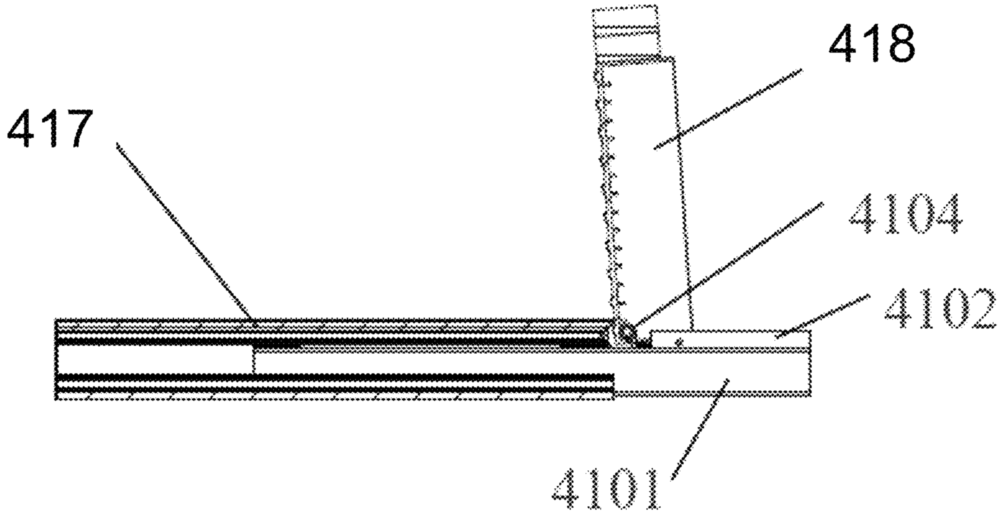
FIG. 60 is a side view of the modular assembly with the retractable edge in the retracted position.

The principles of the present disclosure can also be applied to adjustable train platforms, which allow for both freight trains and passenger trains to pass. FIGS. 57-60 depicts an exemplary base member 410 having a fixed portion 417 and a retractable edge 418. As shown in FIG. 57, the retractable edge 418 can be lowered so that the passenger platform can align with a passenger train. Since freight trains can generally have a larger width compared to passenger trains, the retractable edge 418 can be moved to the upright position (shown in FIG. 58) to let freight trains pass.

In one example, the fixed portion 417 can be substantially similar to other base members described throughout the present disclosure. The retractable edge 418 can also substantially similar to other base members described throughout the present disclosure (e.g., be made of a composite material), but allow for retraction. A lower support structure 4100 can be disposed within the fixed portion 417 and extend outwardly to support the retractable edge 418 in a lowered position. For example, the lower support structure 4100 can include one or more lower supports 4101 and one or more upper supports 4102. One or more brackets 4103 (shown in FIG. 58) can be used to receive one or more axles 4104 (shown in FIG. 60) to allow the retractable edge 418 to rotate between lowered and retracted positions. The one or more axles 4104 may be disposed in a space between fixed portion 417 and the one or more upper supports 4102. The retractable edge 418 can include bumpers **410*b*' to help reduce the gap between the retractable edge 418 and a train, and/or to protect the retractable edge 418 from a train. The bumpers 410*b*' can be made of any suitable material, including a plastic, plastic composite, and/or wood. While the illustrated retractable edge 418 is configured to be manually retractable, it is contemplated that motor(s) could be added to allow for motorized movement of the retractable edge 418 (e.g., by rotating the one or more axles 4104**), according to the same principles previously outlined.

According to certain applications, it may be necessary for a modular platform to be sloped or cambered. For pathway and train platform applications, a slight slope can prevent the accumulation of water on the platform, which can create slippery conditions and pose a safety hazard to passengers. The slope can direct rainwater towards designated drainage systems, ensuring the platform remains dry and safe for use, even during heavy rainfall. However, due to limitations with certain manufacturing processes, such as pultrusion, it can be difficult to efficiently manufacture a base member, or arrange and install a plurality of base members, to provide a suitable slope or camber. FIGS. 61-64 illustrate an example of a sloped base member 410' according to an embodiment of the present disclosure.

Figure 61:
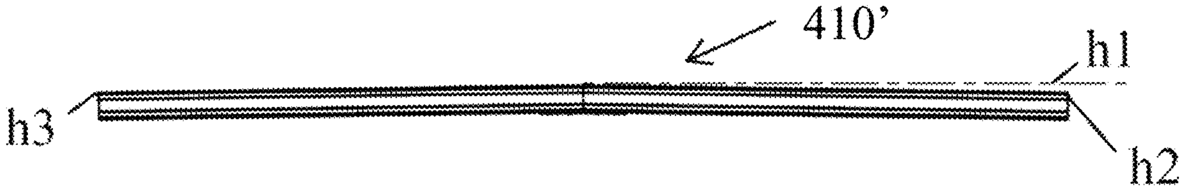
FIG. 61 is a side view of a sloped based member of a modular assembly according to an embodiment of the present disclosure.

FIG. 61 is a side elevation view of the exemplary sloped base member 410'. The sloped base member 410' may be substantially similar to other base members described throughout the present disclosure but is designed such that at least one its edges is positioned lower than its center. For example, the sloped base member 410' may have a difference in height from the center h1 to the height of at least one of the ends h1 and h2. The vertical distance between h1 and h2 and/or between h1 and h3 may define the slope of the sloped base member 410'. In the example shown in FIG. 61, the height of h2 may be equal to h3, and h2 may be less than h1, which provides a slope from the center h1 toward the ends h2 and h3 of the base member 410'. In another embodiment, h1 and h3 may be equal in height, and h2 be lower than h1 so as to provide a slope from the center of the base member 410' toward h2. The distance between h1 and h2 and/or between h1 and h3 can differ depending on the particular application and span of the sloped base member 410'. According to certain embodiments, the distance between h1 and h2 or between h1 and h3 can range from 0.5" to 3". As a specific example, the distance between h1 and h2 can be 1¾" for a sloped base member 410' having a horizontal span (i.e., end to end from h2 to h3) of 19' 2¼" (in a sloped position). According to additional embodiments, the base member 410' may have multiple kerfs 4203. It should be further noted that the kerf(s) 4203 can be positioned at any location of the base member 410', not just the center of the base member 410', depending on the desired application.

Figure 62A:
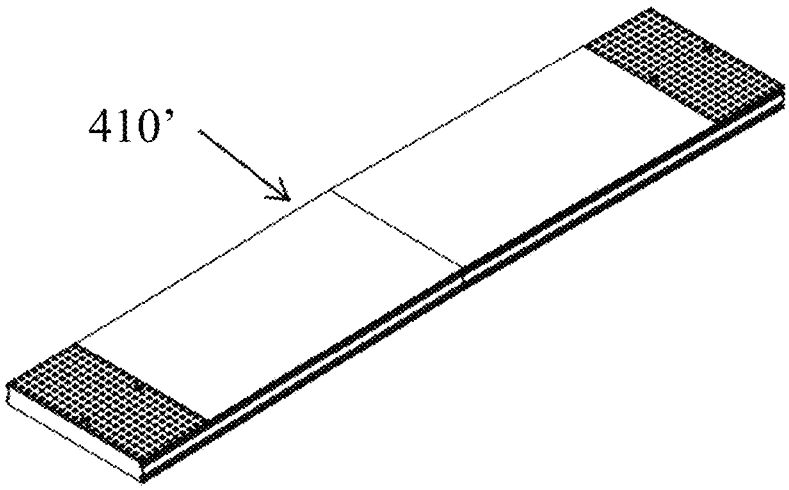
FIG. 62A is a top perspective view of the sloped base member.
Figure 62B:
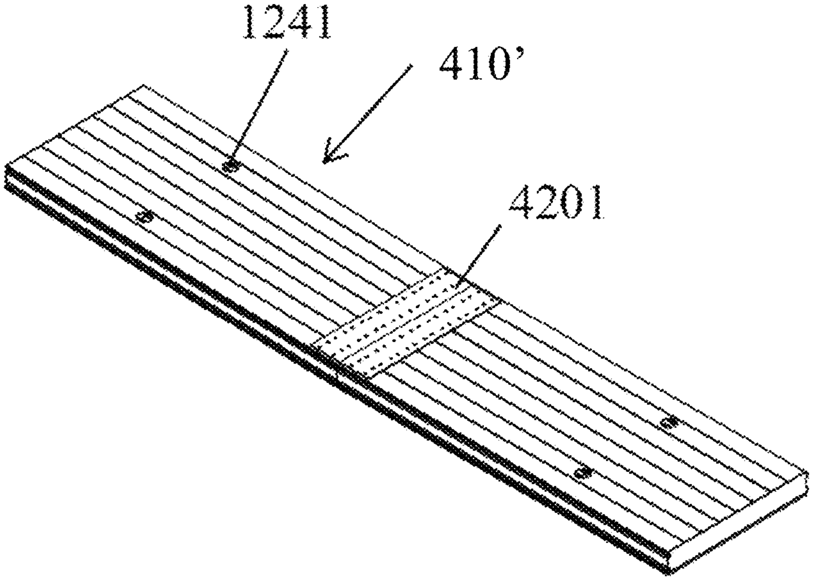
FIG. 62B is a bottom perspective view of the sloped base member.

FIGS. 62A and 62B are top and bottom perspective views of the sloped base member 410'. The bottom of the sloped base member 410' can have a reinforcement member 4201 and an upper plate 1241 of a mounting bracket. The reinforcement member 4201 can be a composite or metal plate, and adhered and/or mechanically fastened (e.g., via rivets, screws, bolts, etc.) to reinforce the bottom of the sloped base member 410'. As one specific example, the reinforcement member 4201 can be a fiber-reinforced-polymer ("FRP") plate, that is attached to the sloped base member 410' via a plurality of steel rivets as well as a structural adhesive.

Figure 63:
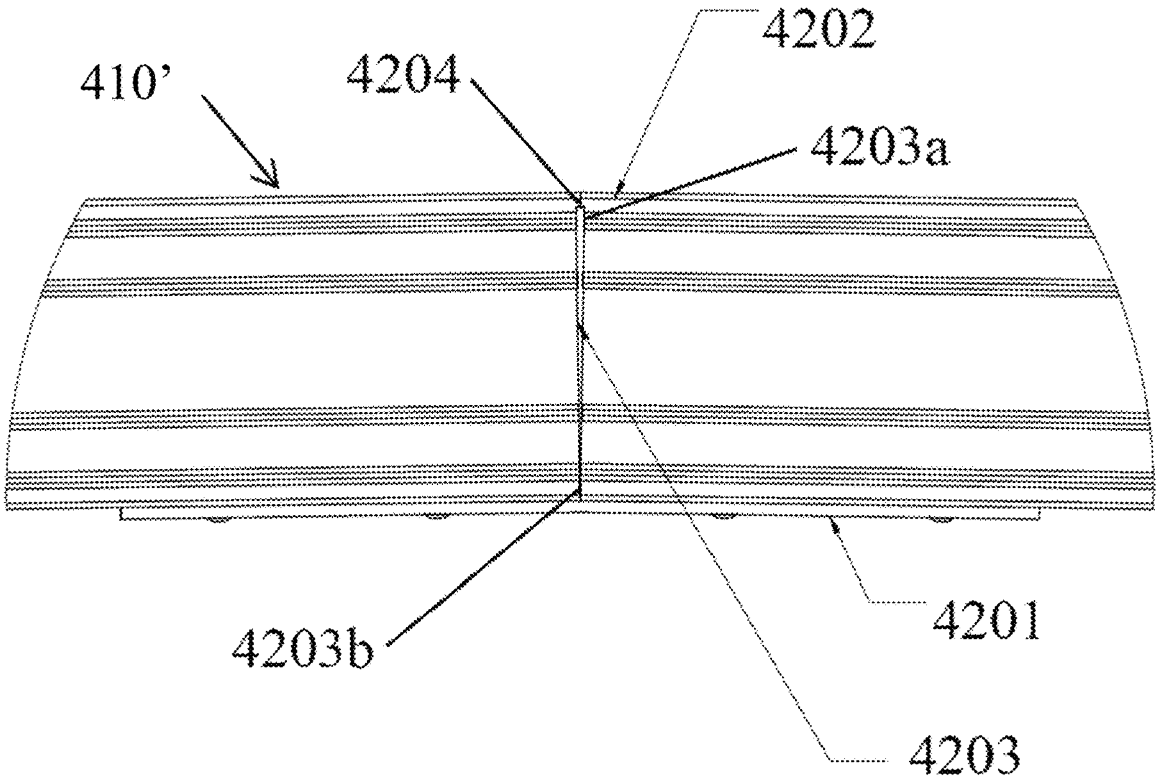
FIG. 63 is a detail view of the sloped base member illustrating a bend at a kerf.

FIG. 63 is a detail view, illustrating a kerf 4203 extending partially through the sloped base member 410'. At least a portion of the sloped base member 410', such as top surface 4202 and area 4204, between the top surface 4202 and the kerf start **4203*a*, can be monolithic. The kerf end 4203*b* terminates at the bottom surface of the base member and adjoins the reinforcement member 4201**.

Figure 64:
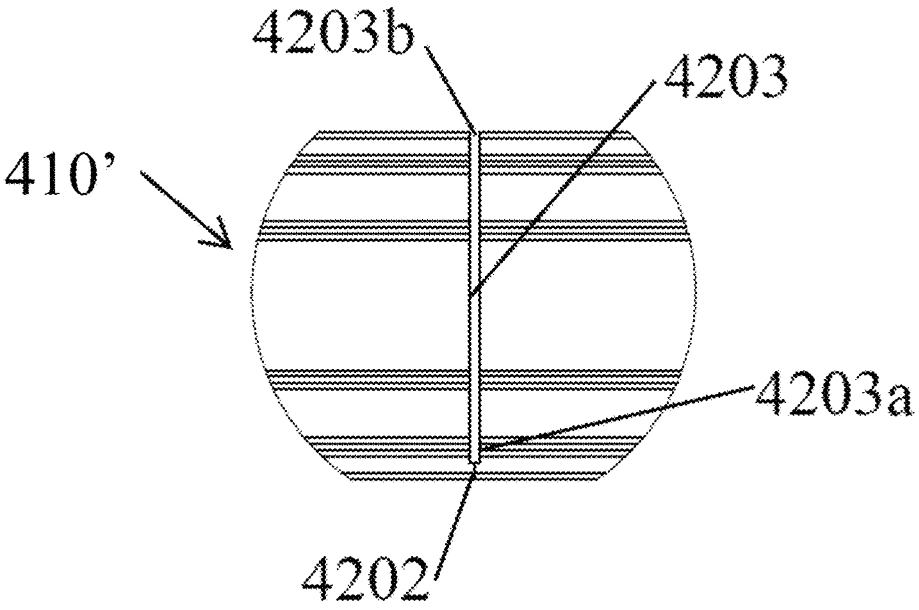
FIG. 64 is a detail view of a precursor structure of the sloped base member illustrating the kerf prior to the bend.

FIG. 64 illustrates an exemplary precursor structure of the sloped base member 410', prior to being bent into the sloped position of FIGS. 61-63. Specifically, the kerf 4203 can be formed by cutting from the bottom of the base member (oriented upwardly in FIG. 64), toward the top surface 4202 of the base member, thereby defining the kerf start **4203*a* and kerf end 4203*b*. Although the kerf 4203 is illustrated as having a consistent width, it may be tapered, triangular, angled, curved, polygonal, or have an irregular shape depending on the desired application. After the kerf 5203 is formed, the sloped base member 410' can be bent (or bend due to the force of gravity) about area 4204, such that the walls at the kerf end 4203*b* touch one another. In this way, the width or space in the kerf 4203 defines the angle that the sloped base member 410' is sloped. After the sloped base member 410' is in an angled or sloped position, the reinforcement member 4201 affixed to the sloped base member 410' to support each side of the kerf 4203, holding the walls at the kerf end 4203*b* together. The upper plate 1241 disposed within the bottom of the base member, in conjunction with additional structure of a mounting bracket 1240 (not shown in FIGS. 61-64), can be used to secure the sloped base member 410'** to a lower support structure, such as a helical pile and/or an I-beam as described throughout the present disclosure.

Variations in design are possible due to the flexibility and relative low cost of tooling used in the manufacturing process. Panel size, length, width, thickness, color, ribbing, and surface profiles can be modified to suit specific project requirements. Drainage details also can be modified to suit specific project requirements.

The embodiments of the modular assembly disclosed herein can solve the problem of durability and premature breakdown of concrete and wood platforms due to degradation. The light weight of the modular assembly facilitates ease of installation in areas which have difficult access and work windows. The modular assembly also solves the problem of dealing with heavy concrete platforms which necessitate the use of costly foundations and steel support systems. These benefits apply to both new and retrofit construction requirements. Reduced maintenance and long lifecycles are achieved. The modular assembly can be assembled faster than prior art platforms and can avoid or significantly reduce welding of component parts.

Although the present disclosure has been described with respect to one or more particular embodiments, it will be understood that other embodiments of the present disclosure may be made without departing from the spirit and scope of the present disclosure.

What is claimed is:

1. A modular assembly, comprising:

a base member made of a composite material, the base member being a monolithic structure defined by a plurality of walls, including a top wall, a bottom wall, a plurality of interior walls extending from the top wall to the bottom wall, and opposing side walls;

one or more channels defined by the top wall, the bottom wall, and the plurality of interior walls and/or the opposing side walls;

sliding surfaces disposed within the one or more channels; and a heater tray configured slide along the sliding surfaces, and within a respective channel of the one or more channels, the heater tray carrying one or more heating elements;

wherein the base member is adjoined to at least another base member in an assembled state to form a horizontal platform for traffic;

wherein the one or more heating elements are configured to be slidably removable from the respective channel after the heating element has performed a heating operation in the assembled state.

2. The modular assembly of claim 1, wherein the heater tray is monolithic and made of a thermally conductive material.

3. The modular assembly of claim 2, further comprising a removable support configured to bias the heater tray toward the top wall.

4. The modular assembly of claim 2, wherein the heater tray includes at least one heating channel;

wherein the one or more heating elements comprises a conductive wire that is received within the at least one heating channel.

5. The modular assembly of claim 4, wherein the at least one heating channel has a C-shaped, D-shaped, or U-shaped cross-section.

6. The modular assembly of claim 1, wherein the composite material includes pultruded fiberglass.

7. The modular assembly of claim 6, wherein the composite material further includes a thermally conductive metal.

8. The modular assembly of claim 1, further comprising one or more of the following:

a tactile panel fixed to at least a first portion of one of the plurality of base members; and a slip-resistant coating applied to at least a second portion of one of the plurality of base members.

9. The modular assembly of claim 1, wherein the base member comprises a kerf extending through a bottom surface of the base member, and a top surface of the base member is sloped from the kerf toward at least one end of the base member.

10. A method of installing a modular assembly, comprising:

providing a base member made of a composite material, the base member being a monolithic structure defined by a plurality of walls, including a top wall, a bottom wall, a plurality of interior walls extending from the top wall to the bottom wall, and opposing side walls, wherein one or more channels are defined by the top wall, the bottom wall, and the plurality of interior walls and/or the opposing side walls;

sliding a heater tray and along a sliding surface disposed within one of the one or more channels, the heater tray including one or more heating elements;

adjoining the base member to another base member to form a horizontal platform for traffic;

after forming the horizontal platform for traffic, performing a heating operation with the one or more heating elements; and after performing the heating operation with the one or more heating elements, slidably removing the heater tray from the one of the one or more channels.

11. The method of claim 10, wherein the heater tray is monolithic and made of a thermally conductive material.

12. The method of claim 10, wherein the base member further comprises a support configured to bias the heater tray toward the top wall.

13. The method of claim 10, wherein the heater tray includes at least one heating channel;

wherein the one or more heating elements comprises a conductive wire that is received within the at least one heating channel.

14. The method of claim 13, wherein the at least one heating channel has a C-shaped, D-shaped, or U-shaped cross-section.

15. The method of claim 10, wherein the composite material includes pultruded fiberglass.

16. The method of claim 15, wherein the composite material further includes a thermally conductive metal.

17. The method of claim 10, further comprising one or more of the following:

a tactile panel fixed to at least a first portion of one of the plurality of base members; and a slip-resistant coating applied to at least a second portion of one of the plurality of base members.

18. The method of claim 10, wherein the base member comprises a kerf extending through a bottom surface of the base member, and a top surface of the base member is sloped from the kerf toward at least one end of the base member.

* * * * *